(12) United States Patent
Miura

(10) Patent No.: US 9,212,802 B2
(45) Date of Patent: Dec. 15, 2015

(54) ILLUMINATION UNIT, PROJECTION DISPLAY UNIT, AND DIRECT-VIEW DISPLAY UNIT

(75) Inventor: Koji Miura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 151 days.

(21) Appl. No.: 14/005,490

(22) PCT Filed: Mar. 15, 2012

(86) PCT No.: PCT/JP2012/056680
§ 371 (c)(1),
(2), (4) Date: Sep. 16, 2013

(87) PCT Pub. No.: WO2012/132925
PCT Pub. Date: Apr. 10, 2012

(65) Prior Publication Data
US 2014/0002801 A1   Jan. 2, 2014

(30) Foreign Application Priority Data
Mar. 28, 2011 (JP) .................................. 2011-071153

(51) Int. Cl.
*G03B 21/00* (2006.01)
*F21V 5/00* (2015.01)
(Continued)

(52) U.S. Cl.
CPC ................ *F21V 5/007* (2013.01); *G02B 27/09* (2013.01); *G02B 27/10* (2013.01); *G03B 21/208* (2013.01); *G03B 21/2033* (2013.01); *H04N 9/3152* (2013.01); *H04N 9/3105* (2013.01)

(58) Field of Classification Search
CPC ..... H04N 9/3105; H04N 9/3197; G03B 21/14
USPC ................. 353/30, 31, 34, 37, 38, 94, 98, 99; 362/606, 608, 609, 618, 620, 633, 634, 362/800
See application file for complete search history.

(56) References Cited

U.S. PATENT DOCUMENTS 5,634,704 A *  6/1997  Shikama et al. ................. 353/31
8,057,044 B2 * 11/2011  Amano ........................... 353/20
(Continued)

FOREIGN PATENT DOCUMENTS

EP     2017669 A2     1/2009
JP     2003-098476    4/2003
(Continued)

OTHER PUBLICATIONS

Extended European Search Report issued in connection with related EP application No. EP 12762765 dated Dec. 12, 2014.
(Continued)

*Primary Examiner* — Sultan Chowdhury
(74) *Attorney, Agent, or Firm* — Dentons US LLP

(57) ABSTRACT

An illumination system including one or more light sources each including a solid-state light-emitting device; and an optical member configured to allow light incident from the solid-state light-emitting device to pass therethrough and exit therefrom, and at least one of the chips in the one or more light sources is configured of a laser diode. The optical member includes an integrator including a first fly-eye lens on which light from the solid-state light-emitting device is incident and a second fly-eye lens on which light from the first fly-eye lens is incident, and uniformizing a luminance distribution of light in a predetermined illumination region illuminated with light incident from the solid-state light-emitting device. A major-axis direction of a luminance distribution shape of light incident on an incident plane of the first fly-eye lens is different from arrangement directions of the cells in the first fly-eye lens.

19 Claims, 35 Drawing Sheets

(51) Int. Cl.
  *G03B 21/20* (2006.01)
  *G02B 27/09* (2006.01)
  *G02B 27/10* (2006.01)
  *H04N 9/31* (2006.01)

(56) References Cited

U.S. PATENT DOCUMENTS

| | | |
|---|---|---|
| 2005/0111072 A1* | 5/2005 | Miyagaki et al. ............ 359/279 |
| 2005/0219847 A1 | 10/2005 | Ikeda et al. |
| 2009/0040753 A1 | 2/2009 | Matsumoto et al. |
| 2009/0059177 A1 | 3/2009 | Okuda et al. |
| 2009/0185141 A1* | 7/2009 | Chen et al. ..................... 353/38 |
| 2011/0234985 A1* | 9/2011 | Ryf et al. ....................... 353/38 |

FOREIGN PATENT DOCUMENTS

| | | |
|---|---|---|
| JP | 2006-189825 | 7/2006 |
| JP | 2008-122949 | 5/2008 |
| JP | 2009-025512 | 2/2009 |
| JP | 2009-042637 | 2/2009 |
| JP | 2009-063619 | 3/2009 |
| JP | 2010-276757 | 12/2010 |
| WO | WO/99/49358 | 9/1999 |

OTHER PUBLICATIONS

Japanese Office Examination Report issued in connection with related Japanese Patent Application No. 2011-071153 dated Feb. 5, 2015.

* cited by examiner

FIG. 15
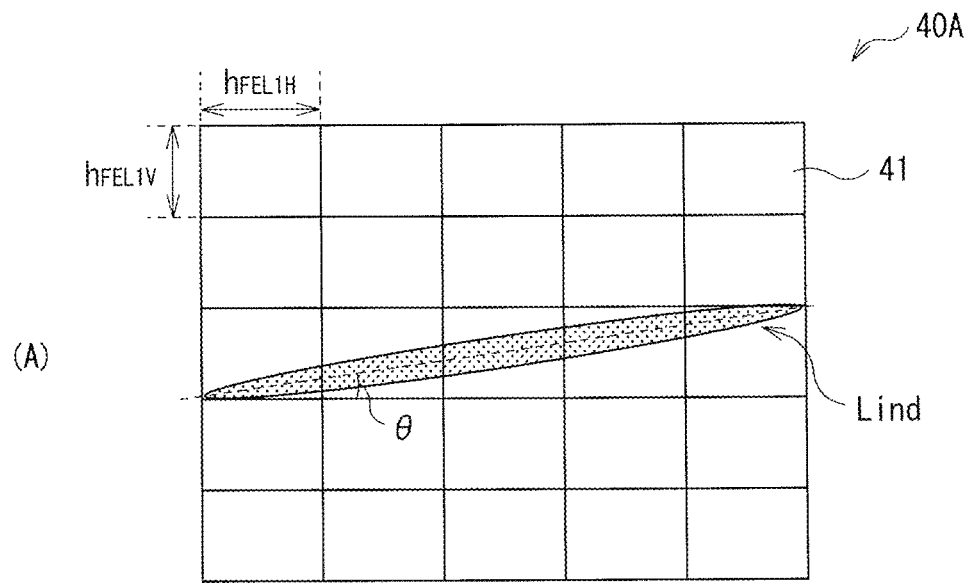
(A)
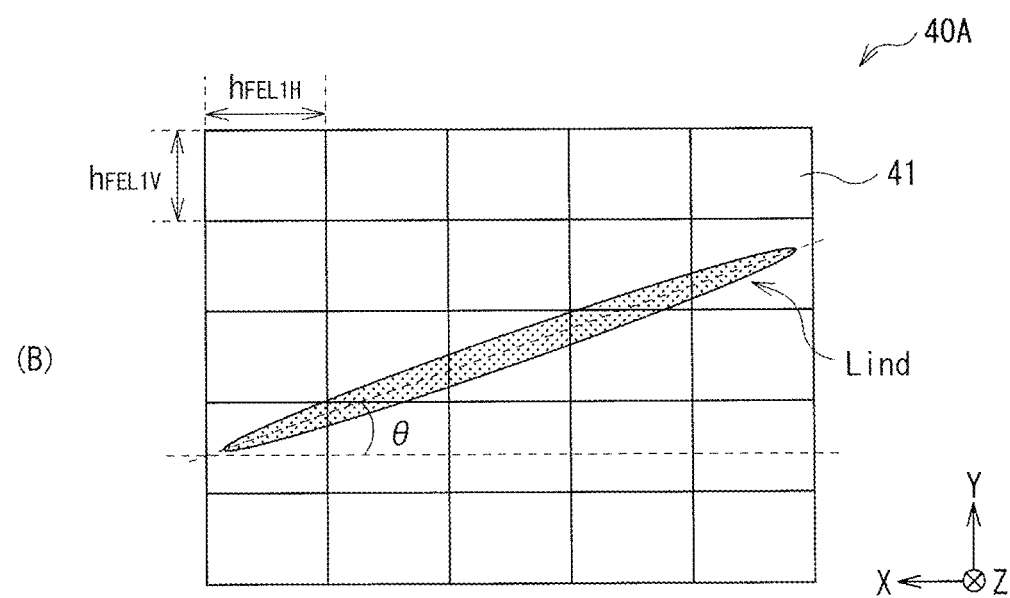
(B)

ILLUMINATION UNIT, PROJECTION DISPLAY UNIT, AND DIRECT-VIEW DISPLAY UNIT

TECHNICAL FIELD

The present disclosure relates to an illumination unit using a solid-state light-emitting device such as a laser diode (LD), and a projection display unit and a direct-view display unit each of which includes the illumination unit.

BACKGROUND ART

In recent years, projectors configured to project an image onto a screen are widely used not only in offices but also in households. Projectors modulate light from a light source with use of a light valve to generate image light, and projects the image light onto a screen to thereby perform display (for example, refer to PTL 1). Recently, palm-sized ultra-compact projectors, cellular phones with a built-in ultra-compact projector, and the like are being introduced.

CITATION LIST

Patent Literature

[PTL 1] Japanese Unexamined Patent Application Publications No. 2008-134324

SUMMARY

Incidentally, high-luminance discharge lamps are dominant light sources used for projectors. However, since the discharge lamps have a relatively large size and high power consumption, in recent years, solid-state light-emitting devices such as light-emitting diodes (LEDs), laser diodes (LDs), and organic ELs (OLEDs) have been attracting attention as alternatives to the discharge lamps. These solid-state light-emitting devices have advantages over the discharge lamps not only in size and power consumption but also in high reliability.

Thus, in such projectors, in general, a reduction in luminance unevenness in illumination light (uniformization of luminance of illumination light) is achieved with use of an integrator including a fly-eye lens or the like. However, even though such an integrator is used, in some cases, luminance unevenness in illumination light may not be sufficiently reduced (a luminance distribution may not be uniformized); therefore, a further improvement is desired.

Therefore, it is desirable to provide an illumination unit capable of reducing luminance unevenness in illumination light, and a projection display unit and a direct-view display unit each of which includes such an illumination unit.

An illumination unit according to an embodiment of the present disclosure includes: one or more light sources each including a solid-state light-emitting device, the solid-state light-emitting device configured to emit light from a light emission region thereof, the light emission region including one or more dot-shaped or non-dot-shaped light-emitting spots; and an optical member configured to allow light incident from the solid-state light-emitting device to pass therethrough and exit therefrom. The solid-state light-emitting device includes a single chip or a plurality of chips, the single chip configured to emit light in a single wavelength range or light in a plurality of wavelength ranges, the plurality of chips configured to emit light in a same wavelength range or light in wavelength ranges different from one another, and at least one of the chips in the one or more light sources is configured of a laser diode. The above-described optical member includes an integrator including a first fly-eye lens and a second fly-eye lens, and configured to uniformize a luminance distribution of light in a predetermined illumination region illuminated with light incident from the solid-state light-emitting device, the first fly-eye lens on which light from the solid-state light-emitting device is incident, the second fly-eye lens on which light from the first fly-eye lens is incident. Each of the first and second fly-eye lenses includes a plurality of cells, and a major-axis direction of a luminance distribution shape of light incident on an incident plane of the first fly-eye lens is different from arrangement directions of the cells in the first fly-eye lens.

A projection display unit according to an embodiment of the present disclosure includes an illumination optical system, a spatial modulating device configured to modulate light from the illumination optical system based on an input image signal to generate image light, and a projection optical system configured to project the image light generated by the spatial modulating device. The illumination optical system mounted in the projection display unit includes the same components as those of the illumination unit according to the above-described embodiment of the present disclosure.

A direct-view display unit according to an embodiment of the present disclosure includes an illumination optical system, a spatial modulating device configured to modulate light from the illumination optical system based on an input image signal to generate image light, a projection optical system configured to project the image light generated by the spatial modulating device, and a transmissive screen configured to display the image light projected from the projection optical system. The illumination optical system mounted in the direct-view display unit includes the same components as those in the illumination unit according to the above-described embodiment of the present disclosure.

In the illumination unit, the projection display unit, and the direct-view display unit according to the above-described embodiments of the present disclosure, the major-axis direction of the luminance distribution shape of light incident on the incident plane of the first fly-eye lens is different from arrangement directions of the cells in the first fly-eye lens. Therefore, even if laser light emitted from the light source including the chip configured of the laser diode has a steep luminance distribution shape (for example, even if a far field pattern (FFP) does not have a circular (isotropic) shape) (for example, even if the FFP has an elliptical shape), luminance unevenness in incident light is allowed to be easily reduced in the integrator.

In the illumination unit, the projection display unit, and the direct-view display unit according to the above-described embodiments of the present disclosure, since the major-axis direction of the luminance distribution shape of light incident on the incident plane of the first fly-eye lens is different from the arrangement directions of the cells in the first fly-eye lens, luminance unevenness in the incident light is allowed to be easily reduced in the integrator. Therefore, luminance unevenness in illumination light is allowed to be reduced, and display image quality is improvable.

BRIEF DESCRIPTION OF DRAWINGS

FIGS. 15(A) and 15(B) are schematic views illustrating an example of a luminance distribution of light incident on a fly-eye lens disposed in a preceding stage in FIG. 1.

FIGS. 23(A) and 23(B) are diagrams for describing a luminance unevenness reduction function in the illumination optical system according to the first embodiment.

FIG. 44 is a diagram illustrating a schematic configuration example of a rear-projection display unit using any of the illumination optical systems according to the first to fifth embodiments, Modification Examples 1 to 3, and the like.

DESCRIPTION OF EMBODIMENTS

Some embodiments of the present technology will be described in detail below referring to the accompanying drawings. It is to be noted that description will be given in the following order.
1. First Embodiment (An example in which a luminance distribution of light incident on a fly-eye lens disposed in a preceding stage is inclined)
2. Second Embodiment (An example in which positions of cells in the fly-eye lens disposed in the preceding stage are shifted)
3. Third Embodiment (An example in which an anamorphic lens is included in an illumination optical system)
4. Fourth Embodiment (An example in which an optical path branching device is included in an illumination optical system)
5. Fifth Embodiment (An example in which both an anamorphic lens and an optical path branching device are included in an illumination optical system)
6. Modification Examples Applicable to First to Fifth Embodiments in Common
   Modification Example 1 (An example in which a reflective device is used as a spatial modulating device)
   Modification Example 2 (An example in which only one light source is included in an illumination optical system)
   Modification Example 3 (An example in which a chip in a light source is inclined with respect to an optical axis)
   Other Modification Examples (Combinations of any of the embodiments and the like, an application example to a rear-projection display unit, and the like)

First Embodiment

Entire Configuration of Projector 1

Figure 1:
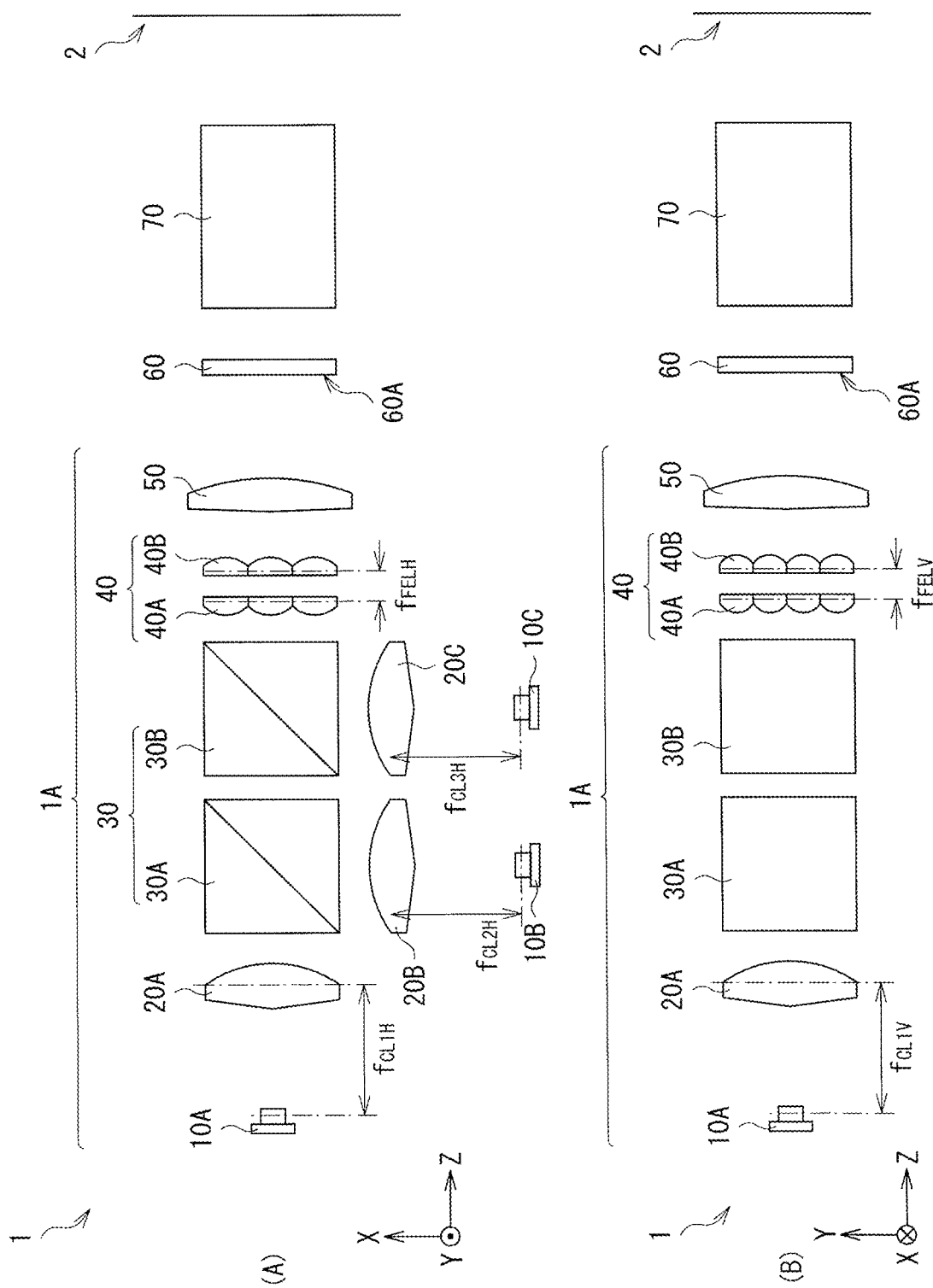
FIGS. 1(A) and 1(B) are diagrams illustrating a schematic configuration of a projector according to a first embodiment of the present disclosure.
Figure 2:
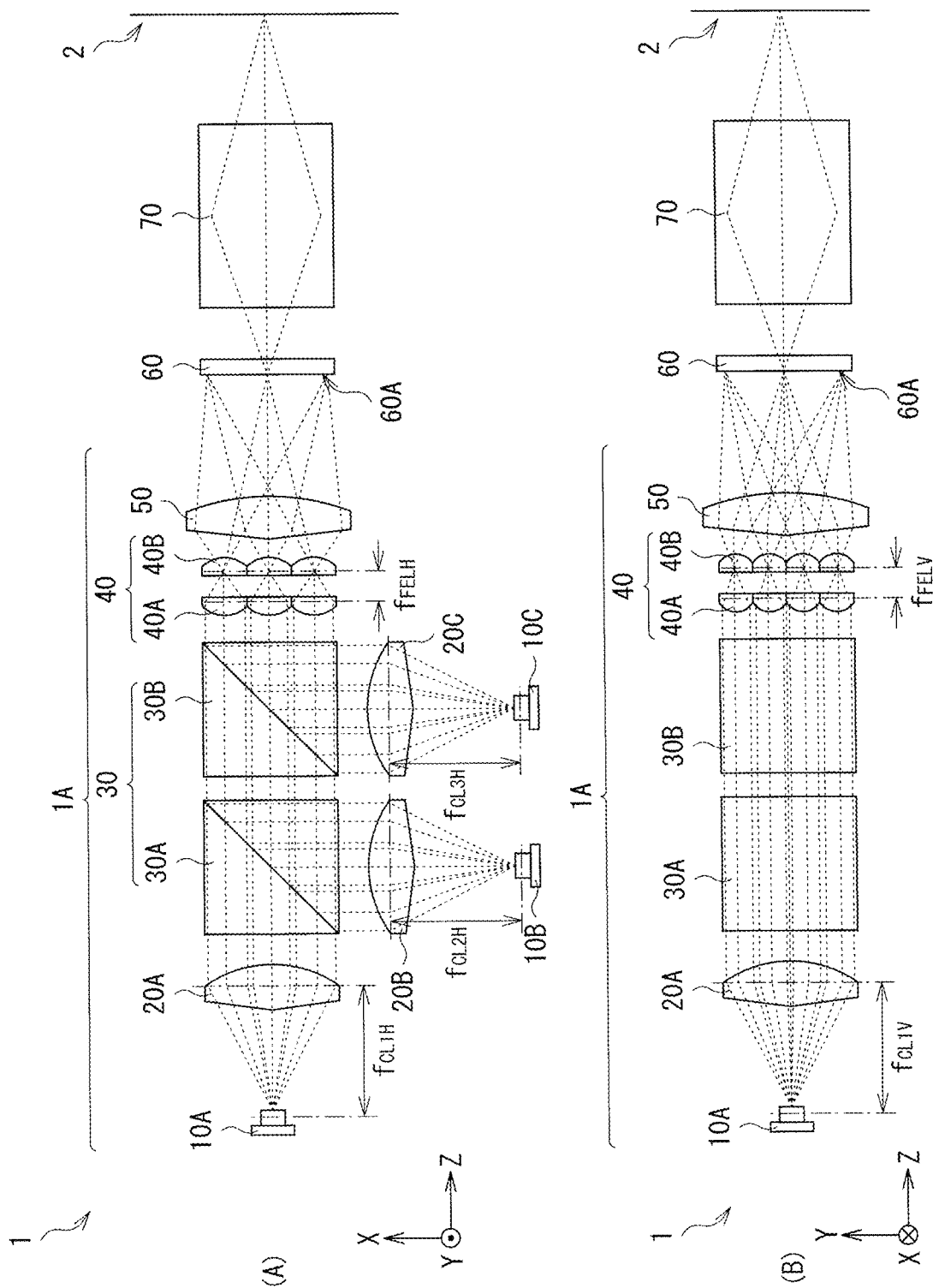
FIGS. 2(A) and 2(B) are diagrams illustrating an example of optical paths in the projector illustrated in FIG. 1.

FIGS. 1(A) and 1(B) illustrate a schematic configuration of a projector (a projector 1) according to a first embodiment of the present disclosure. It is to be noted that the projector 1 corresponds to a specific example of "projection display unit" in the present disclosure. FIG. 1(A) illustrates a configuration example of the projector 1 when viewed from above (from a y-axis direction), and FIG. 1(B) illustrates a configuration example of the projector 1 when viewed from a side thereof (from an x-axis direction). Moreover, FIGS. 2(A) and 2(B) illustrate an example of optical paths in the projector 1 in FIG. 1. FIG. 2(A) illustrates an example of the optical paths when the projector 1 is viewed from above (from the y-axis direction), and FIG. 2(B) illustrates an example of the optical paths when the projector 1 is viewed from a side thereof (from the x-axis direction).

Typically, a y axis is directed toward a vertical direction, and an x axis is directed toward a horizontal direction; however, the y axis may be directed toward the horizontal direction, and the x axis may be directed toward the vertical direction. It is to be noted that, for convenience sake, in the following description, the y axis and the x axis are directed toward the vertical direction and the horizontal direction, respectively. Moreover, in the following description, a "transverse direction" indicates the x-axis direction, and a "longitudinal direction" indicates the y-axis direction.

The projector 1 includes, for example, an illumination optical system 1A, a spatial modulating device 60 which modulates light from the illumination optical system 1A based on an input image signal to generate image light, and a projection optical system 70 which projects the image light generated by the spatial modulating device 60 onto a reflective screen 2. Herein, the illumination optical system 1A corresponds to a specific example of "illumination unit" in the present disclosure.

(Configuration of Illumination Optical System 1A)

The illumination optical system 1A provides a light flux which is applied to an illumination region 60A (an illuminated surface) of the spatial modulating device 60. It is to be noted that, as necessary, any optical device may be included in a region where light of the illumination optical system 1A passes. For example, a filter which attenuates light, other than visible light, from the illumination optical system 1A, or the like may be included in the region where light of the illumination optical system 1A passes.

For example, as illustrated in FIGS. 1(A) and 1(B), the illumination optical system 1A includes light sources 10A, 10B, and 10C, coupling lenses (directivity angle changing devices) 20A, 20B, and 20C, an optical path combining device 30, an integrator 40, and a condenser lens 50. The optical path combining device 30 combines light from the light sources 10A, 10B, and 10C, and may be configured of, for example, two dichroic mirrors 30A and 30B. The integrator 40 uniformizes an illuminance distribution of light in the illumination region 60A, and may be configured of, for example, a pair of fly-eye lenses 40A and 40B. The coupling lens 20A, the optical path combining device 30, the integrator 40, and the condenser lens 50 are arranged in this order from a side closer to the light source 10A along an optical axis of the light source 10A. An optical axis of the light source 10B is orthogonal to the optical axis of the light source 10A on the dichroic mirror 30A, and the coupling lens 20B and the dichroic mirror 30A are arranged in this order from a side closer to the light source 10B along the optical axis of the light source 10B. An optical axis of the light source 10C is orthogonal to the optical axis of the light source 10A on the dichroic mirror 30B, and the coupling lens 20C and the dichroic mirror 30B are arranged in this order from a side closer to the light source 10C along the optical axis of the light source 10C.

Herein, the coupling lenses (directivity angle changing devices) 20A, 20B, and 20C, and the integrator 40 from among the above-described components correspond to specific examples of "optical member (optical member allowing incident light from a solid-state light-emitting device which will be described later to pass therethrough and exit therefrom)" in the present disclosure.

It is to be noted that, in FIGS. 1(A) and 1(B), a case where respective components (except for the light sources 10B and 10C and the coupling lenses 20B and 20C) of the projector 1 are arranged on a line segment parallel to a z axis is illustrated; however, some of the respective components of the projector 1 may be arranged on a line segment not parallel to the z axis. For example, although not illustrated, the entire illumination optical system 1A may be rotated by 90° from a state illustrated in FIGS. 1(A) and 1(B) to allow an optical axis of the illumination optical system 1A to be oriented toward a direction orthogonal to the z axis. However, in such a case, it is necessary to provide an optical device (for example, a mirror) guiding light output from the illumination optical system 1A toward the spatial modulating device 60. Moreover, for example, the light source 10A, the coupling lens 20A, and the optical path combining device 30 may be rotated by 90° from the state illustrated in FIGS. 1(A) and 1(B) to allow optical axes thereof to be oriented toward the direction orthogonal to the z axis. However, in such a case, it is necessary to provide an optical device (for example, a mirror) guiding light output from the optical path combining device 30 toward the integrator 40.

(Light Sources 10A, 10B, 10C Including Chips 11A of Top Emission Type)

Figure 3:
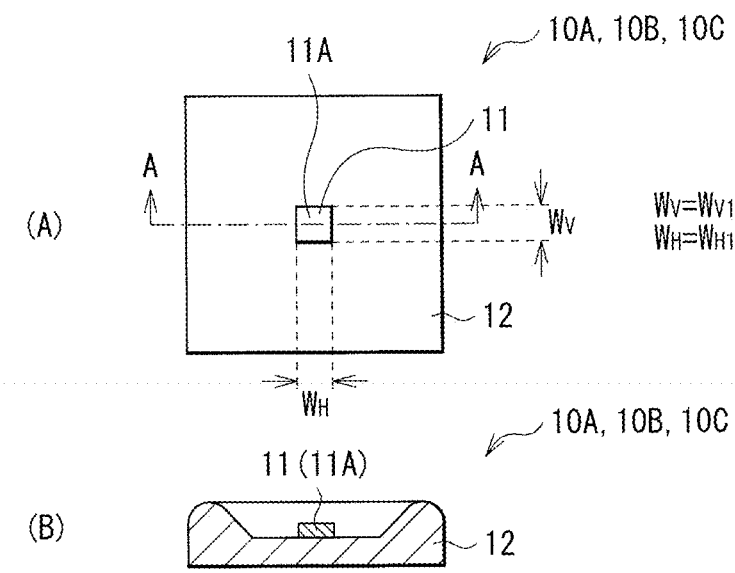
FIGS. 3(A) and 3(B) are diagrams illustrating an example of a top configuration and a sectional configuration of the light source in FIG. 1 in a case where a chip is of a top emission type.
Figure 4:
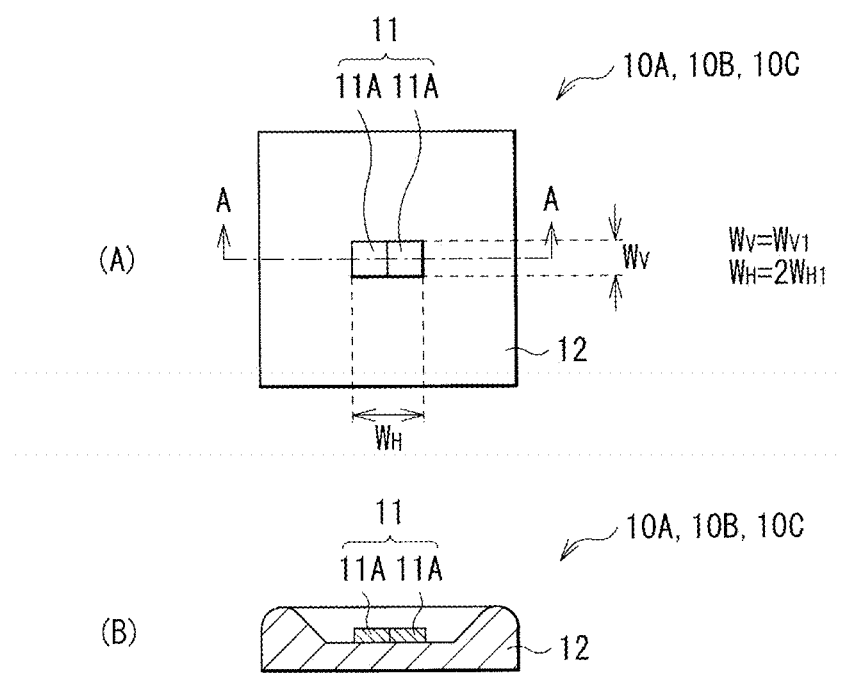
FIGS. 4(A) and 4(B) are diagrams illustrating another example of the top configuration and the sectional configuration of the light source in FIG. 1 in the case where the chip is of the top emission type.
Figure 5:
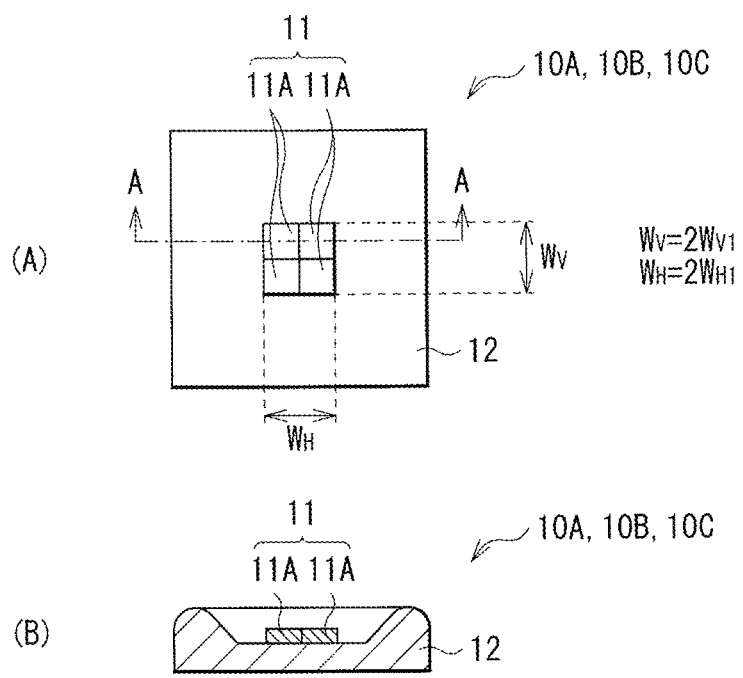
FIGS. 5(A) and 5(B) are diagrams illustrating still another example of the top configuration and the sectional configuration of the light source in FIG. 1 in the case where the chip is of the top emission type.
Figure 6:
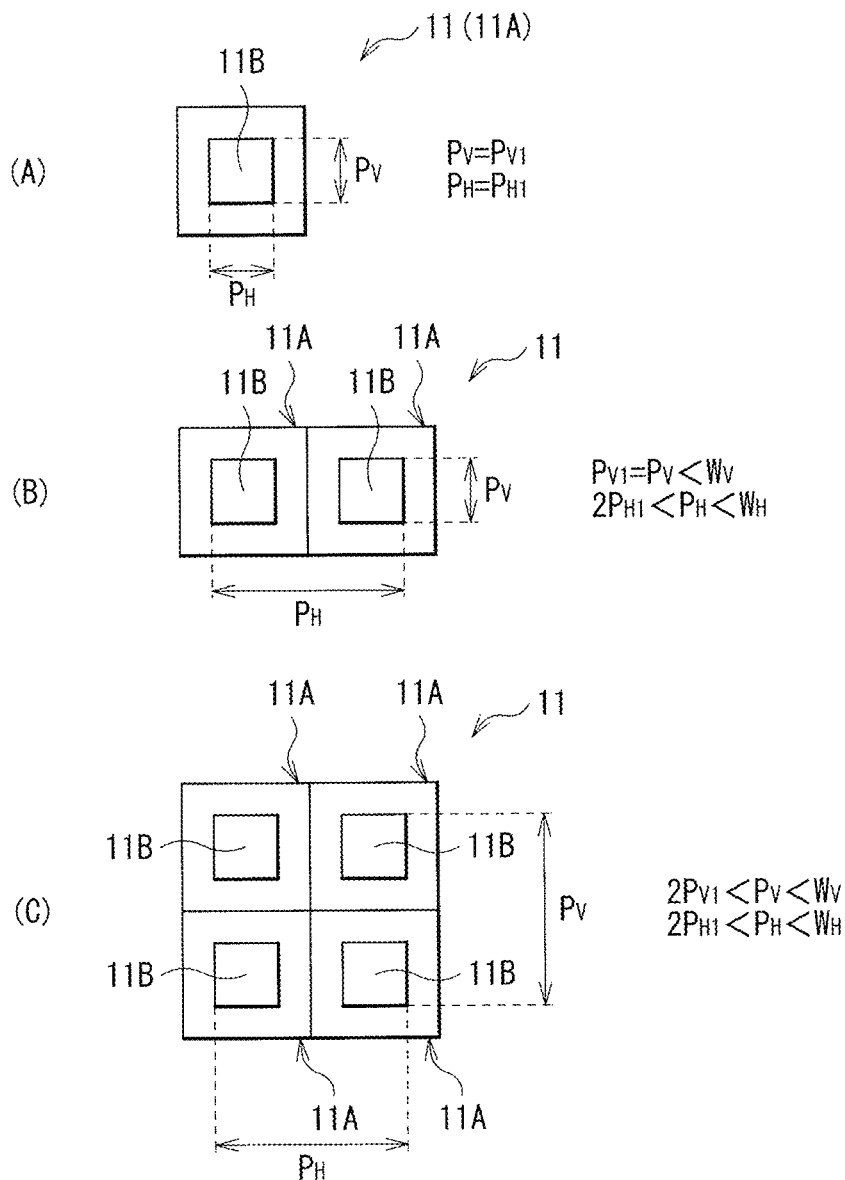
FIGS. 6(A) to 6(C) are diagrams illustrating an example of a light-emitting spot in the light source in FIG. 1 in the case where the chip is of the top emission type.
Figure 7:
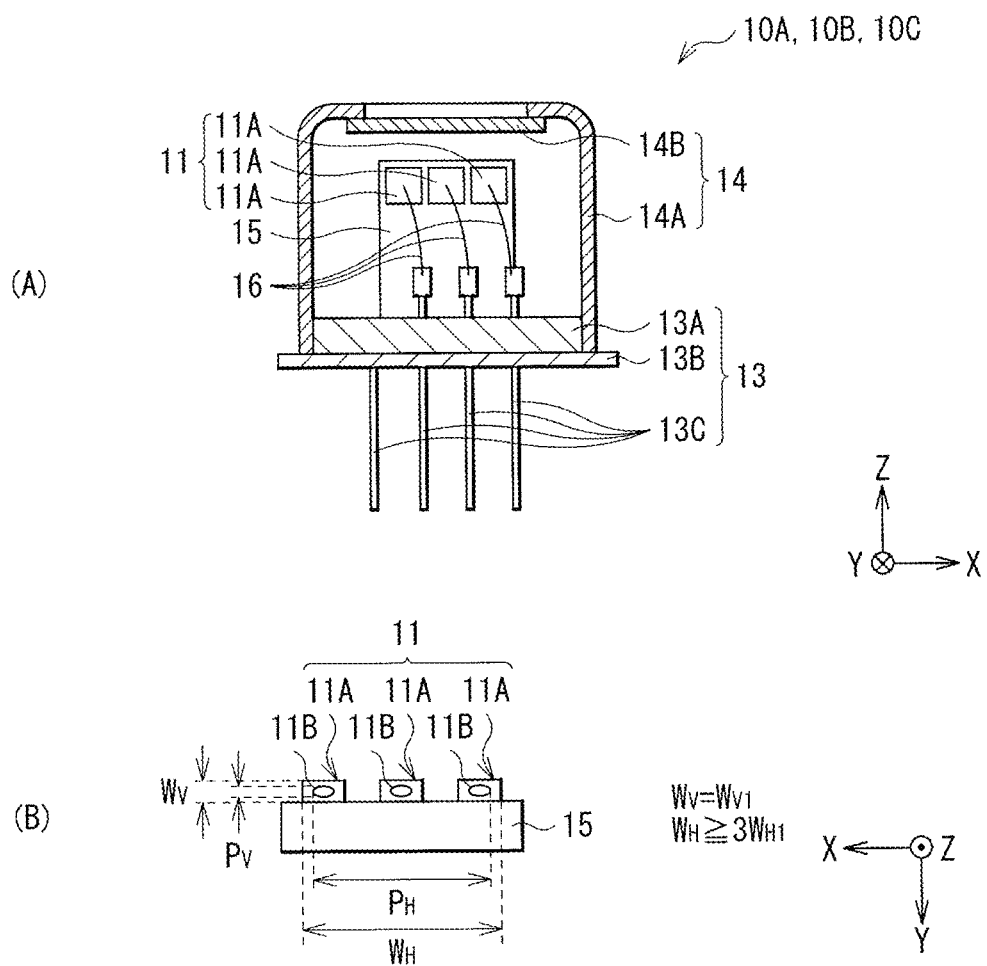
FIGS. 7(A) and 7(B) are diagrams illustrating an example of a sectional configuration of the light source in FIG. 1 and a configuration of a solid-state light-emitting device when viewed from a light emission surface side thereof in the case where the chip is of an edge emission type.
Figure 8:
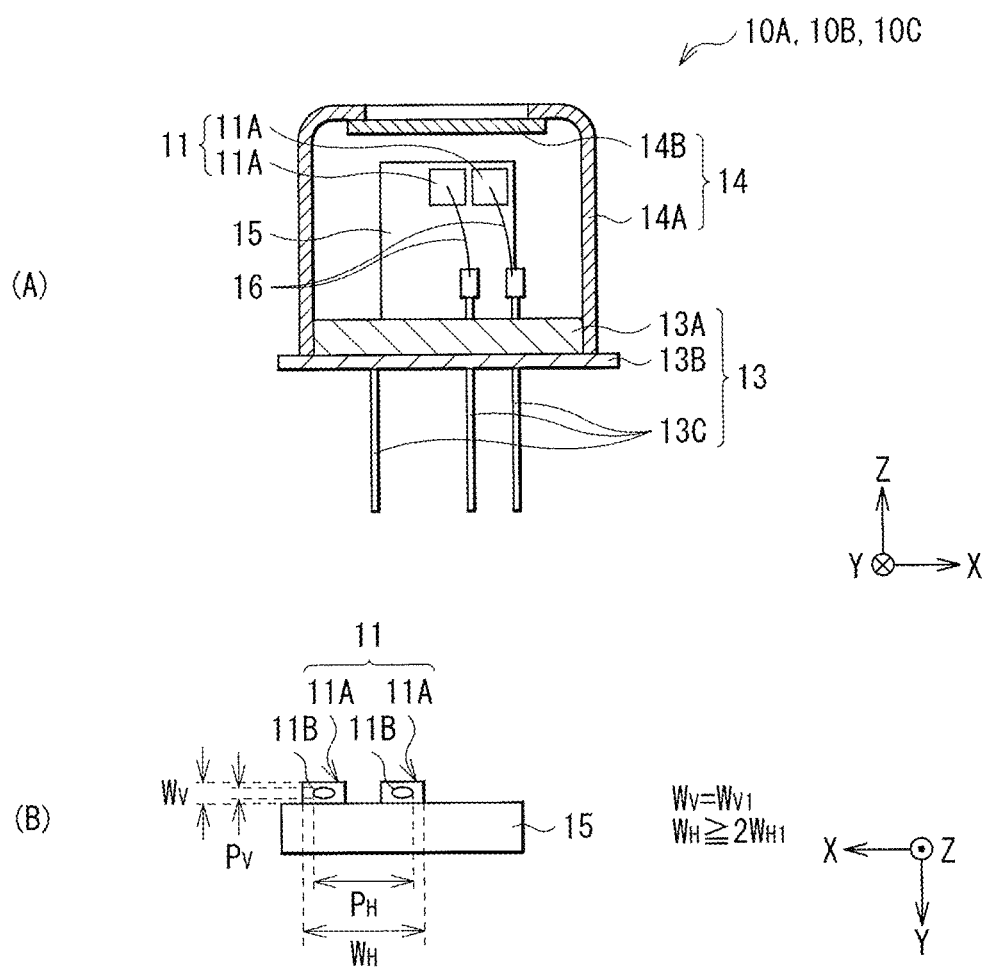
FIGS. 8(A) and 8(B) are diagrams illustrating another example of the sectional configuration of the light source in FIG. 1 and the configuration of the solid-state light-emitting device when viewed from the light emission surface side thereof in the case where the chip is of the edge emission type.
Figure 9:
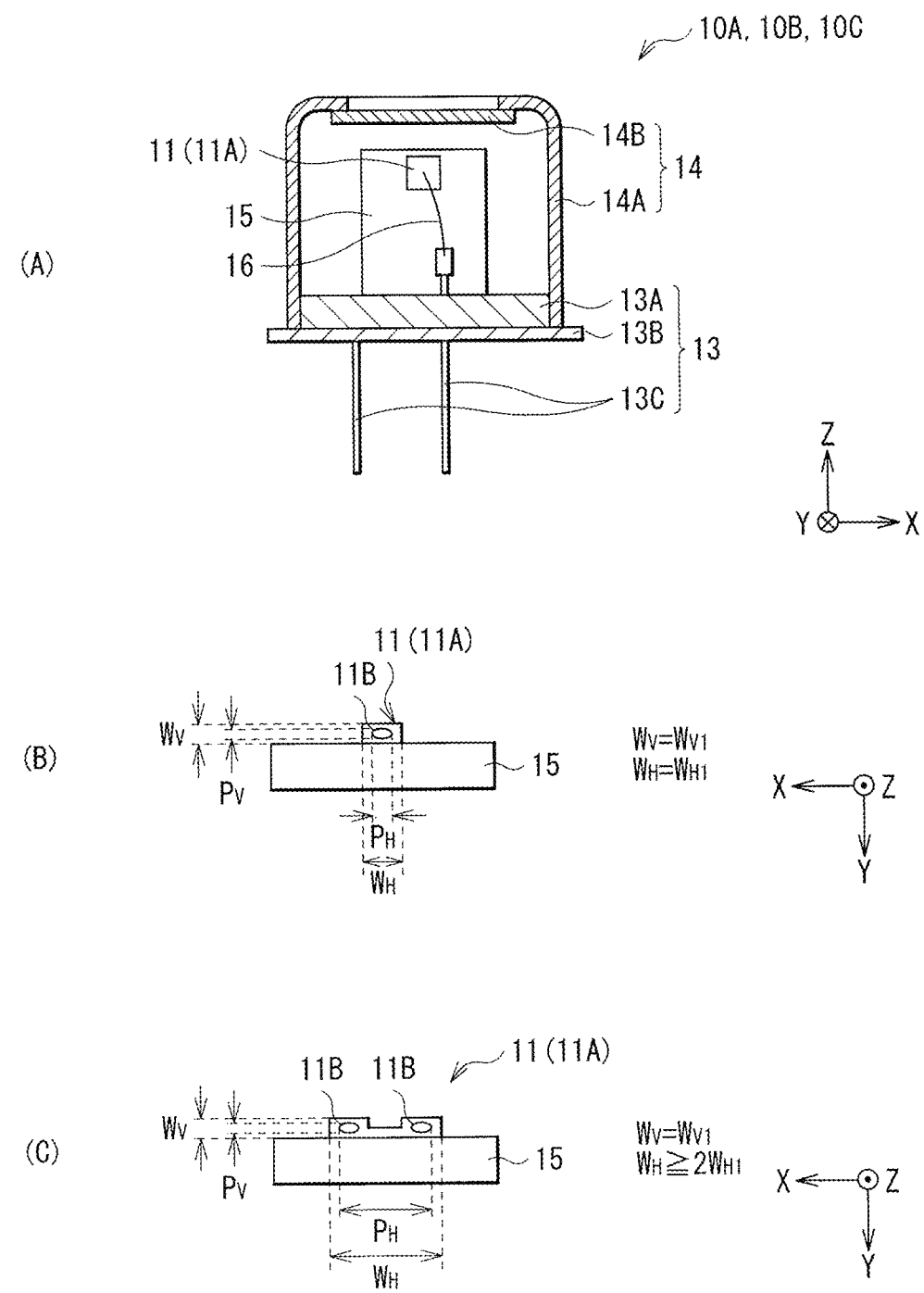
FIGS. 9(A) to 9(C) are diagrams illustrating still another example of the sectional configuration of the light source in FIG. 1 and the configuration of the solid-state light-emitting device when viewed from the light emission surface side thereof in the case where the chip is of the edge emission type.
Figure 10:
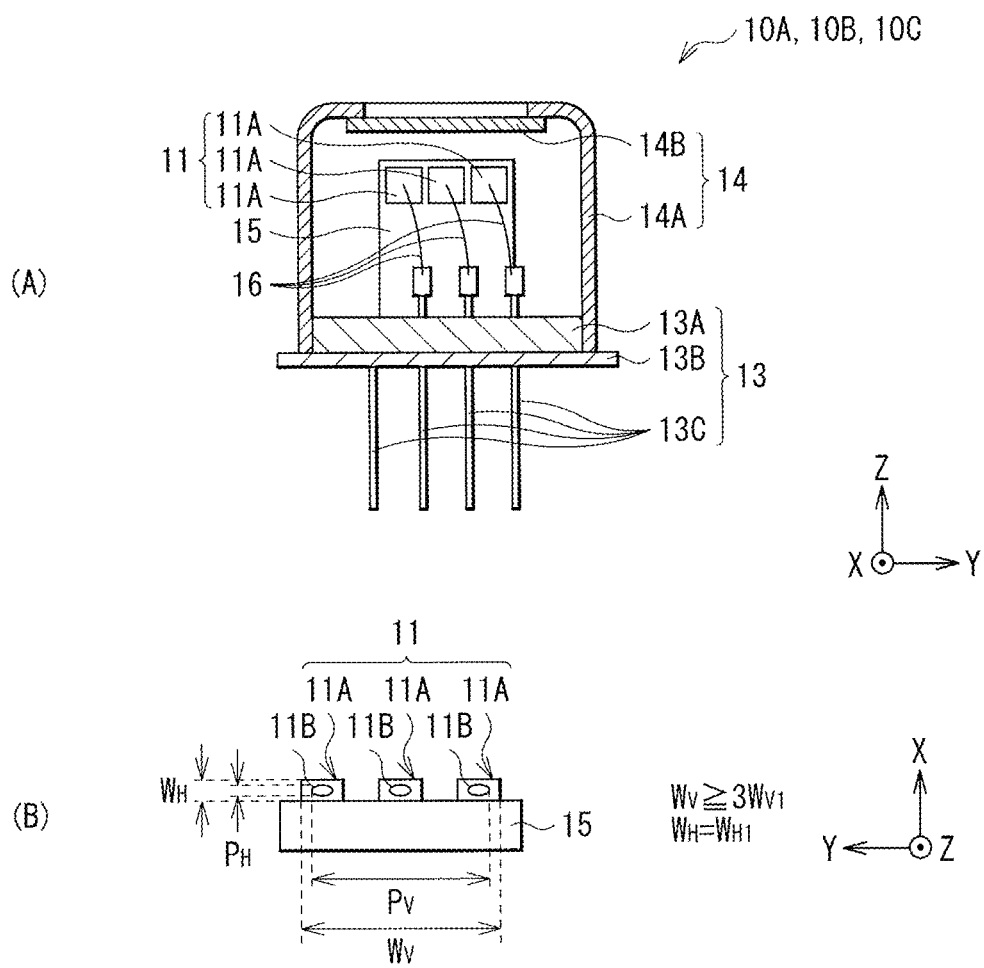
FIGS. 10(A) and 10(B) are diagrams illustrating a configuration example when the light source in FIG. 7 is rotated by 90 deg on an XY plane.
Figure 11:
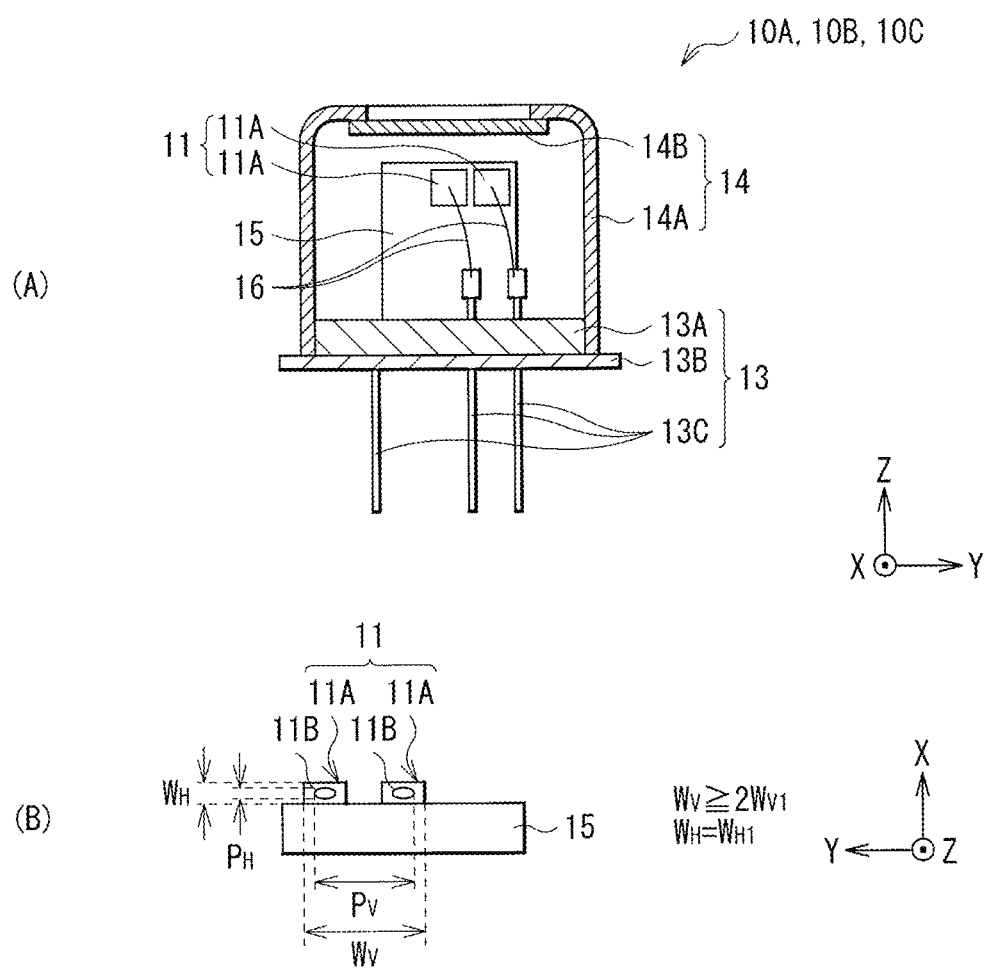
FIGS. 11(A) and 11(B) are diagrams illustrating a configuration example when the light source in FIG. 8 is rotated by 90 deg on an XY plane.
Figure 12:
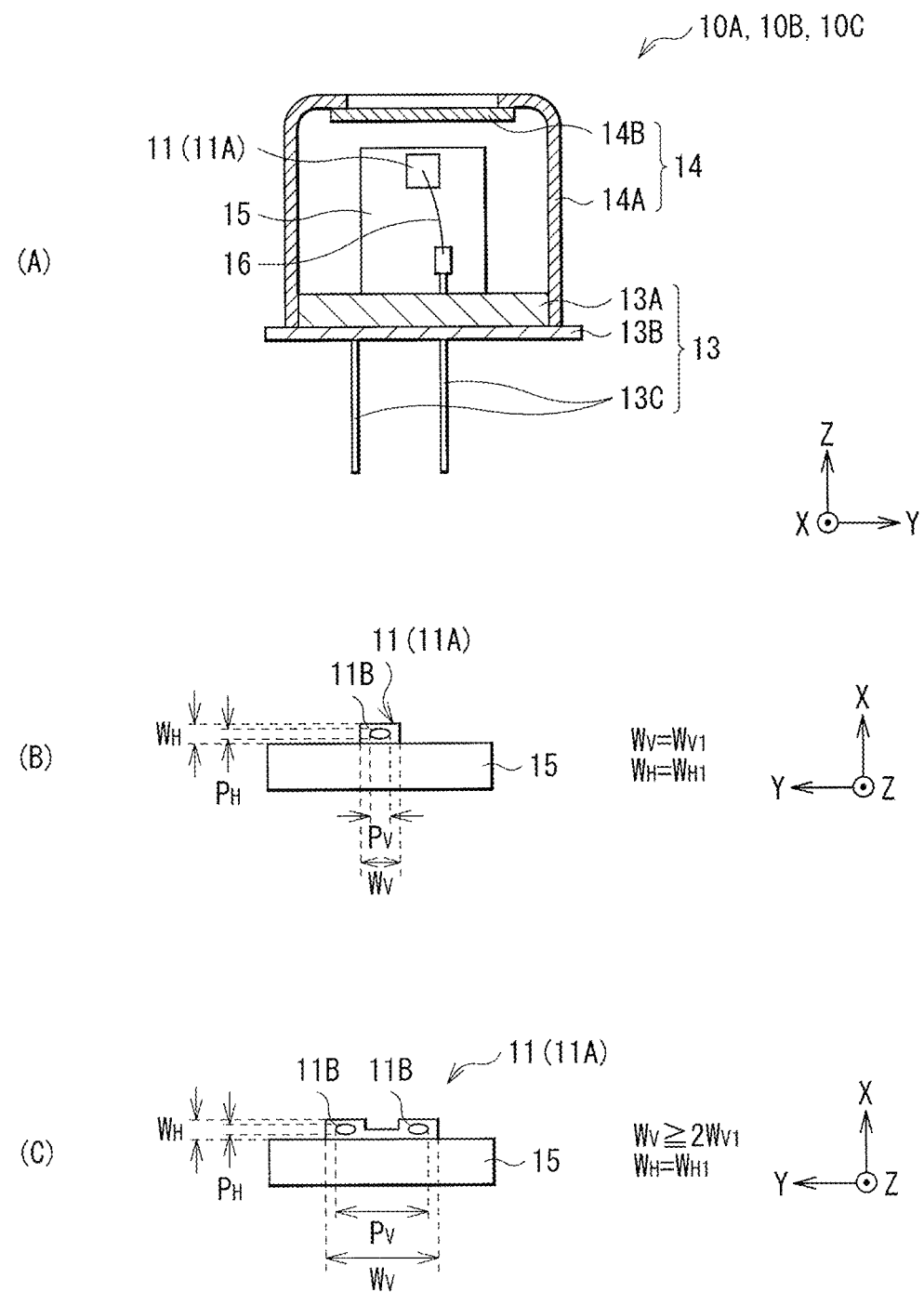
FIGS. 12(A) to 12(C) are diagrams illustrating a configuration example when the light source in FIG. 9 is rotated by 90 deg on an XY plane.

For example, as illustrated in FIGS. 3(A) and 3(B) to 5(A) and 5(B), each of the light sources 10A, 10B, and 10C includes a solid-state light-emitting device 11 and a package 12 supporting the solid-state light-emitting device 11 (a base for mounting the solid-state light-emitting device 11 thereon). In other words, in this case, each of the light sources 10A, 10B, and 10C is formed in a manner of a package in which the solid-state light-emitting device 11 is supported on the base. The solid-state light-emitting device 11 emits light from a light emission region including one or more dot-shaped or non-dot-shaped light-emitting spots. For example, as illustrated in FIGS. 3(A) and 3(B), the solid-state light-emitting device 11 may include a single chip 11A emitting light in a predetermined wavelength range, or as illustrated in FIGS. 4(A), 4(B), 5(A), and 5(B), the solid-state light-emitting device 11 may include a plurality of chips 11A emitting light in a same wavelength range or light in wavelength ranges different from one another. In the case where the solid-state light-emitting device 11 includes a plurality of chips 11A, for example, these chips 11A may be arranged, for example, in a line in the transverse direction as illustrated in FIGS. 4(A) and 4(B), or in a grid-like pattern in the transverse direction and the longitudinal direction as illustrated in FIGS. 5(A) and 5(B). The number of chips 11A included in the solid-state light-emitting device 11 may be different in each of the light sources 10A, 10B, and 10C, or may be the same in all of the light sources 10A, 10B, and 10C.

In the case where the solid-state light-emitting device 11 includes the single chip 11A, for example, as illustrated in FIG. 3(A), a size ($W_V \times W_H$) of the solid-state light-emitting device 11 is equal to a size ($W_{V1} \times W_{H1}$) of the single chip 11A. On the other hand, in the case where the solid-state light-emitting device 11 includes a plurality of chips 11A, for example, as illustrated in FIGS. 4(A) and 5(A), the size of the solid-state light-emitting device 11 is equal to the size of a package into which all of the chips 11A are gathered. In the case where the plurality of chips 11A are arranged in a line in the transverse direction, the size ($W_V \times W_H$) of the solid-state light-emitting device 11 is equal to $W_{V1} \times 2 W_{H1}$ in an example in FIG. 4(A). Moreover, in the case where the plurality of chips 11A are arranged in a grid-like pattern in the transverse direction and the longitudinal direction, the size ($W_V \times W_H$) of the solid-state light-emitting device 11 is equal to $2 W_{V1} \times 2 W_{H1}$ in an example in FIG. 5(A).

Each of the chips 11A is configured of a light-emitting diode (LED), an organic EL light-emitting diode (OLED), or a laser diode (LD). However, in this embodiment, at least one of the chips 11A included in the light sources 10A, 10B, and 10C may be configured of an LD. It is to be noted that the chips 11A other than the chip 11A configured of the LD may be configured of any of an LED, an OLED, and an LD.

The chips 11A included in the light sources 10A, 10B, and 10C emit light in wavelength ranges different in each of the light sources 10A, 10B, and 10C, for example. The chip 11A included in the light source 10A emits, for example, light in a wavelength of about 400 nm to about 500 nm both inclusive (blue light). The chip 11A included in the light source 10B emits, for example, light in a wavelength of about 500 nm to about 600 nm both inclusive (green light). The chip 11A included in the light source 10C emits, for example, light in a wavelength of about 600 nm to about 700 nm both inclusive (red light). It is to be noted that the chip 11A included in the light source 10A may emit light (green light or red light) other than blue light. Moreover, the chip 11A included in the light source 10B may emit light (blue light or red light) other than blue light. Further, the chip 11A included in the light source 10C may emit light (green light or blue light) other than red light.

For example, as illustrated in FIGS. 3(A) and 3(B) to FIGS. 6(A), 6(B), and 6(C), each of the chips 11A has a light-emitting spot 11B with a smaller size ($P_{V1} \times P_{H1}$) than the size ($W_V \times W_H$) of the chip 11A. The light-emitting spot 11B corresponds to a region (a light emission region) from which the chip 11A emits light when a current is injected into the chip 11A to drive the chip 11A. In a case where the chip 11A is configured of an LED or an OLED, the light-emitting spot 11B has a non-dot (planar) shape, but in a case where the chip 11A is configured of an LD, the light-emitting spot 11B has a smaller dot shape than the light-emitting spot 11B of the LED or the OLED.

In the case where the solid-state light-emitting device 11 includes a single chip 11A, for example, as illustrated in FIG. 6(A), the number of light-emitting spots 11B is one. However, as will be described later, in the case where the solid-state light-emitting device 11 has a monolithic configuration, the number of light-emitting spots 11B is two or more, and this applies to the following description. On the other hand, in the case where the solid-state light-emitting device 11 includes a plurality of chips 11A, for example, as illustrated in FIGS. 6(B) and 6(C), the number of the light-emitting spots 11B is equal to the number of chips 11A (however, as described above, the solid-state light-emitting device 11 has a monolithic configuration, the number of light-emitting spots 11B is larger than the number of chips 11A). In the case where the solid-state light-emitting device 11 includes the single chip 11A, a size ($P_V \times P_H$) of the light emission region of the solid-state light-emitting device 11 is equal to the size ($P_{V1} \times P_{H1}$) of the light-emitting spot 11B (except for the case where the solid-state light-emitting device 11 has a monolithic configuration, as described above). On the other hand, in the case where the solid-state light-emitting device 11 includes a plurality of chips 11A, the size ($P_V \times P_H$) of the light emission region of the solid-state light-emitting device 11 is equal to a size of a smallest possible enclosure containing the light-emitting spots 11B of all of the chips 11A. In the case where the plurality of chips 11A are arranged in a line in the transverse direction, in an example in FIG. 6(B), the size ($P_V \times P_H$) of the light emission region is larger than $P_{V1} \times 2 P_{H1}$, and is smaller than $W_V \times W_H$. Moreover, in the case where the plurality of chips 11A are arranged in a grid-like pattern in the transverse direction and the longitudinal direction, the size ($P_V \times P_H$) of the light emission region is larger than $2 P_{V1} \times 2 P_{H1}$, and is smaller than $W_V \times W_H$ in an example in FIG. 6(C).

(Light Sources 10A, 10B, and 10C Including Chips 11A of Edge-Emission Type)

In FIGS. 3(A) and 3(B) to 6(A), 6(B), and 6(C), the case where the chips 11A are of a top-emission type is described as an example; however, the chips 11A may be of an edge-emission type which will be described later. In this case, for example, as illustrated in FIGS. 7(A) and 7(B) to FIGS. 12(A), 12(B), and 12(C), each of the light sources 10A, 10B, and 10C is of a can type in which the solid-state light-emitting device 11 including one or a plurality of edge-emission type chips 11A is contained in an inner space enclosed with a stem 13 and a cap 14. In other words, in this case, each of the light sources 10A, 10B, and 10C is formed in a manner of a package incorporating the solid-state light-emitting device 11.

The stem 13 configures, together with the cap 14, a package of each of the light sources 10A, 10B, and 10C, and includes, for example, a supporting substrate 13A supporting a submount 15, an outer frame substrate 13B disposed on a back side of the supporting substrate 13A, and a plurality of connection terminals 13C.

The submount 15 is made of a material having conductivity and thermal dissipation. The supporting substrate 13A and the outer frame substrate 13B each are configured of a base having conductivity and heat dissipation in which one or more insulating through holes and one or more conductive through holes are formed. The supporting substrate 13A and the outer frame substrate 13B each may have, for example, a disk shape, and are laminated to allow central axes (not illustrated) thereof to be superimposed on each other. A diameter of the outer frame substrate 13B is larger than that of the supporting substrate 13A. An outer edge of the outer frame substrate 13B is a ring-shaped flange hanging over in a radiation direction from the central axis of the outer frame substrate 13B in a plane having a normal along the central axis of the outer frame substrate 13B. The flange has a role in determining a reference position when the cap 14 is fit into the supporting substrate 13A in a manufacturing process.

The plurality of connection terminals 13C penetrate through at least the supporting substrate 13A. Terminals (hereinafter referred to as terminals "alpha" for convenience sake) except for one or more terminals of the plurality of connection terminals 13C are electrically connected to respective electrodes (not illustrated) of the chips 11A. For example, the terminals "alpha" protrude long on the outer frame substrate 13B side, and protrude short on the supporting substrate 13A side. Moreover, a terminal (hereinafter referred to as terminal "beta" for convenience sake) other than the above-described terminals "alpha" of the plurality of connection terminals 13C is electrically connected to the other electrodes (not illustrated) of all of the chips 11A. For example, the terminal "beta" protrudes long on the outer frame substrate 13B side, and, for example, an end located closer to the supporting substrate 13A of the terminal "beta" is embedded in the supporting substrate 13A. A portion protruding long on the outer frame substrate 13 side of each of the connection terminals 13C corresponds to a portion fit in, for example, a substrate or the like. On the other hand, portions protruding short on the supporting substrate 13A side of the plurality of connection terminals 13C correspond to portions electrically connected to the respective chips 11A through wires 16. Portions embedded in the supporting substrate 13A of the plurality of connection terminals 13C correspond to, for example, portions electrically connected to all of the chips 11A through the supporting substrate 13 and the submount 15. The terminals "alpha" are supported by the insulating through holes formed in the supporting substrate 13A and the outer frame substrate 13B, and are insulated and separated from the supporting substrate 13A and the outer frame substrate 13B by the through holes. Moreover, the terminals "alpha" are insulated and separated from one another by the above-described insulating members. On the other hand, the terminal "beta" is supported by the conductive through holes formed in the supporting substrate 13A and the outer frame substrate 13B, and is electrically connected to the through holes.

The cap 14 seals the solid-state light-emitting device 11. The cap 14 has, for example, a cylindrical section 14A having openings in upper and lower ends thereof. The lower end of the cylindrical section 14A is in contact with, for example, a side surface of the supporting substrate 13A, and the solid-state light-emitting device 11 is disposed in an inner space of the cylindrical section 14A. The cap 14 has a light transmission window 14B which is so disposed as to block the opening on the upper end of the cylindrical section 14A. The light transmission window 14B is disposed in a position facing a light emission surface of the solid-state light-emitting device 11, and has a function of allowing light output from the solid-state light-emitting device 11 to pass therethrough.

Thus, also in the case where the chip 11A is of an edge-emission type, the solid-state light-emitting device 11 emits light from the light emission region including one or more dot-shaped or non-dot-shaped light-emitting spots. The solid-state light-emitting device 11 may include, for example, a single chip 11A emitting light in a predetermined wavelength range, or a plurality of chips 11A emitting light in a same wavelength range or light in wavelength ranges different from one another. In the case where the solid-state light-emitting device 11 includes a plurality of chips 11A, for example, these chips 11A may be arranged in a line in the transverse direction as illustrated in FIGS. 7(A), 7(B), 8(A) and 8(B), or may be arranged, for example, in a line in the longitudinal direction as illustrated in FIGS. 10(A), 10(B), 11(A), and 11(B). The number of chips 11A included in the solid-state light-emitting device 11 may be different in each of the light sources 10A, 10B, and 10C, or may be the same in all of the light sources 10A, 10B, and 10C.

In the case where the solid-state light-emitting device 11 includes the single chip 11A, for example, as illustrated in FIGS. 9(B) and 12(B), the size ($W_V \times W_H$) of the solid-state light-emitting device 11 is equal to the size ($W_{V1} \times W_{H1}$) of the single chip 11A. However, for example, as illustrated in FIGS. 9(C) and 12(C), in the case where the solid-state light-emitting device 1 has a monolithic configuration, the configuration is as described below, and this applies to the following description. Namely, in an example in FIG. 9(C), the size ($W_V \times W_H$) of the solid-state light-emitting device 11 is larger than $W_{V1} \times 2 W_{H1}$, and in an example in FIG. 12(C), the size ($W_V \times W_H$) of the solid-state light-emitting device 11 is larger than $2 W_{V1} \times W_{H1}$. On the other hand, in the case where the solid-state light-emitting device 11 includes a plurality of chips 11A, for example, as illustrated in FIGS. 7(B), 8(B), 10(B), and 11(B), the size of the solid-state light-emitting device 11 is equal to the size of a package into which all of the chips 11A are gathered. In the case where the plurality of chips 11A are arranged in a line in the transverse direction, the size ($W_V \times W_H$) of the solid-state light-emitting device 11 is larger than $W_{V1} \times 3 W_{H1}$ in an example in FIG. 7(B), and is larger than $W_{V1} \times 2 W_{H1}$ in an example in FIG. 8(B). Moreover, in the case where the plurality of chips 11A are arranged in a line in the longitudinal direction, for example, the size ($W_V \times W_H$) of the solid-state light-emitting device 11 is larger than $3 W_{V1} \times W_{H1}$ in an example in FIG. 10(B), and is larger than $2 W_{V1} \times W_{H1}$ in an example in FIG. 11(B).

Each of the chips 11A may be configured of, for example, a laser diode (LD). However, also in this case, as described above, at least one of the chips 11A included in the light sources 10A, 10B, and 10C may be configured of an LD. Moreover, the chips 11A other than the chip 11A configured of the LD may be configured of any of an LED, an OLED, and an LD.

For example, as illustrated in FIGS. 7(A) and 7(B) to FIGS. 12(A), 12(B), and 12(C), each of the chips 11A has a light-emitting spot 11B with a smaller size ($P_{V1} \times P_{H1}$) than the size ($W_V \times W_H$) of the chip 11A. The light-emitting spot 11B corresponds to a region (a light emission region) from which the chip 11A emits light when a current is injected into the chip 11A to drive the chip 11A. In the case where the chip 11A is configured of an LD, the light-emitting spot 11B has a smaller dot shape than the light-emitting spot 11B of the LED or the OLED.

In the case where the solid-state light-emitting device 11 includes a single chip 11A, for example, as illustrated in FIGS. 9(B) and 12(B), the number of light-emitting spots 11B is one. However, for example, as illustrated in FIGS. 9(C) and 12(C), in the case where the solid-state light-emitting device 11 has a monolithic configuration, the number of light-emitting spots 11B is two or more (two in this case), and this applies to the following description. On the other hand, in the case where the solid-state light-emitting device 11 includes a plurality of chips 11A, for example, as illustrated in FIGS. 7(B), 8(B), 10(B), and 11(B), the number of the light-emitting spots 11B is equal to the number of chips 11A. In this case, in the case where the solid-state light-emitting device 11 includes the single chip 11A, the size ($P_V \times P_H$) of the light emission region of the solid-state light-emitting device 11 is equal to the size ($P_{V1} \times P_{H1}$) of the light-emitting spot 11B. However, for example, as illustrated in an example in FIGS. 9(C) and 12(C), in the case where the solid-state light-emitting device 11 has a monolithic configuration, the configuration is as described below, and this applies the following description. Namely, in an example in FIG. 9(C), the size ($P_V \times P_H$) of the light emission region of the solid-state light-emitting device 11 is larger than $P_{V1} \times 2 P_{H1}$, and is smaller than $W_V \times W_H$. Moreover, in an example in FIG. 12(C), the size ($P_V \times P_H$) of the light emission region of the solid-state light-emitting device 11 is larger than $2 P_{V1} \times P_{H1}$, and is smaller than $W_V \times W_H$. On the other hand, in the case where the solid-state light-emitting device 11 includes a plurality of chips 11A, the size ($P_V \times P_H$) of the light emission region of the solid-state light-emitting device 11 is equal to the size of a smallest possible enclosure containing the light-emitting spots 11B of all of the chips 11A. In the case where the plurality of chips 11A are arranged in a line in the transverse direction, in an example in FIG. 7(B), the size ($P_V \times P_H$) of the light emission region is larger than $P_{V1} \times 3 P_{H1}$, and is smaller than $W_V \times W_H$. Likewise, in an example in FIG. 8(B), the size ($P_V \times P_H$) of the light emission region is larger than $P_{V1} \times 2 P_{H1}$, and is smaller than $W_V \times W_H$. Moreover, in the case where the plurality of chips 11A are arranged in a line in the longitudinal direction, in an example in FIG. 10(B), the size ($P_V \times P_H$) of the light emission region is larger than $3 P_{V1} \times P_{H1}$, and is smaller than $W_V \times W_H$. Likewise, in an example in FIG. 11(B), the size ($P_V \times P_H$) of the light emission region is larger than $2 P_{V1} \times P_{H1}$, and is smaller than $W_V \times W_H$.

For example, as illustrated in FIGS. 2(A) and 2(B), the coupling lens 20A converts light emitted from the light source 10A into substantially parallel light, and changes a directivity angle (theta$_H$, theta$_V$) of the light emitted from the light source 10A to be equal to or close to a directivity angle of parallel light. The coupling lens 20A is disposed in a position where light within the directivity angle of the light emitted from the light source 10A enters. For example, as illustrated in FIGS. 2(A) and 2(B), the coupling lens 20B converts light emitted from the light source 10B into substantially parallel light, and changes a directivity angle (theta$_H$, theta$_V$) of the light emitted from the light source 10B to be equal to or close to the directivity angle of parallel light. The coupling lens 20B is disposed in a position where light within the directivity angle of the light emitted from the light source 10B enters. For example, as illustrated in FIGS. 2(A) and 2(B), the coupling lens 20C converts light emitted from the light source 10C into substantially parallel light, and changes a directivity angle (theta$_H$, theta$_V$) of the light emitted from the light source 10C to be equal to or close to the directivity angle of parallel light. The coupling lens 20C is disposed in a position where light within the directivity angle of the light emitted from the light source 10C enters. In other words, the coupling lenses 20A, 20B, and 20C are disposed for the light sources 10A, 10B, and 10C, respectively (for respective packages). It is to be noted that each of the coupling lenses 20A, 20B, and 20C may be configured of a single lens, or a plurality of lenses.

Each of the dichroic mirrors 30A and 30B includes one mirror having wavelength selectivity. It is to be noted that, for example, the above-described mirror is formed through evaporating a multilayer interference film. For example, as illustrated in FIGS. 2(A) and 2(B), the dichroic mirror 30A allows light incident from a back side of the mirror (light incident from the light source 10A) to pass toward a front side of the mirror, and reflects light incident from the front side of the mirror (light incident from the light source 10B) by the mirror. On the other hand, as illustrated in FIGS. 2(A) and 2(B), the dichroic mirror 30B allows light incident from a back side of the mirror (light of the light sources 10A and 10B incident from the dichroic mirror 30A) to pass to a front side of the mirror, and reflects light incident from the front side of the mirror (light incident from the light source 10C) by the mirror. Therefore, the optical path combining device 30 combines respective light fluxes emitted from the light sources 10A, 10B, and 10C into a single light flux.

Figure 13:
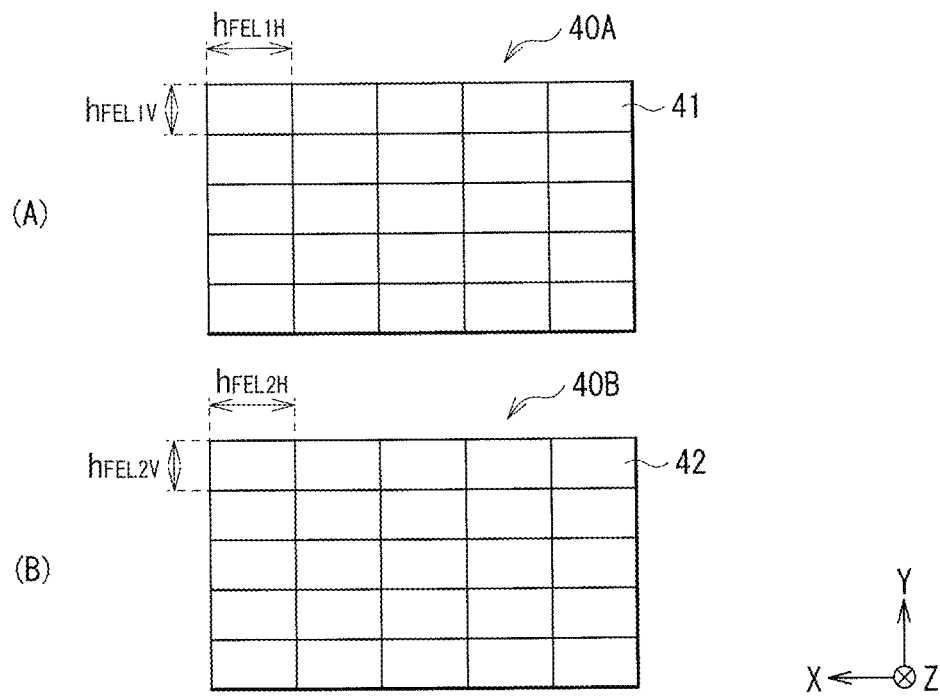
FIGS. 13(A) and 13(B) are diagrams illustrating a schematic configuration of a fly-eye lens in FIG. 1.

For example, as illustrated in FIGS. 13(A) and 13(B), each of the fly-eye lenses 40A and 40B is configured of a plurality of lenses (cells) arranged in a predetermined arrangement (in this case, a matrix of 5 (vertical)×5 (horizontal)). In other words, the cells in each of the fly-eye lens 40A and the fly-eye lens 40B are arranged along respective arrangement directions, that is, the transverse direction (the x-axis direction, a first direction) and the longitudinal direction (the y-axis direction, a second direction) orthogonal to each other. A plurality of respective cells 42 included in the fly-eye lens 40B are so arranged as to face respective cells 41 of the fly-eye lens 40A. The fly-eye lens 40A (a first fly-eye lens) is disposed in a focal position (or a substantial focal position) of the fly-eye lens 40B, and the fly-eye lens 40B is disposed in a focal position (or a substantial focal position) of the fly-eye lens 40A. Therefore, the integrator 40 allows light fluxes formed through separating the single light flux by the fly-eye lens 40A to be focused on proximity to a lens plane on an image side of the fly-eye lens 40B, thereby forming a secondary light source plane (a light source image) thereon. The secondary light source plane is located on a plane conjugate to an entrance pupil of the projection optical system 70. However, the secondary light source plane is not necessarily precisely located on the plane conjugate to the entrance pupil of the projection optical system 70, and may be located within a design allowable region. It is to be noted that the fly-eye lenses 40A and 40B may be integrally formed as one unit.

In general, each of light fluxes emitted from the light sources 10A, 10B, and 10C have a nonuniform intensity distribution (luminance distribution) on a plane perpendicular to a traveling direction thereof. Therefore, when these light fluxes are directly guided to the illumination region 60A (the illuminated surface), an illuminance distribution (a luminance distribution) in the illumination region 60A becomes nonuniform. On the other hand, as described above, when light fluxes emitted from the light sources 10A, 10B, and 10C are separated by the integrator 40 into a plurality of light fluxes, and the plurality of light fluxes are guided to the illumination region 60A in a superimposed manner, the illuminance distribution on the illumination region 60A is allowed to become uniform (nonuniformity of the illumination distribution is allowed to be reduced).

The condenser lens 50 condenses the light fluxes, from light sources, formed by the integrator 40 to illuminate the illumination region 60A with the light fluxes in a superimposed manner.

The spatial modulating device 60 two-dimensionally modulates light fluxes from the illumination optical system 1A based on color image signals corresponding to respective wavelength components of the light sources 10A, 10B, and 10C to generate image light. For example, as illustrated in FIGS. 2(A) and 2(B), the spatial modulating device 60 is a transmissive device, and may be configured of, for example, a transmissive liquid crystal panel.

[Configuration of Characteristic Parts of Projector 1]

Next, characteristic parts of the projector 1 according to this embodiment will be described below.

(First Characteristic Part)

Figure 14:
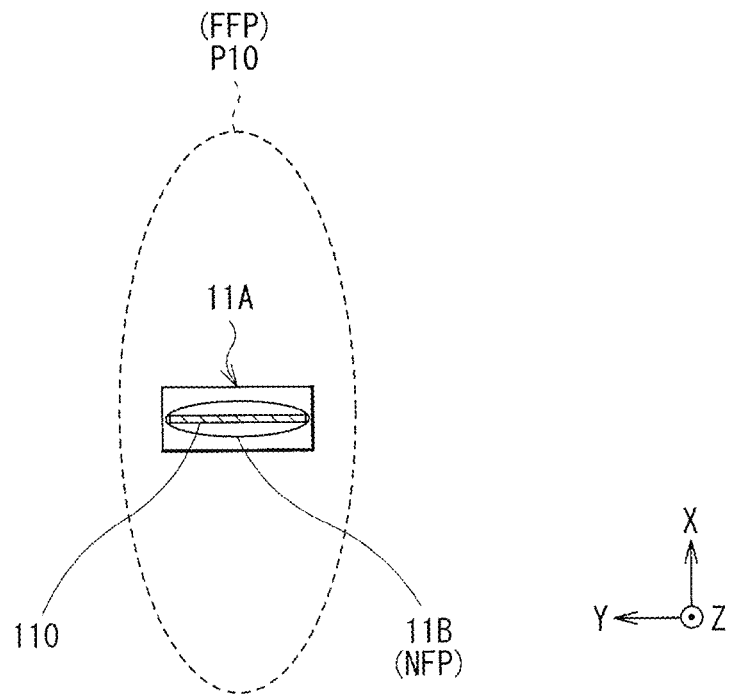
FIG. 14 is a schematic view illustrating configuration examples of a light-emitting spot and an FFP in the light source in FIG. 1.

First, in this embodiment, the chip 11A included in one or two of the light sources 10A, 10B, and 10C is configured of an LD (for example, a semiconductor laser). Therefore, for example, as illustrated in FIG. 14, laser light emitted from the light-emitting spot 11B in the chip 11 configured of the LD has a luminance distribution shape with a steep far-field pattern (FFP). In other words, in this laser light, the FFP has an anisotropic shape (an elliptical shape in this case) (refer to a reference numeral P10 in FIG. 14) rather than a circular (isotropic) shape.

Then, in this embodiment, for example, as illustrated in FIGS. 15(A) and 15(B), a major-axis direction of a shape (luminance distribution shape) of a luminance distribution Lind of light incident on an incident plane (a light incident plane) of the fly-eye lens 40A is different from arrangement directions of the cells 41 of the fly-eye lens 40A. More specifically, each of the major-axis direction and a minor-axis direction of the luminance distribution Lind of the incident light is different from the arrangement directions (the transverse direction (the x-axis direction) and the longitudinal direction (the y-axis direction)) of the cells 41. In other words, as illustrated in FIGS. 15(A) and 15(B), the major-axis direction of the luminance distribution Lind and any (the x-axis direction in this case) of the arrangement directions of the cells 41 are not coincident with each other, and form a predetermined angle (inclination angle or rotation angle) "theta". Therefore, as will be described in detail later, luminance unevenness in incident light is easily reduced in the integrator 40. Moreover, for example, as illustrated in FIG. 15(A), it is preferable that the angle "theta" be set to be substantially equal to (preferably equal to) an angle formed by an entire length (period) in the transverse direction of the fly-eye lens 40A and a size $h_{FEL1V}$ in the longitudinal direction of the cell 41. In other words, the angle "theta" preferably satisfies the following relational expression. Thus, as will be described in detail later, luminance unevenness in incident light is easily reduced in the integrator 40. It is to be noted that, as will be described in detail later (refer to FIGS. 21(A) and 21(B)), the term "shape (luminance distribution shape) of the luminance distribution Lind of incident light" illustrated in FIGS. 15(A), 15(B), and the like refers to a shape of a contour line (isophote) representing a predetermined intensity value (luminance value), and this applies to the following description.

$$\text{"theta"} = \tan^{-1}[h_{FEL1V}/(h_{FEL1H} \times n_H)]$$

where $h_{FEL1H}$ is a size in the first direction of one cell 41 of the fly-eye lens 40A, $h_{FEL1V}$ is a size in the second direction of one cell 41 of the fly-eye lens 40A, and $n_H$ is the number (cell number) of cells 41 arranged along the first direction in the fly-eye lens 40A.

Figure 16:
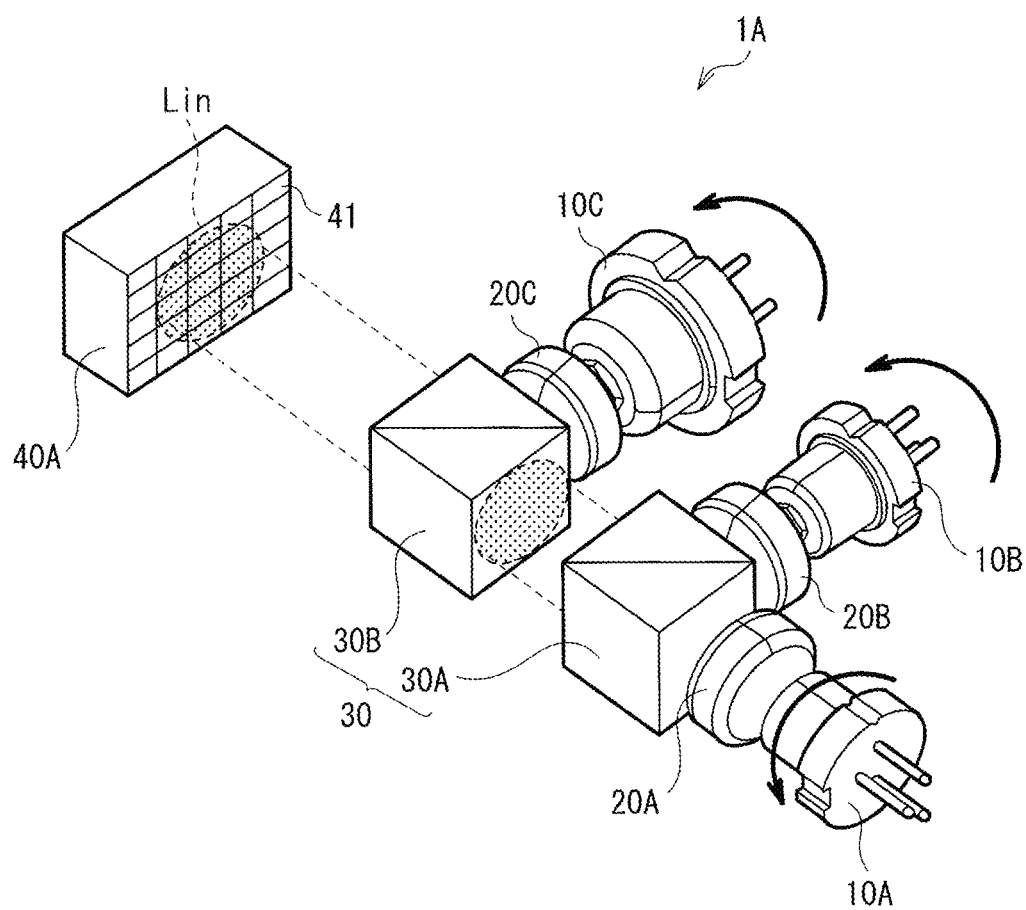
FIG. 16 is a perspective view illustrating a specific configuration example of a main part of an illumination optical system in FIG. 1.

In this case, for example, as illustrated in FIG. 16, inclination (rotation) of the major-axis direction of such a luminance distribution Lind with respect to the arrangement direction of the cells 41 is achievable through inclining (rotating) the light sources 10A, 10B, and 10C, and the like. In other words, the inclination (rotation) of the major-axis direction of the luminance distribution Lind with respect to the arrangement direction of the cells 41 is achievable through rotating the chip 11A itself configured of an LD, rotating the solid-state light-emitting device 11 including the chip 11A configured of an LD, or rotating the light sources 10A, 10B, and 10C, or the like. More specifically, in these cases, the chip 11A configured of an LD is so inclined (rotated) as to allow the major-axis direction (and the minor-axis direction) of an FFP of laser light emitted from the light-emitting spot 11B of the chip 11A configured of an LD to be different from both the longitudinal direction and the transverse direction (the first and second directions) of the fly-eye lens 40A. However, the inclination (rotation) of the major-axis direction of the luminance distribution Lind with respect to the arrangement direction of the cells 41 is not limited to this example, and may be achieved, for example, through inclining (rotating) any other optical member (for example, the coupling lenses 20A, 20B, and 20C, the dichroic mirrors 30A and 30B, or the like) in the illumination optical system 1A.

(Second Characteristic Part)

Moreover, in this embodiment, in a case where a plurality of light-emitting spots 11B are provided to the chip 11A configured of an LD in at least one (a first light source) of the light sources 10A, 10B, and 10C, the following configuration is preferably adopted. In other words, a minor-axis direction of an FFP of light emitted from each of the light-emitting spots 11B is preferably substantially coincident (preferably coincident) with a minor-axis direction (the y-axis direction in this case) in a plane (an xy plane in this case) orthogonal to an optical axis (the z-axis direction in this case) of the above-described optical member (the integrator 40 in this case). In other words, in the above-described first light source, the minor-axis direction of the FFP of light emitted from each of the light-emitting spots 11B is preferably substantially coincident (preferably coincident) with a minor-axis direction of an outer shape (for example, a rectangular enclosure) of the projector 1. Moreover, in a case where the above-described first light source emits light in two or more wavelength ranges different from one another, major-axis directions of FFPs of light in these two or more wavelength ranges emitted from each of the light-emitting spots 11B are preferably substantially coincident (preferably coincident) with one another.

Figure 17:
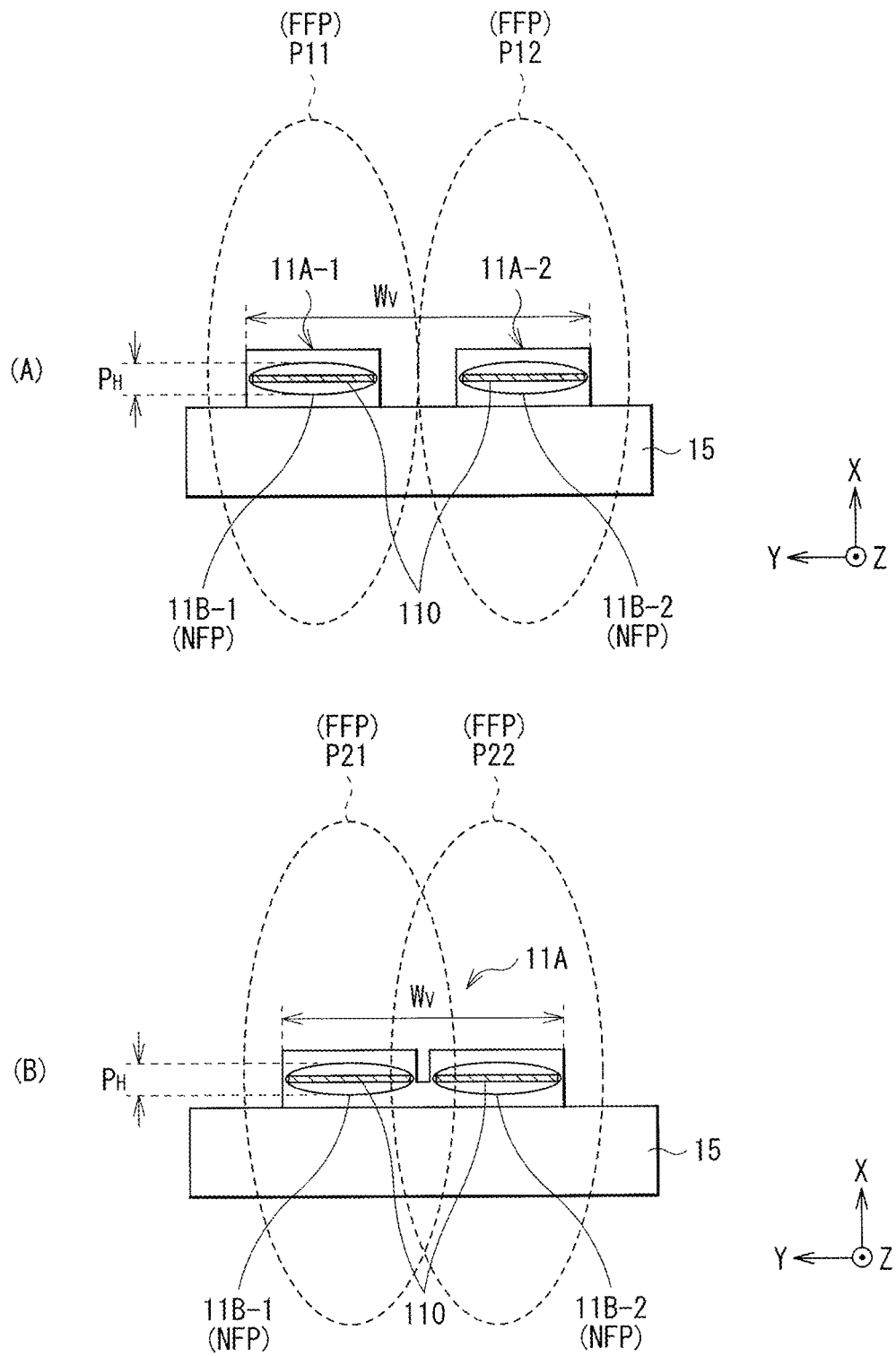
FIGS. 17(A) and 17(B) are schematic views illustrating other configuration examples of the light-emitting spot and the FFP in the light source in FIG. 1.

More specifically, in an example illustrated in FIG. 17(A), in the above-described first light source, two chips 11A-1 and 11A-2 configured of LDs are included, and light-emitting spots (near field patterns; NFPs) 11B-1 and 11B-2 each including an active layer 110 are included accordingly. On the other hand, in an example in FIG. 17(B) (in an example of the above-described monolithic configuration), in the above-described first light source, one chip 11A configured of an LD is included, and two light-emitting spots 11B-1 and 11B-2 are provided to the chip 11A. Then, in this case, light in a same wavelength range or light in wavelength ranges different from each other is emitted from the light-emitting spots 11B-1 and 11B-2. In this case, each of minor-axis directions (the y-axis direction in this case) of FFPs (refer to reference numerals P11, P12, P21, and P22 in the drawings) of light emitted from the light-emitting spots 11B-1 and 11B-2 is coincident with a minor-axis direction (the y-axis direction in this case) in a plane orthogonal to the optical axis of the integrator 40. Moreover, the major-axis directions (the x-axis direction in this case) of the FFPs of light emitted from the light-emitting spots 11B-1 and 11B-2 are coincident with each other.

(Third Characteristic Part)

Figure 18:
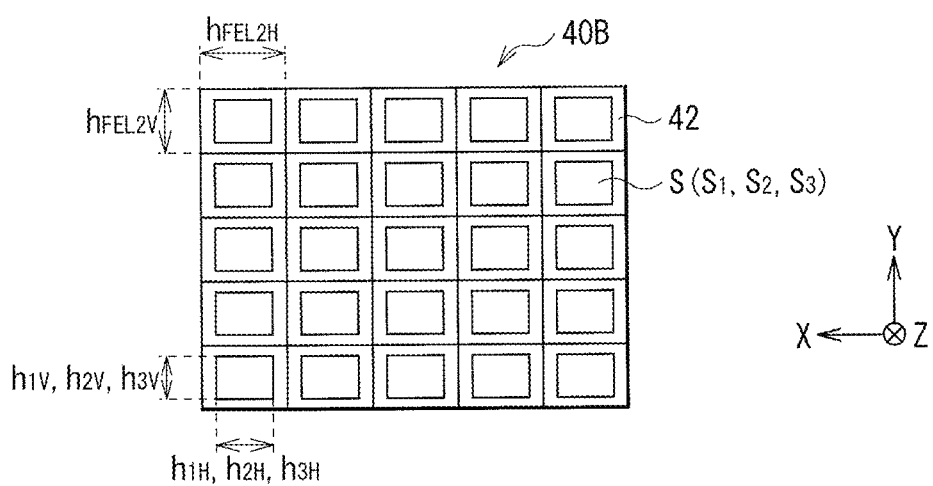
FIG. 18 is a schematic view illustrating an example of a light source image appearing on a fly-eye lens disposed in a following stage in the projector in FIG. 1.

Further, in this embodiment, it is preferable that focal lengths of the coupling lenses 20A, 20B, and 20C and focal lengths of the fly-eye lenses 40A and 40B be so determined as to allow a size of each light source image S formed on the fly-eye lens 40B by each cell 41 of the fly-eye lens 40A not to exceed a size of one cell 42 of the fly-eye lens 40B. This is represented by the following expressions (1) to (3). Moreover, this is as schematically illustrated in FIG. 18. FIG. 18 illustrates an example in which each of the cells of the fly-eye lenses 40A and 40B has a horizontal-to-vertical ratio (aspect ratio) of other than 1. It is to be noted that FIG. 18 will be described in detail later.

$$h_1 = P_1 * (f_{FEL}/f_{CL1}) = / < h_{FEL2} \quad (1)$$

$$h_2 = P_2 * (f_{FEL}/f_{CL2}) = / < h_{FEL2} \quad (2)$$

$$h_3 = P_3 * (f_{FEL}/f_{CL3}) = / < h_{FEL2} \quad (3)$$

where $h_1$ is a size of a light source image S (a light source image $S_1$) formed by light from the light source 10A, $h_2$ is a size of a light source image S (a light source image $S_2$) formed by light from the light source 10B, $h_3$ is a size of a light source image S (a light source image $S_3$) formed by light from the light source 10C, $P_1$ is a size of a light emission region of the solid-state light-emitting device 11 included in the light source 10A, $P_2$ is a size of a light emission region of the solid-state light-emitting device 11 included in the light source 10B, $P_3$ is a size of a light emission region of the solid-state light-emitting device 11 included in the light source 10C, $f_{FEL}$ is a focal length of each of the fly-eye lenses 40A and 40B, $f_{CL1}$ is a focal length of the coupling lens 20A, $f_{CL2}$ is a focal length of the coupling lens 20B, $f_{CL3}$ is a focal length of the coupling lens 20C, and $h_{FEL2}$ is a size of one cell 42 of the fly-eye lens 40B.

It is to be noted that, in a case where the solid-state light-emitting device 11 included in the light source 10A includes a single chip 11A, $P_1$ is equal to the size of the light-emitting spot 11B of the chip 11A. Likewise, in a case where the solid-state light-emitting device 11 included in the light source 10B includes a single chip 11A, $P_2$ is equal to the size of the light-emitting spot 11B of the chip 11A, and in a case where the solid-state light-emitting device 11 included in the light source 10C includes a single chip 11A, $P_3$ is equal to the size of the light-emitting sport 11B of the chip 11A. In a case where the solid-state light-emitting device 11 included in the light source 10A includes a plurality of chips 11A, $P_1$ is equal to a size of a smallest possible enclosure containing the light-emitting spots 11B of all of the chips 11A. Likewise, in a case where the solid-state light-emitting device 11 included in the light source 10B includes a plurality of chips 11A, $P_2$ is equal to the size of the smallest possible enclosure containing the light-emitting spots 11B of all of the chips 11A. In a case where the solid-state light-emitting device 11 included in the light source 10C includes a plurality of chips 11A, $P_3$ is equal to the size of the smallest possible enclosure containing the light-emitting spots 11B. Moreover, in a case where the coupling lens 20A is configured of a plurality of lenses, $f_{CL1}$ is a combined focal length of the lenses. Likewise, in a case where the coupling lens 20B is configured of a plurality of lenses, $f_{CL2}$ is a combined focal length of the lenses. In a case where the coupling lens 20C is configured of a plurality of lenses, $f_{CL3}$ is a combined focal length of the lenses.

Here, as expressions substantially equivalent to the above-described expressions (1) to (3), the following expressions (4) to (6) may be established. The expressions (4) to (6) are specifically useful in a case where the size of the light emission region of the solid-state light-emitting device 11 is substantially equal to the size of the solid-state light-emitting device 11.

$$h_1 = W_1 * (f_{FEL}/f_{CL1}) = / < h_{FEL2} \quad (4)$$

$$h_2 = W_2 * (f_{FEL}/f_{CL2}) = / < h_{FEL2} \quad (5)$$

$$h_3 = W_3 * (f_{FEL}/f_{CL3}) = / < h_{FEL2} \quad (6)$$

where $W_1$ is a size of the solid-state light-emitting device 11 included in the light source 10A, $W_2$ is a size of the solid-state light-emitting device 11 included in the light source 10B, and $W_3$ is a size of the solid-state light-emitting device 11 included in the light source 10C.

It is to be noted that, in a case where the solid-state light-emitting device 11 include a single chip 11A, W is equal to the size of the chip 11A. Moreover, in a case where the solid-state light-emitting device 11 includes a plurality of chips 11A, W is equal to a size of a single chip, where a combination of all of the chips 11A is regarded as the single chip.

Incidentally, in this embodiment, for example, as illustrated in FIGS. 13(A) and 13(B), in a case where each of the cells 41 and 42 of the fly-eye lenses 40A and 40B has a horizontal-to-vertical ratio (aspect ratio) of other than 1, the focal lengths of the coupling lenses 20A, 20B, and 20C and the focal lengths of the fly-eye lenses 40A and 40B preferably satisfy the following six relational expressions (expressions (7) to (12)). Moreover, it is preferable that each of ratios ($f_{CL1H}/f_{CL1V}$, $f_{CL2H}/f_{CL2V}$, and $f_{CL3H}/f_{CL3V}$) (anamorphic ratios) of vertical and horizontal focal lengths of the coupling lenses 20A, 20B, and 20C be equal to an inverse ($h_{FEL2V}/h_{FEL2H}$) of a horizontal-to-vertical ratio of the size of each of the cells 42 of the fly-eye lens 40B, and the illumination optical system 1A adopt an anamorphic optical system. For example, in a case where each of the cells 42 of the fly-eye lens 40B has a long shape in the first direction (for example, the transverse direction), as the coupling lenses 20A, 20B, and 20C, coupling lenses in which the focal lengths $f_{CL1V}$, $f_{CL2V}$, and $f_{CL3V}$ are longer than the focal lengths $f_{CL1H}$, $f_{CL2H}$, and $f_{CL3H}$, respectively, are used. The following expressions (7) to (12) are as schematically illustrated in FIG. 18.

$$h_{1H} = P_{1H} * (f_{FELH}/f_{CL1H}) = / < h_{FEL2H} \quad (7)$$

$$h_{2H} = P_{2H} * (f_{FELH}/f_{CL2H}) = / < h_{FEL2H} \quad (8)$$

$$h_{3H} = P_{3H} * (f_{FELH}/f_{CL3H}) = / < h_{FEL2H} \quad (9)$$

$$h_{1V} = P_{1V} * (f_{FELV}/f_{CL1V}) = / < h_{FEL2V} \quad (10)$$

$$h_{2V} = P_{2V} * (f_{FELV}/f_{CL2V}) = / < h_{FEL2V} \quad (11)$$

$$h_{3V} = P_{3V} * (f_{FELV}/f_{CL3V}) = / < h_{FEL2V} \quad (12)$$

where $h_{1H}$ is a size in the first direction (for example, the transverse direction) of the light source image S (the light source image $S_1$) formed by light from the light source 10A, $h_{2H}$ is a size in the first direction (for example, the transverse direction) of the light source image S (the light source image $S_2$) formed by light from the light source 10B, $h_{3H}$ is a size in the first direction (for example, the transverse direction) of the light source image S (the light source image $S_3$) formed by light from the light source 10C, $h_{1V}$ is a size in the second direction (for example, the longitudinal direction) orthogonal to the first direction of the light source image S (the light source image $S_1$) formed by light from the light source 10A, $h_{2V}$ is a size in the second direction (for example, the longitudinal direction) orthogonal to the first direction of the light source image S (the light source image $S_2$) formed by light from the light source 10B, $h_{3V}$ is a size in the second direction (for example, the longitudinal direction) orthogonal to the first direction of the light source image S (the light source image $S_3$) formed by light from the light source 10C, $P_{1H}$ is a size in the first direction or a direction corresponding thereto of the light emission region of the solid-state light-emitting device 11 included in the light source 10A, $P_{2H}$ is a size in the first direction or a direction corresponding thereto of the light emission region of the solid-state light-emitting device 11 included in the light source 10B, $P_{3H}$ is a size in the first direction or a direction corresponding thereto of the light emission region of the solid-state light-emitting device 11 included in the light source 10C, $P_{1V}$ is a size in the second direction or a direction corresponding thereto of the light emission region of the solid-state light-emitting device 11 included in the light source 10A, $P_{2V}$ is a size in the second direction or a direction corresponding thereto of the light emission region of the solid-state light-emitting device 11 included in the light source 10B, $P_{3V}$ is a size in the second direction or a direction corresponding thereto of the light emission region of the solid-state light-emitting device 11 included in the light source 10C, $f_{FELH}$ is a focal length in the first direction of each of the fly-eye lenses 40A and 40B, $f_{FELV}$ is a focal length in the second direction of the fly-eye lenses 40A and 40B, $f_{CL1H}$ is a focal length in the first direction or a direction corresponding thereto of the coupling lens 20A, $f_{CL2H}$ is a focal length in the first direction or a direction corresponding thereto of the coupling lens 20B, $f_{CL3H}$ is a focal length in the first direction or a direction corresponding thereto of the coupling lens 20C, $f_{CL1V}$ is a focal length in the second direction or a direction corresponding thereto of the coupling lens 20A, $f_{CL2V}$ is a focal length in the second direction or a direction corresponding thereto of the coupling lens 20B, $f_{CL3V}$ is a focal length in the second direction or a direction corresponding thereto of the coupling lens 20C, $h_{FEL2H}$ is a size in the first direction of one cell 42 of the fly-eye lens 40B, and $h_{FEL2V}$ is a size in the second direction of one cell 42 of the fly-eye lens 40B.

As used herein, the term "first direction or a direction corresponding thereto" refers to the first direction in a case where the light sources 10A, 10B, and 10C, and the coupling lenses 20A, 20B, and 20C are arranged along an optical axis of the integrator 40. Meanwhile, the term "first direction or a direction corresponding thereto" refers to a direction corresponding to the first direction in relation to an layout of optical devices arranged along optical paths from the light sources 10A, 10B, and 10C to the integrator 40, in a case where the light sources 10A, 10B, and 10C and the coupling lenses 20A, 20B, and 20C are arranged along an optical path deviated from the optical axis of the integrator 40.

Moreover, the term "second direction or a direction corresponding thereto" refers to the second direction in a case where the light sources 10A, 10B, and 10C, and the coupling lenses 20A, 20B, and 20C are arranged along an optical axis of the integrator 40. Meanwhile, the term "second direction or a direction corresponding thereto" refers to a direction corresponding to the second direction in relation to the layout of optical devices arranged along the optical paths from the light sources 10A, 10B, and 10C to the integrator 40, in a case where the light sources 10A, 10B, and 10C and the coupling lenses 20A, 20B, and 20C are arranged along the optical path deviated from the optical axis of the integrator 40.

It is to be noted that, in a case where the solid-state light-emitting device 11 included in the light source 10A includes a single chip 11A, $P_{1H}$ is equal to a size in the first direction or a direction corresponding thereto of the light-emitting spot 11B of the chip 11A. Likewise, in a case where the solid-state light-emitting device 11 included in the light source 10B includes a single chip 11A, $P_{2H}$ is equal to a size in the first direction or a direction corresponding thereto of the light-emitting spot 11B of the chip 11A. In a case where the solid-state light-emitting device 11 included in the light source 10C includes a single chip 11A, $P_{3H}$ is equal to a size in the first direction or a direction corresponding thereto of the light-emitting spot 11B of the chip 11A. Moreover, in a case where the solid-state light-emitting device 11 included in the light source 10A includes a plurality of chips 11A, $P_{1H}$ is equal to a size in the first direction or a direction corresponding thereto of a smallest possible enclosure containing the light-emitting spots 11B of all of the chips 11A. Likewise, in a case where the solid-state light-emitting device 11 included in the light source 10B includes a plurality of chips 11A, $P_{2H}$ is equal to a size in the first direction or a direction corresponding thereto of a smallest possible enclosure containing the light-emitting spots 11B of all of the chips 11A. In a case where the solid-state light-emitting device 11 included in the light source 10C includes a plurality of chips 11A, $P_{3H}$ is equal to a size in the first direction or a direction corresponding thereto of a smallest possible enclosure containing the light-emitting spots 11B of all of the chips 11A. Meanwhile, in a case where the solid-state light-emitting device 11 included in the light source 10A includes a single chip 11A, $P_{1V}$ is equal to a size in the second reaction or a direction corresponding thereto of the light-emitting spot 11B of the chip 11. Likewise, in a case where the solid-state light-emitting device 11 included in the light source 10B includes a single chip 11A, $P_{2V}$ is equal to a size in the second direction or a direction corresponding thereto of the light-emitting spot 11B of the chip 11A. In a case where the solid-stage light-emitting device 11 included in the light source 10C includes a single chip 11A, $P_{3V}$ is equal to a size in the second direction or a direction corresponding thereto of the light-emitting spot 11B of the chip 11A. Moreover, in a case where the solid-state light-emitting device 11 included in the light source 10A includes a plurality of chips 11A, $P_{1V}$ is equal to a size in the second direction or a direction corresponding thereto of a smallest possible enclosure containing the light-emitting spots 11B of all of the chips 11A. Likewise, in a case where the solid-state light-emitting device 11 included in the light source 10B includes a plurality of chips 11A, $P_{2V}$ is equal to a size in the second direction or a direction corresponding thereto of a smallest possible enclosure containing the light-emitting spots 11B of all of the chips 11A. In a case where the solid-state light-emitting device 11 included in the light source 10C includes a plurality of chips 11A, $P_{3V}$ is equal to a size in the second direction or a direction corresponding thereto of a smallest possible enclosure containing the light-emitting spots 11B of all of the chips 11A.

Figure 19:
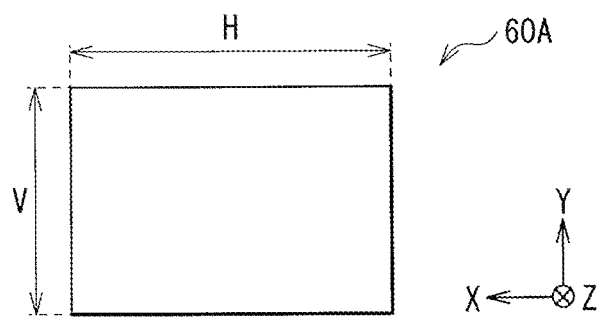
FIG. 19 is a schematic view for describing a size of an illumination region in FIG. 1.

Further, in this embodiment, in a case where each of the cells 41 and 42 of the fly-eye lenses 40A and 40B has a horizontal-to-vertical ratio of other than 1, a horizontal-to-vertical ratio of the size of each of the cells 41 of the fly-eye lens 40A and a horizontal-to-vertical ratio of the illumination region 60A preferably satisfy the following relational expression (an expression (13)). Herein, a horizontal-to-vertical ratio H/V (refer to FIG. 19) of the illumination region 60A has a correlation with resolution of the spatial modulating device 50, and in a case where the resolution of the spatial modulating device 60 is VGA (640*480), the horizontal-to-vertical ratio H/V is 640/480, and for example, in a case where the resolution of the spatial modulating device 60 is WVGA (800*480), the horizontal-to-vertical ratio H/V is 800/480.

$$h_{FEL1H}/h_{FEL1V}=H/V \quad (13)$$

where $h_{FEL1H}$ is a size in the first direction of one cell of the fly-eye lens 40A, $h_{FEL1V}$ is a size in the second direction of one cell of the fly-eye lens 40A, H is a size in the first direction of the illumination region 60A, and V is a size in the second direction of the illumination region 60A.

(Fourth Characteristic Part)

In addition, in this embodiment, the focal lengths and numerical apertures of the coupling lenses 20A, 20B, and 20C are preferably so determined as to allow a beam size of light incident on each of the coupling lenses 20A, 20B, and 20C not to exceed the size of each of the coupling lenses 20A, 20B, and 20C. This is represented by the following expressions (14) to (16).

$$phi_{CL1}=2*f_{CL1}*NA_1=/<h_{CL1} \quad (14)$$

$$phi_{CL2}=2*f_{CL2}*NA_2=/<h_{CL2} \quad (15)$$

$$phi_{CL3}=2*f_{CL3}*NA_3=/<h_{CL3} \quad (16)$$

where $phi_{CL1}$ is a beam size of light incident on the coupling lens 20A, $phi_{CL2}$ is a beam size of light incident on coupling lens 20B, $phi_{CL3}$ is a beam size of light incident on the coupling lens 20C, $NA_1$ is a numerical aperture of the coupling lens 20A, $NA_2$ is a numerical aperture of the coupling lens 20B, $NA_3$ is a numerical aperture of the coupling lens 20C, $h_{CL1}$ is a size of the coupling lens 20A, $h_{CL2}$ is a size of the coupling lens 20B, and $h_{CL3}$ is a size of the coupling lens 20C.

Incidentally, in this embodiment, in a case where each of the coupling lenses 20A, 20B, and 20C has a horizontal-to-vertical ratio (aspect ratio) of other than 1, the focal lengths and the numerical apertures of the coupling lenses 20A, 20B, and 20C preferably satisfy the following relational expressions (expressions (17) to (22)).

$$phi_{CL1H}=2*f_{CL1H}*NA_{1H}=/<h_{CL1H} \quad (17)$$

$$phi_{CL2H}=2*f_{CL2H}*NA_{2H}=/<h_{CL2H} \quad (18)$$

$$phi_{CL3H}=2*f_{CL3H}*NA_{3H}=/<h_{CL3H} \quad (19)$$

$$phi_{CL1V}=2*f_{CL1V}*NA_{1V}=/<h_{CL1V} \quad (20)$$

$$phi_{CL2V}=2*f_{CL2V}*NA_{2V}=/<h_{CL2V} \quad (21)$$

$$phi_{CL3V}=2*f_{CL3V}*NA_{3V}=/<h_{CL3V} \quad (22)$$

where $phi_{CL1H}$ is a beam size in the first direction (for example, the transverse direction) or a direction corresponding thereto of light incident on the coupling lens 20A, $phi_{CL2H}$ is a beam size in the first direction (for example, the transverse direction) or a direction corresponding thereto of light incident on the coupling lens 20B, $phi_{CL3H}$ is a beam size in the first direction (for example, the transverse direction) or a direction corresponding thereto of light incident on the coupling lens 20C, $phi_{CL1V}$ is a beam size in the second direction (for example, the longitudinal direction) or a direction corresponding thereto of light incident on the coupling lens 20A, $phi_{CL2V}$ is a beam size in the second direction (for example, the longitudinal direction) or a direction corresponding thereto of light incident on the coupling lens 20B, $phi_{CL3V}$ is a beam size in the second direction (for example, the longitudinal direction) or a direction corresponding thereto of light incident on the coupling lens 20C, $NA_{1H}$ is a numerical aperture in the first direction or a direction corresponding thereto of the coupling lens 20A, $NA_{2H}$ is a numerical aperture in the first direction or a direction corresponding thereto of the coupling lens 20B, $NA_{3H}$ is a numerical aperture in the first direction or a direction corresponding thereto of the coupling lens 20C, $NA_{1V}$ is a numerical aperture in the second direction or a direction corresponding thereto of the coupling lens 20A, $NA_{2V}$ is a numerical aperture in the second direction or a direction corresponding thereto of the coupling lens 20B, $NA_{3V}$ is a numerical aperture in the second direction or a direction corresponding thereto of the coupling lens 20C, $h_{CL1H}$ is a size in the first direction or a direction corresponding thereto of the coupling lens 20A, $h_{CL2H}$ is a size in the first direction or a direction corresponding thereto of the coupling lens 20B, $h_{CL3H}$ is a size in the first direction or a direction corresponding thereto of the coupling lens 20C, $h_{CL1V}$ is a size in the second direction or a direction corresponding thereto of the coupling lens 20A, $h_{CL2V}$ is a size in the second direction or a direction corresponding thereto of the coupling lens 20B, and $h_{CL3V}$ is a size in the second direction or a direction corresponding thereto of the coupling lens 20C.

(Functions and Effects of Projector 1)

Next, functions and effects of the projector 1 according to this embodiment will be described below.

First, in this embodiment, at least one of the chips 11A included in the light sources 10A, 10B, and 10C is configured of an LD. Therefore, for example, as illustrated in FIG. 14, laser light emitted from the light-emitting spot 11B in the chip 11A configured of the LD has a luminance distribution shape (an elliptical shape in this case) with a steep (anisotropic) FFP.

Moreover, in this embodiment, for example, as illustrated in FIGS. 15(A) and 15(B), the major-axis direction of the shape of the luminance distribution Lind of light incident on the incident plane of the fly-eye lens 40A is different from the arrangement directions of the cells 41. More specifically, each of the major-axis direction and the minor-axis direction of the luminance distribution Lind of the incident light is different from the arrangement directions (the transverse direction (the x-axis direction) and the longitudinal direction (the y-axis direction)) of the cells 41. Then, for example, as illustrated in FIG. 16, inclination (rotation) of the major-axis direction of such a luminance distribution Lind with respect to the arrangement direction of the cells 41 is achieved through inclining (rotating) the light sources 10A, 10B, and 10C, and the like. More specifically, the chip 11A configured of an LD is so inclined (rotated) as to allow the major-axis direction (and the minor-axis direction) of the FFP of the laser light emitted from the light-emitting spot 11B of the chip 11A configured of an LD to be different from both the longitudinal direction and the transverse direction of the fly-eye lens 40A.

Figure 20:
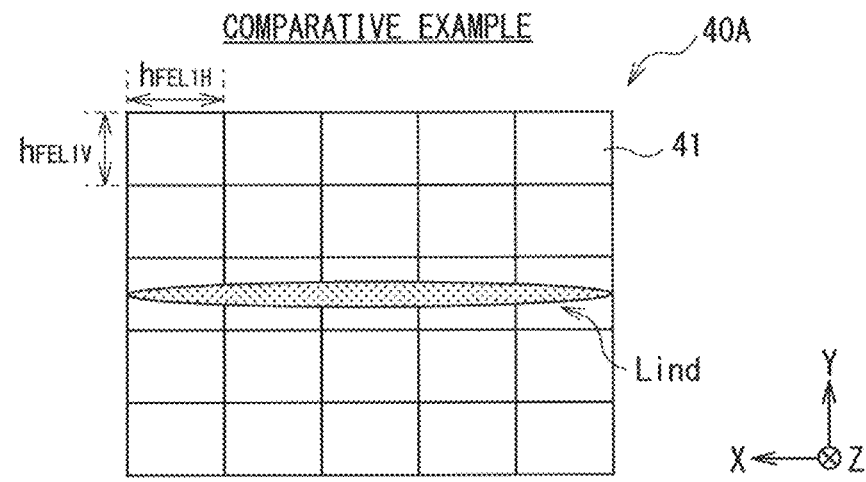
FIG. 20 is a schematic view illustrating a luminance distribution of light incident on a fly-eye lens in a preceding stage in a projector according to a comparative example.
Figure 21:
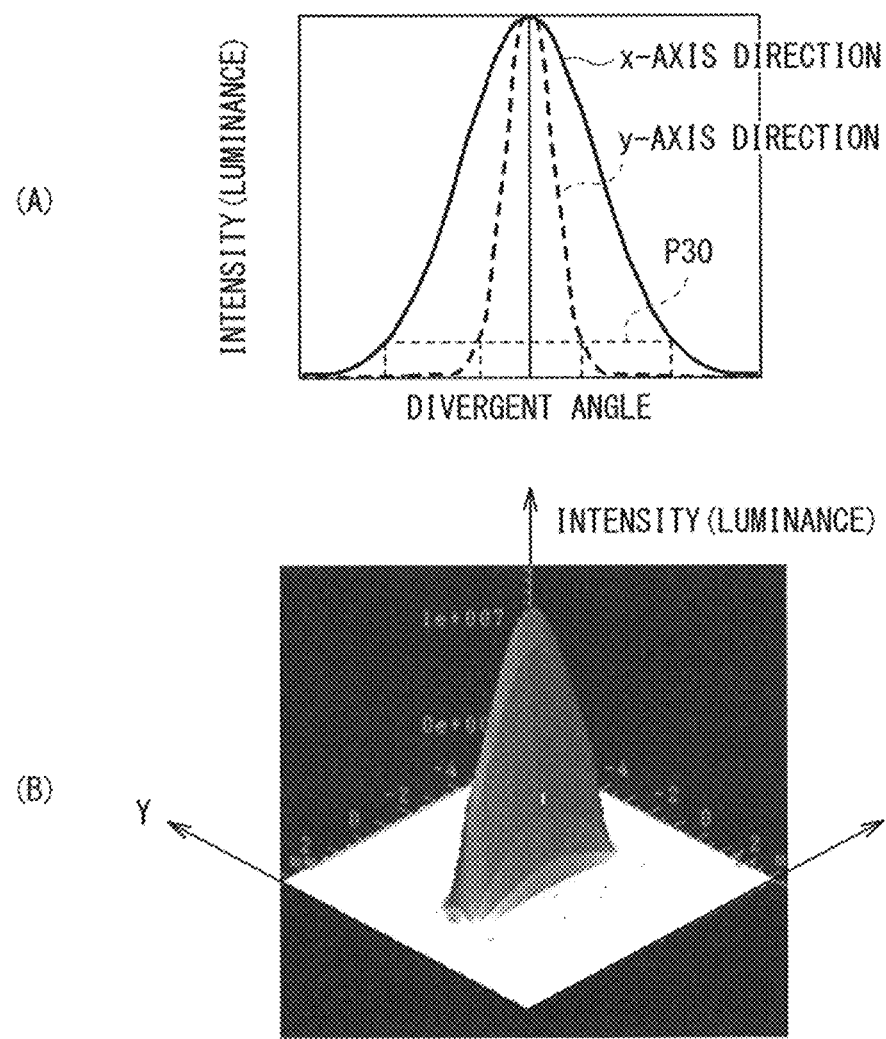
FIGS. 21(A) and 21(B) are characteristic diagrams for describing details of the luminance distribution illustrated in FIG. 20.

On the other hand, in a projector according to a comparative example, for example, as illustrated in FIG. 20, the major-axis direction of the shape of the luminance distribution Lind of light incident on the incident plane of the fly-eye lens 40A is coincident with the arrangement direction (the transverse direction (the x-axis direction) in this case) of the cells 41 in the fly-eye lens 40A. In other words, unlike this embodiment illustrated in FIGS. 15(A) and 15(B), the major-axis direction of the luminance distribution Lind and any (the x-axis direction in this case) of the arrangement directions of the cells 41 does not form the predetermined angle "theta" (where "theta"=0 deg). As used herein, the term "shape (luminance distribution shape) of the luminance distribution Lind of incident light" illustrated in FIGS. 15(A), 15(B), 20, and the like refers to a shape of a contour line (isophote) representing a predetermined intensity value (luminance value). More specifically, in a case where laser light emitted from the light-emitting spot 11B of the chip 11A configured of an LD has, for example, a steep luminance distribution as illustrated in FIGS. 21(A) and 21(B), the shape (luminance distribution shape) of the luminance distribution Lind of incident light corresponds to a shape of an isophote with a luminance value indicated by a reference numeral P30 in FIG. 21(A).

Figure 22:
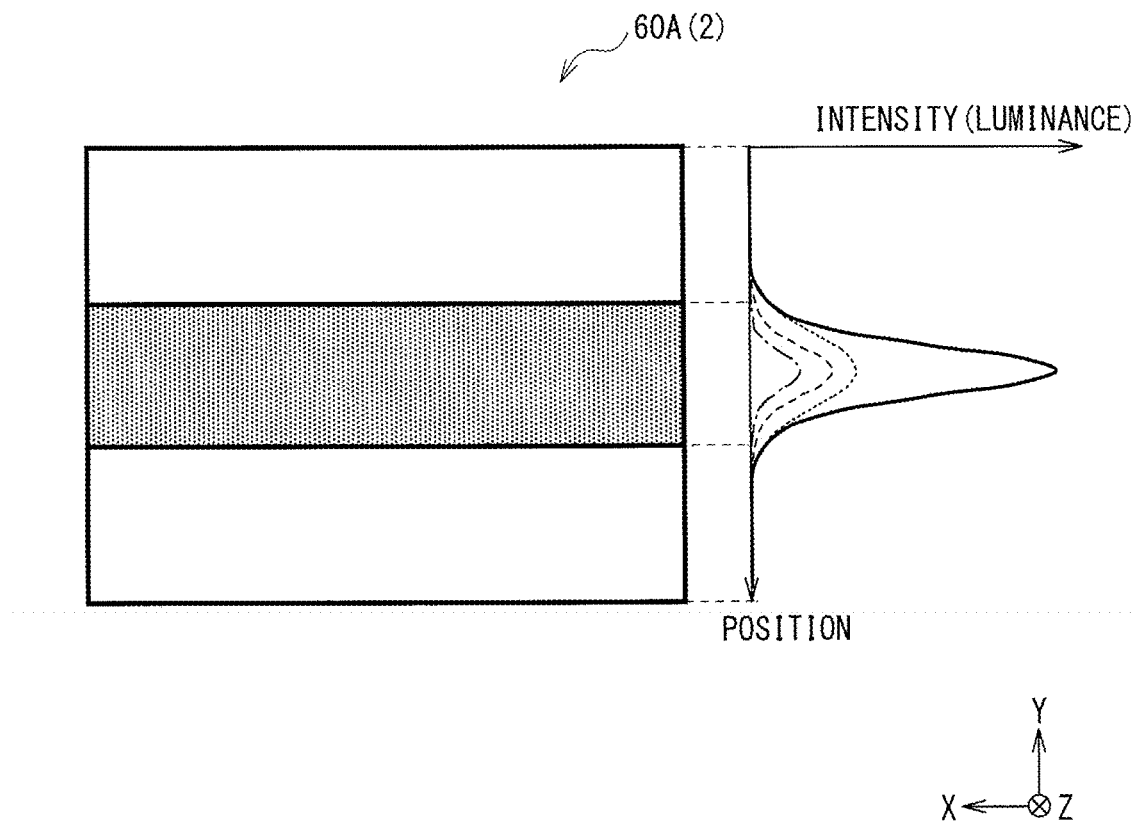
FIG. 22 is a diagram illustrating an example of luminance unevenness caused in a projector according to a comparative example.

In the projector according to such a comparative example, as described above, the following issue may occur due to a steep luminance distribution shape of laser light emitted from the light-emitting spot 11B of the chip 11A configured of an LD (for example, due to the FFP not having a circular (isotropic) shape (for example, having an elliptical shape)). In other words, in a case where the laser light has a too steep luminance distribution shape (for example, in a case where the luminance distribution shape is steeper than the size of each of the cells 41 an 42 of the fly-eye lenses 40A and 40B), luminance unevenness of illumination light (incident light) may not be sufficiently reduced even by a function of the integrator 40 (the luminance distribution may not be uniformized). In this case, for example, as illustrated in FIG. 22, luminance unevenness in illumination light and image light (display light) occurs on the illumination region 60A and on the screen 2; therefore, display image quality may be degraded.

On the other hand, in this embodiment, as described above, the major-axis direction of the luminance distribution Lind of light incident on the incident plane of the fly-eye lens 40A is different from the arrangement directions of the cells 41 of the fly-eye lens 40A. Therefore, even if laser light emitted from a light source including the chip 11A configured of an LD has a steep luminance distribution shape (for example, the FFP does not have a circular (isotropic) shape (for example, the FFP has an elliptical shape), luminance unevenness in incident light is easily reduced in the integrator 40. More specifically, for example, as illustrated in FIG. 23(A), the fly-eye lens 40A performs a light superimposition function in a plurality of cells 41 including the shape of the luminance distribution Lind of incident light; therefore, for example, as illustrated in FIG. 23(B), luminance unevenness in illumination light and display light is effectively reduced. In other words, compared to the above-described comparative example, luminance unevenness in illumination light and display light is reduced (in this example, the occurrence of luminance unevenness is avoided), and in this embodiment, display image quality is improvable accordingly.

In particular, in a case where the angle "theta" that the major-axis direction of the luminance distribution Lind of incident light and any (the x-axis direction in this case) of the arrangement directions of the cells 41 form satisfies a relational expression "theta"=$\tan^{-1}[h_{FEL1V}/(h_{FEL1H} \times n_H)]$, luminance unevenness in illumination light and display light is allowed to be effectively reduced. It is because, in a case where the luminance distribution Lind of incident light extends over a plurality of cells 41 along the longitudinal direction in the entire length (period) in the transverse direction of the fly-eye lens 40A, a same luminance distribution pattern is repeated, and an effect of reducing luminance unevenness is not allowed to be maximized.

Figures 23, 24:
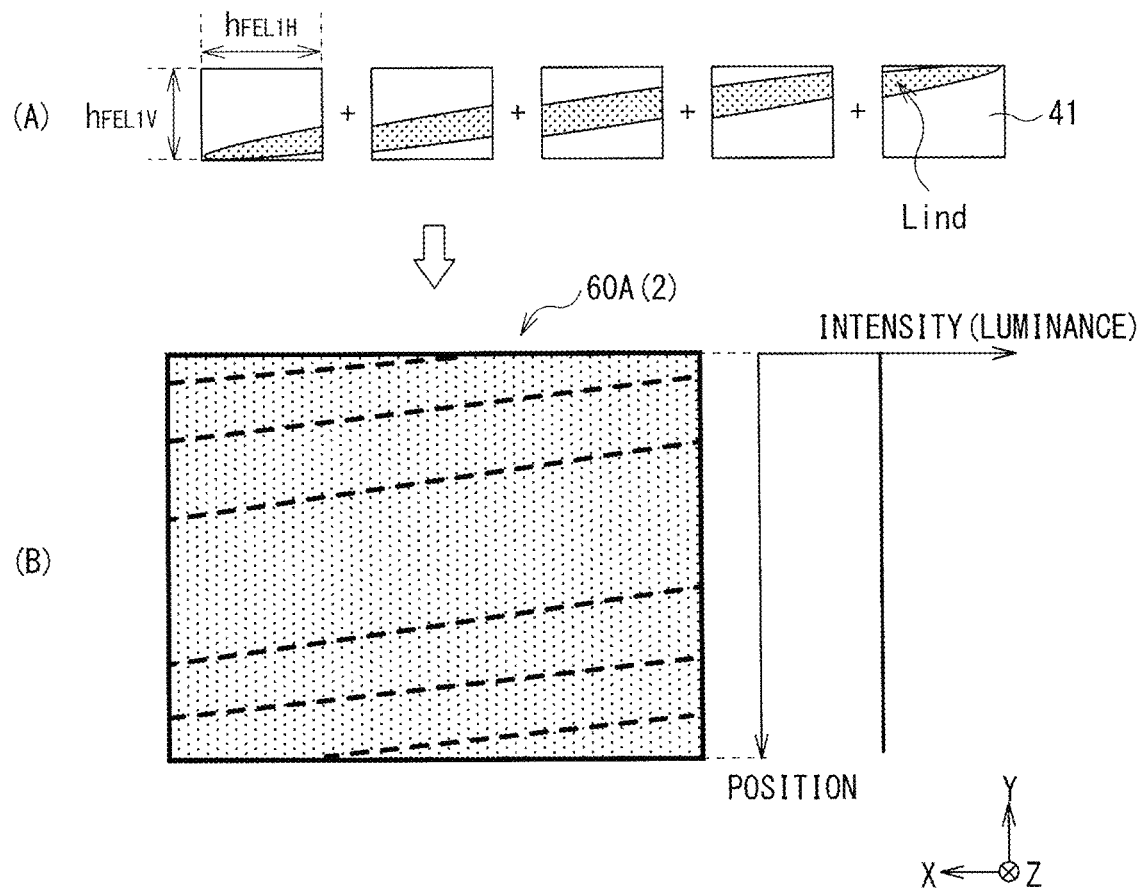
FIG. 24 is a diagram illustrating a characteristic example according to an example of the first embodiment.

FIG. 24 illustrates an example of respective characteristics (a relationship between an aspect ratio in the illumination region 60A and the above-described respective parameters $n_H$, $h_{FEL1H}$, $h_{FEL1V}$, and "theta") in examples of this embodiment. It is found out from these examples that, when the angle "theta" is about 2.7° to about 7.1°, the effect of reducing luminance unevenness is maximized in the integrator 40.

Moreover, in this embodiment, for example, as illustrated in FIGS. 17(A) and 17(B), when the following configuration is adopted in a case where a plurality of light-emitting spots 11B are provided to the chip 11A configured of an LD in at least one (the first light source) of the light sources 10A, 10B, and 10C, the following functions and effects are produced. Namely, first, in a case where a minor-axis direction of an FFP of light emitted from each of the light-emitting spots 11B is substantially coincident with a minor-axis direction in a plane orthogonal to the optical axis of the integrator 40, the minor-axis direction of the outer shape of the projector 1 and the minor-axis direction of the above-described FFP are substantially coincident with each other; therefore, downsizing of the entire projector 1 is achievable. Moreover, in a case where the above-described light source is a light source which emits light in two or more wavelength ranges different from one another, and the major-axis directions of the FFPs of light in these two or more wavelength ranges emitted from each of the light-emitting spots 11B are substantially correspondent with one another, light loss is reduced with use of, for example, a lens cut into an "I"-letter like shape. More specifically, when the lens cut into the "I"-letter like shape is used, even though an optical effective range in a portion removed through cutting the lens into the "I"-letter like shape is sacrificed, light loss is allowed to be reduced through aligning a major-axis direction of an emission angle of the LD with a direction where the lens is cut (a direction where an effective diameter is wide).

Further, in this embodiment, for example, as illustrated in FIG. 18, in a case where the focal lengths $f_{CL1}$, $f_{CL2}$, and $f_{CL3}$ of the coupling lenses 20A, 20B, and 20C and the focal lengths $f_{FEL}$ of the fly-eye lenses 40A and 40B are so determined as to allow the size of each light source image S formed on the fly-eye lens 40B by each cell 41 of the fly-eye lens 40A not to exceed the size of one cell 42 of the fly-eye lens 40B, the following functions and effects are produced. In this case, the solid-state light-emitting device 11 emits light from a light emission region including one or more dot-shaped or non-dot-shaped light-emitting spots, and is configured of, for example, one or more light-emitting diodes, one or more organic EL light-emitting diodes, or one or more laser diodes. Therefore, even if the fly-eye lens 40B is disposed in the focal position of the fly-eye lens 40A, each light source image S formed on the fly-eye lens 40B by each cell of the fly-eye lens 40A does not have a dot shape, but has a certain size (refer to FIG. 18). However, in this embodiment, one light source image S is not formed over a plurality of cells, therefore, light incident on the fly-eye lens 40B efficiently reaches the illumination region. Thus, light use efficiency in the illumination optical system 1A is improvable.

In addition, in this embodiment, in a case where each of the cells of the fly-eye lenses 40A and 40B has a horizontal-to-vertical ratio of other than 1, and the focal lengths $f_{CL1H}$, $f_{CL2H}$, $f_{CL3H}$, $f_{CL1V}$, $f_{CL2V}$, and $f_{CL3V}$ of the coupling lenses 20A, 20B, and 20C and the focal lengths $f_{FELH}$ and $f_{FELV}$ of the fly-eye lenses 40A and 40B are determined in consideration of the horizontal-to-vertical ratio, light use efficiency in the illumination optical system 1A is further improvable. Moreover, in this embodiment, in a case where each of the coupling lenses 20A, 20B, and 20C has a horizontal-to-vertical ratio of other than 1, and the focal lengths $f_{CL1H}$, $f_{CL2H}$, $f_{CL3H}$, $f_{CL1V}$, $f_{CL2V}$, and $f_{CL3V}$ and the numerical apertures $NA_{1H}$, $NA_{2H}$, $NA_{3H}$, $NA_{1V}$, $NA_{2V}$ and $NA_{3V}$ of the coupling lenses 20A, 20B, and 20C are determined in consideration of the horizontal-to-vertical ratio, light use efficiency in the illumination optical system 1A is further improvable. Further, in this embodiment, in a case where directivity angles of the light sources 10A, 10B, and 10C are different from one another, and the focal lengths $f_{CL1H}$, $f_{CL2H}$, $f_{CL3H}$, $f_{CL1V}$, $f_{CL2V}$, and $f_{CL3V}$ and the numerical apertures $NA_{1H}$, $NA_{2H}$, $NA_{3H}$, $NA_{1V}$, $NA_{2V}$ and $NA_{3V}$ of the coupling lenses 20A, 20B, and 20C are determined in consideration of the respective directivity angles, light use efficiency in the illumination optical system 1A is further improvable.

Next, other embodiments (second to fifth embodiments) of the present disclosure will be described below. It is to be noted that like components are denoted by like numerals as of the above-described first embodiment and will not be further described.

Second Embodiment

Figure 25:
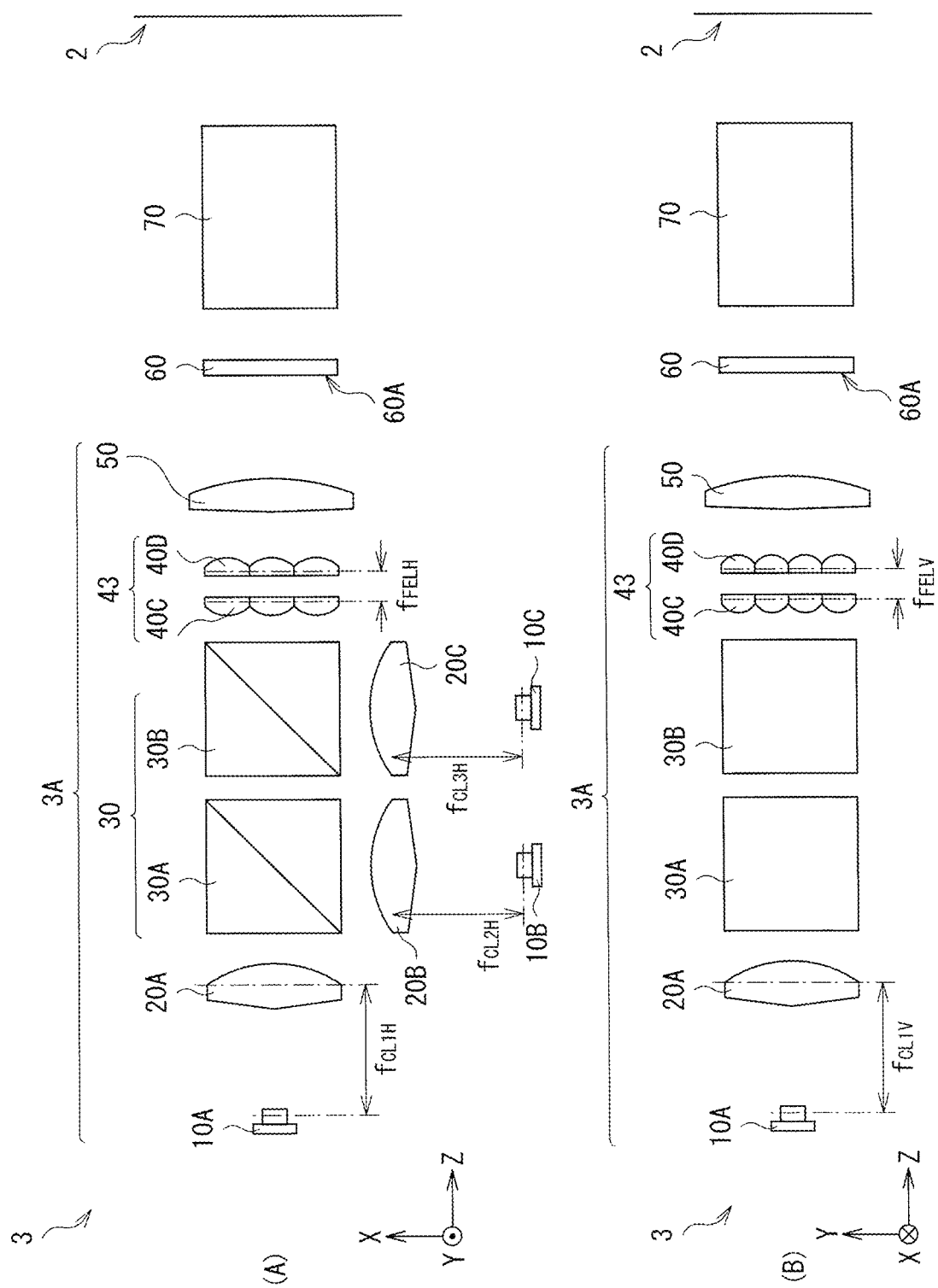
FIGS. 25(A) and 25(B) are diagrams illustrating a schematic configuration of a projector according to a second embodiment.

FIG. 25 illustrates a schematic configuration of a projector (a projector 3) according to the second embodiment. It is to be noted that the projector 3 corresponds to a specific example of "projection display unit" in the present disclosure. FIG. 25(A) illustrates a configuration example of the projector 3 when viewed from above (from the y-axis direction), and FIG. 25(B) illustrates a configuration example of the projector 3 when viewed from a side thereof (from the x-axis direction).

The projector 3 according to this embodiment is different from the projector 1 including the illumination optical system 1A in that the projector 3 includes an illumination optical system 3A. Description will be given of, mainly, points different from the projector 1, and points common to the projector 1 will not be further described. It is to be noted that the illumination optical system 3A corresponds to a specific example of "illumination unit" in the present disclosure.

(Configuration of Illumination Optical System 3A)

The illumination optical system 3A includes an integrator 43 including a pair of fly-eye lenses 40C and 40D, instead of the integrator 40 including a pair of fly-eye lenses 40A and 40B in the illumination optical system 1A. More specifically, the illumination optical system 3A includes the fly-eye lenses 40C and 40D which will be described below, instead of the fly-eye lenses 40A and 40B in the illumination optical system 1A. It is to be noted that cells 41 and 42 of the fly-eye lenses 40C and 40D are arranged corresponding to each other; therefore, the fly-eye lens 40C will be described below as a representative.

Figure 26:
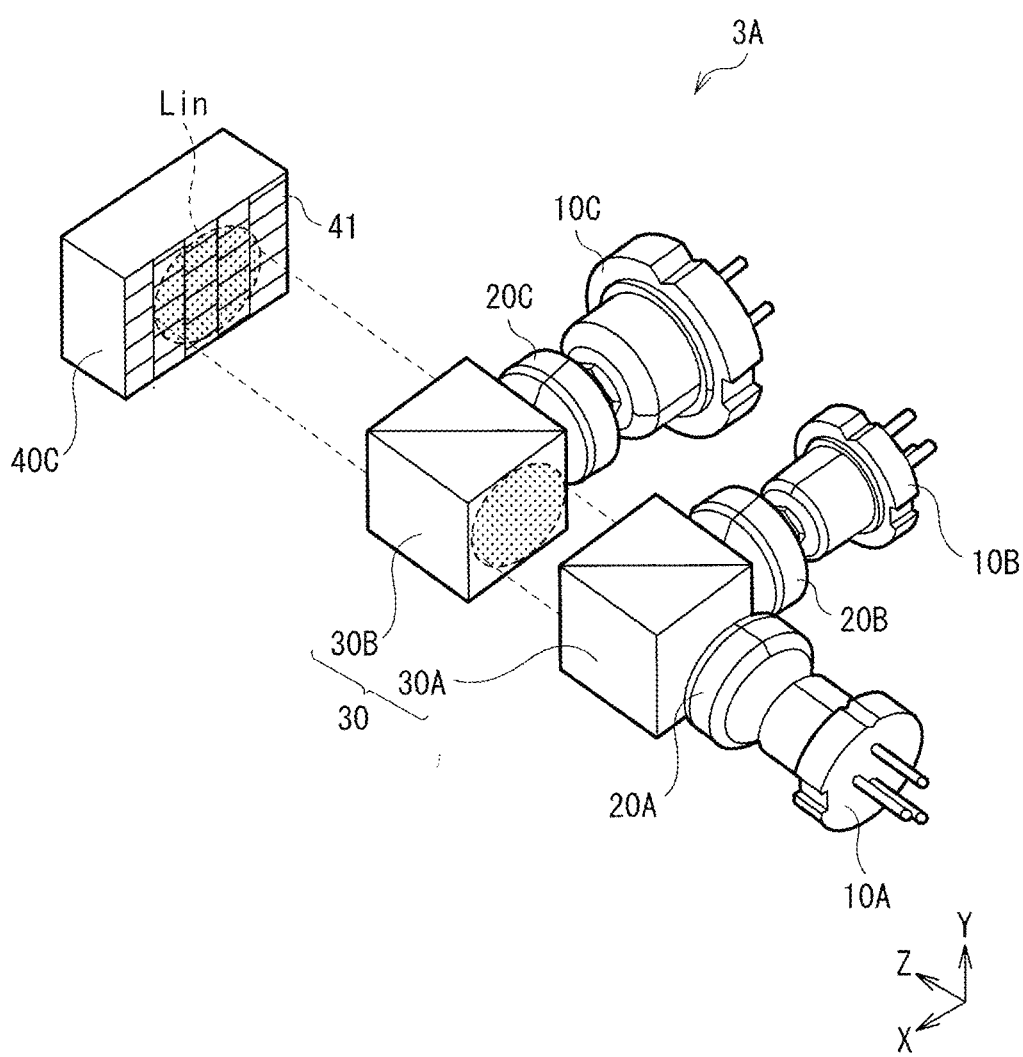
FIG. 26 is a perspective view illustrating a specific configuration example of a main part of the illumination optical system in FIG. 25.

For example, as illustrated in FIG. 26, the illumination optical system 3A is different from the illumination optical system 1A (refer to FIG. 16) in that the light sources 10A, 10B, and 10C and other optical members are not inclined (rotated). Therefore, in the illumination optical system 3A, for example, as illustrated in FIG. 27, unlike the illumination optical system 1A (refer to FIGS. 15(A) and 15(B)) (as with the comparative example illustrated in FIG. 20), in the fly-eye lens 40C, the major-axis direction of the luminance distribution Lind of incident light and the arrangement directions of the cells 41 are not inclined (rotated).

Figure 27:
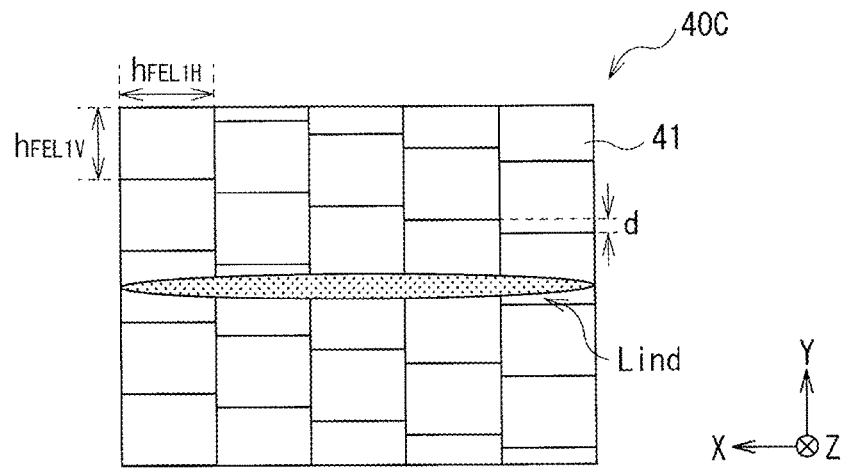
FIG. 27 is a schematic view illustrating a specific configuration example of a fly-eye lens disposed in a preceding stage illustrated in FIG. 26.

However, in the fly-eye lens 40C in the illumination optical system 3A, for example, as illustrated in FIG. 27, positions of the cells 41 along the longitudinal direction (the y-axis direction, the second direction) in at least some of a plurality of cell columns along the transverse direction (the x-axis direction, the first direction) are different from one another. In other words, the fly-eye lens 40C in this embodiment has a shift configuration in which the cell columns are shifted from one another along the minor-axis direction (the longitudinal direction) orthogonal to the major-axis direction (the transverse direction) of the luminance distribution Lind of incident light. More specifically, in an example illustrated in FIG. 27, positions of the cells 41 along the transverse direction in adjacent cell columns of the plurality of cell columns along the longitudinal direction are shifted in a same direction (by a shift amount: d). At this time, the shift amount d between the adjacent cell columns preferably satisfies the following relational expression.

$$d=(h_{FEL1V}/n_H)$$

where $h_{FEL1V}$ is a size in the second direction of one cell 41 in the fly-eye lens 40C, and $n_H$ is the number (cell number) of cells 41 along the first direction in the fly-eye lens 40C.

(Functions and Effects of Projector 3)

Figure 28:
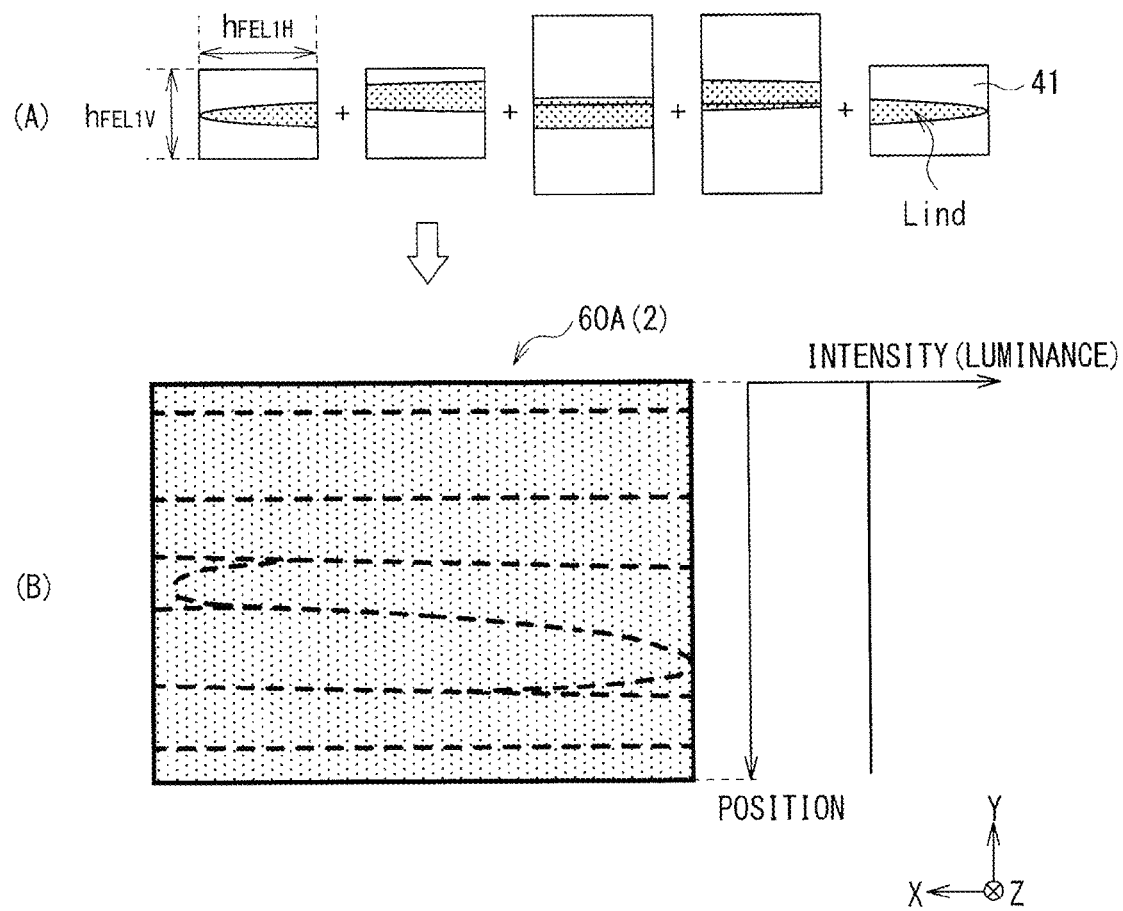
FIGS. 28(A) and 28(B) are diagrams for describing a luminance unevenness reduction function in the illumination optical system according to the second embodiment.

In this embodiment with such a configuration, as with the first embodiment, even if laser light emitted from the light source including the chip 11A configured of an LD has a steep luminance distribution shape, luminance unevenness in incident light is easily reduced in the integrator 43. More specifically, for example, as illustrated in FIG. 28(A), the fly-eye lens 40C performs a light superimposition function in a plurality of cells 41 including the shape of the luminance distribution Lind of incident light; therefore, for example, as illustrated in FIG. 28(B), luminance unevenness in illumination light and display light is effectively reduced. In other words, also in this embodiment, luminance unevenness in illumination light and display light is allowed to be reduced (in this example, the occurrence of luminance unevenness is allowed to be avoided), and display image quality is improvable accordingly.

In particular, in a case where the shift amount d between the above-described adjacent cell columns satisfies the relational expression, $d=(h_{FEL1V}/n_H)$, luminance unevenness in illumination light and display light is allowed to be reduced more effectively. It is because, as described in the first embodiment, in a case where the luminance distribution Lind of incident light extends over a plurality of cells 41 along the longitudinal direction in the entire length (period) in the transverse direction of the fly-eye lens 40C, a same luminance distribution pattern is repeated, and an effect of reducing luminance unevenness is not allowed to be maximized.

Figure 29:
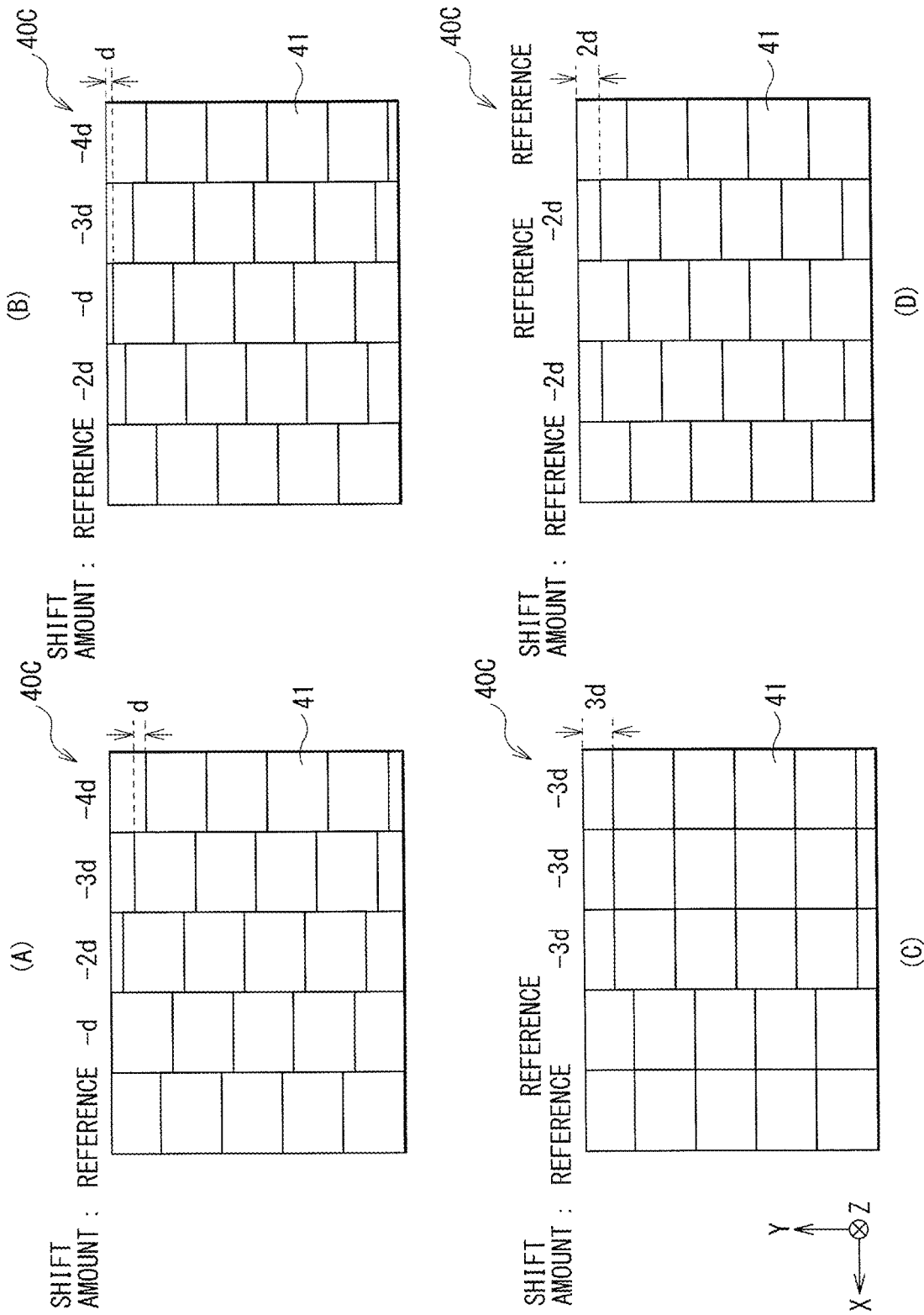
FIGS. 29(A)-29(D) are schematic views illustrating another configuration example of the fly-eye lens disposed in the preceding stage according to the second embodiment.

It is to be noted that the fly-eye lens 40C in this embodiment is not limited to a configuration in which, as illustrated in FIGS. 27 and 29(A), the cells 41 along the transverse direction in adjacent cell columns of the plurality of cell columns along the longitudinal direction are shifted in a same direction, and the fly-eye lens 40C may have any other shift configuration. In other words, as long as the positions of the cells 41 along the longitudinal direction in at least some of a plurality of cell columns along the transverse direction are shifted from one another, other shift configurations may be adopted. More specifically, for example, as illustrated in FIG. 29(B), cell columns adjacent in the transverse direction may be shifted by shift amounts in different directions (upward and downward directions). Moreover, for example, as illustrated in FIG. 29(C), some cell columns adjacent in the transverse direction may not be shifted from one another, and, for example, as illustrated in FIG. 29(D), the fly-eye lens 40C may have a staggered shift configuration (a zigzag shift configuration) in which cell columns adjacent in the transverse direction are shifted in a staggered manner.

Third Embodiment

Figure 30:
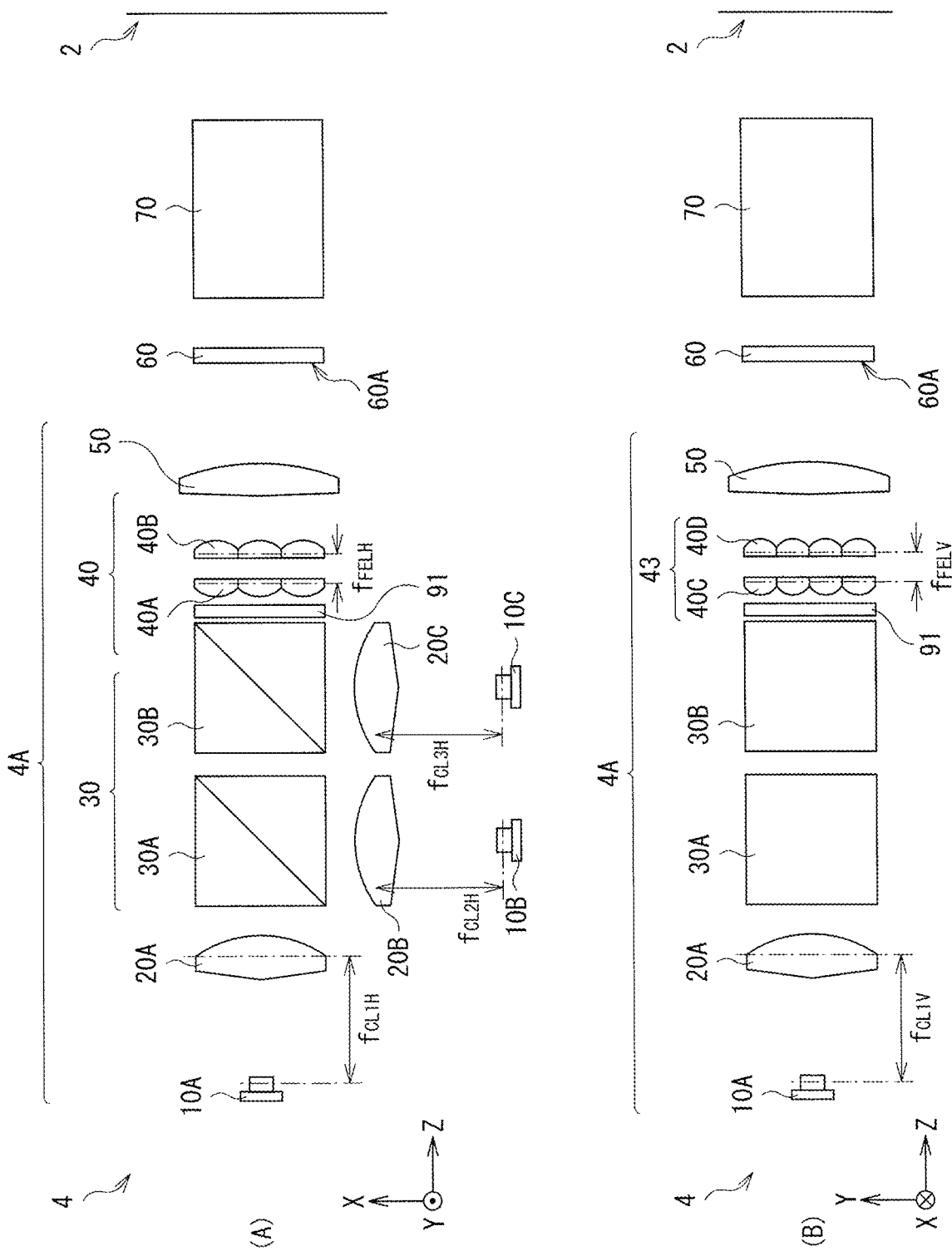
FIGS. 30(A) and 30(B) are diagrams illustrating a schematic configuration of a projector according to a third embodiment.

FIG. 30 illustrates a schematic configuration of a projector (a projector 4) according to the third embodiment. It is to be noted that the projector 4 corresponds to a specific example of "projection display unit" in the present disclosure. FIG. 30(A) illustrates a configuration example of the projector 4 when viewed from above (from the y-axis direction), and FIG. 30(B) illustrates a configuration example of the projector 4 when viewed from a side thereof (from the x-axis direction).

The projector 4 according to this embodiment is different from the configuration of the projector 1 including the illumination optical system 1A in that the projector 4 includes an illumination optical system 4A. Description will be given of, mainly, points different from the projector 1, and points common to the projector 1 will not be further described. It is to be noted that the illumination optical system 4A corresponds to a specific example of "illumination unit" in the present disclosure.

(Configuration of Illumination Optical System 4*a*)

The illumination optical system 4A corresponds to the illumination optical system 1A in which an anamorphic lens 91 which will be described below is disposed on an optical path between the optical path combining device 30 and the integrator 40.

Figure 31:
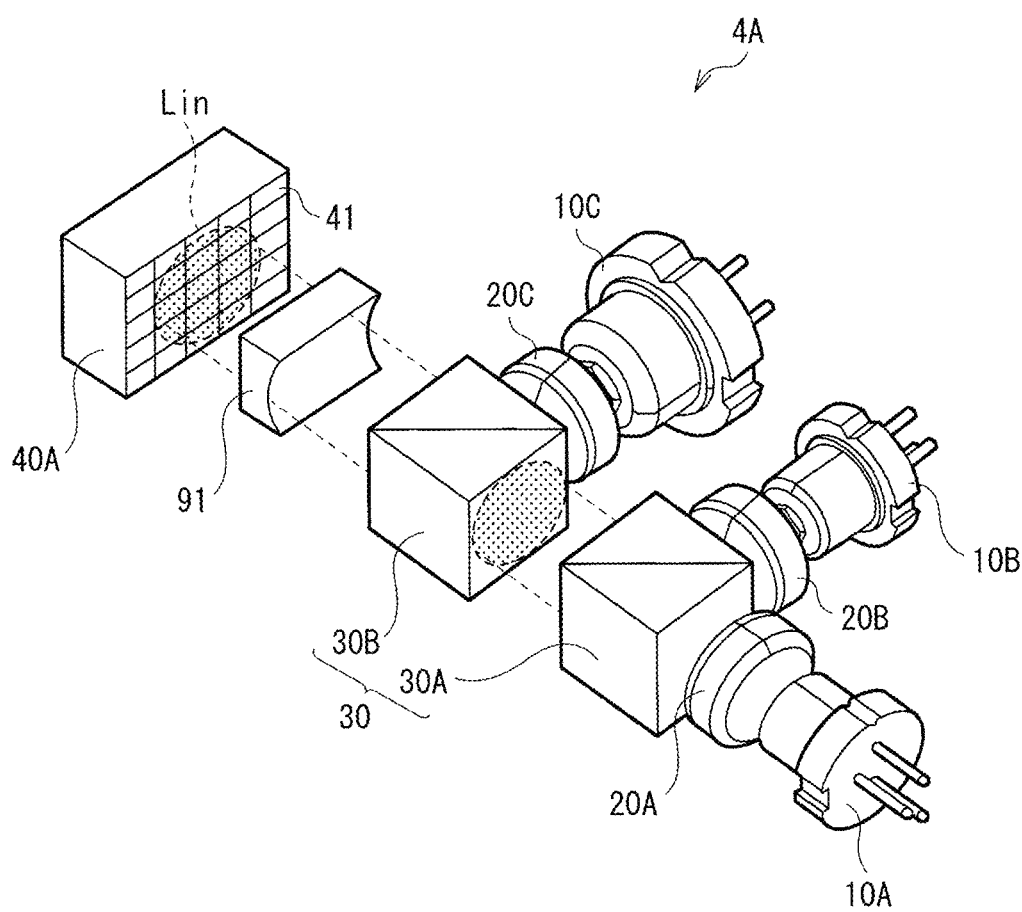
FIG. 31 is a perspective view illustrating a specific configuration example of a main part of an illumination optical system in FIG. 30.

For example, as illustrated in FIG. 31, the illumination optical system 4A is different from the illumination optical system 1A (refer to FIG. 16) in that the light sources 10A, 10B, and 10C and other optical members are not inclined (rotated). Therefore, in the illumination optical system 4A, for example, as illustrated in FIG. 32, unlike the illumination optical system 1A (refer to FIGS. 15(A) and 15(B)) (as with the comparative example illustrated in FIG. 20 and the illumination optical system 3A in the second embodiment), in the fly-eye lens 40A, the major-axis direction of the luminance distribution Lind of incident light and the arrangement directions of the cells 41 are not inclined (rotated).

Figure 32:
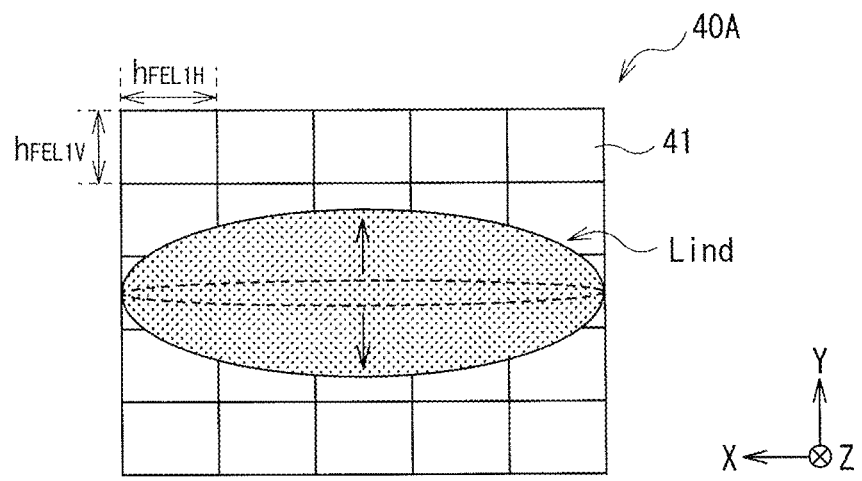
FIG. 32 is a schematic view for describing a function of an anamorphic lens illustrated in FIG. 31.

For example, as indicated by an arrow in FIG. 32, the anamorphic lens 91 is an optical device which expands the shape of the luminance distribution Lind of light incident on the fly-eye lens 40A along the minor-axis direction thereof (the longitudinal direction (the y-axis direction, the second direction) in this case). The anamorphic lens 91 is, for example, a cylindrical lens (a lenticular lens), and optical characteristics (for example, a focal length) of the anamorphic lens 91 is asymmetric in the longitudinal direction and the transverse direction (the x-axis direction, the first direction). More specifically, in this case, a focal length in the transverse direction is relatively longer than a focal length in the longitudinal direction (the focal length in the longitudinal direction<the focal length in the transverse direction).

(Functions and Effects of Projector 4)

Figure 33:
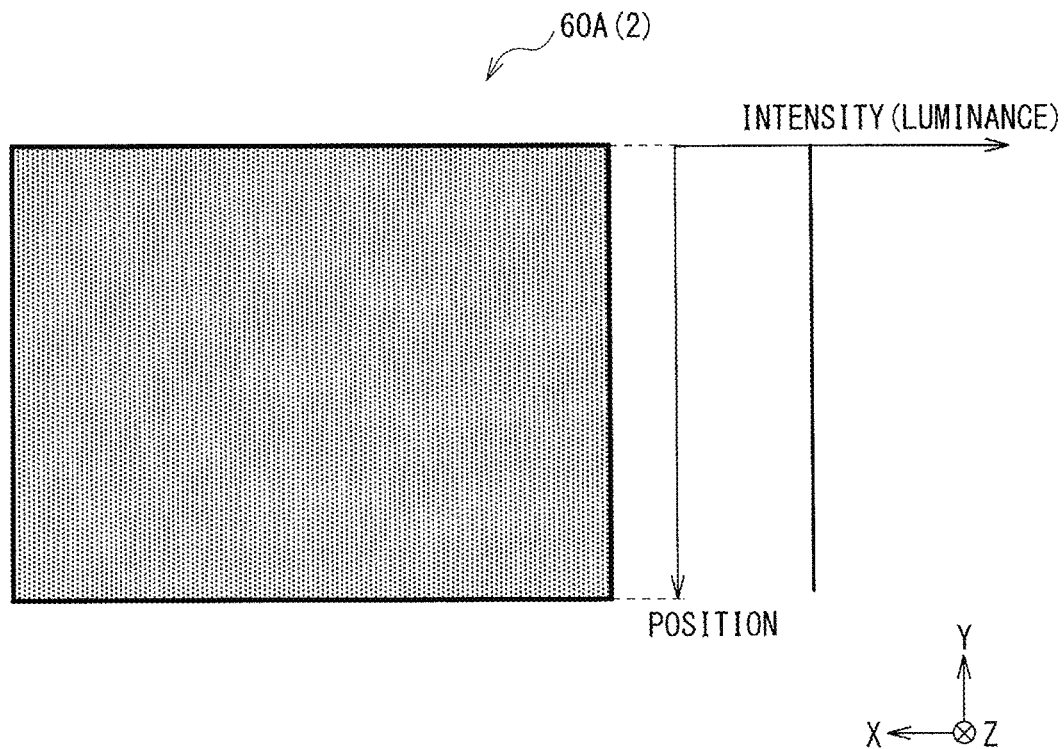
FIG. 33 is a diagram for describing a luminance unevenness reduction function in the illumination optical system according to the third embodiment.

In this embodiment, for example, as illustrated in FIG. 32, functions and effects similar to those in the first embodiment and the like are obtained through expanding the shape of the luminance distribution Lind of light incident on the fly-eye lens 40A by the anamorphic lens 91. In other words, even if laser light emitted from the light source including the chip 11A configured of an LD has a steep luminance distribution shape, luminance unevenness in incident light is easily reduced in the integrator 40. Therefore, for example, as illustrated in FIG. 33, also in this embodiment, luminance unevenness in illumination light and display light is allowed to be reduced (in this example, the occurrence of luminance unevenness is allowed to be avoided), and display image quality is improvable accordingly.

It is to be noted that, in this embodiment, an example in which the anamorphic lens 91 is provided as a single unit is described; however, the present disclosure is not limited thereto, and, for example, the anamorphic lens 91 may be formed integrally with the coupling lenses 20A, 20B, 20C, or the like.

Fourth Embodiment

Figure 34:
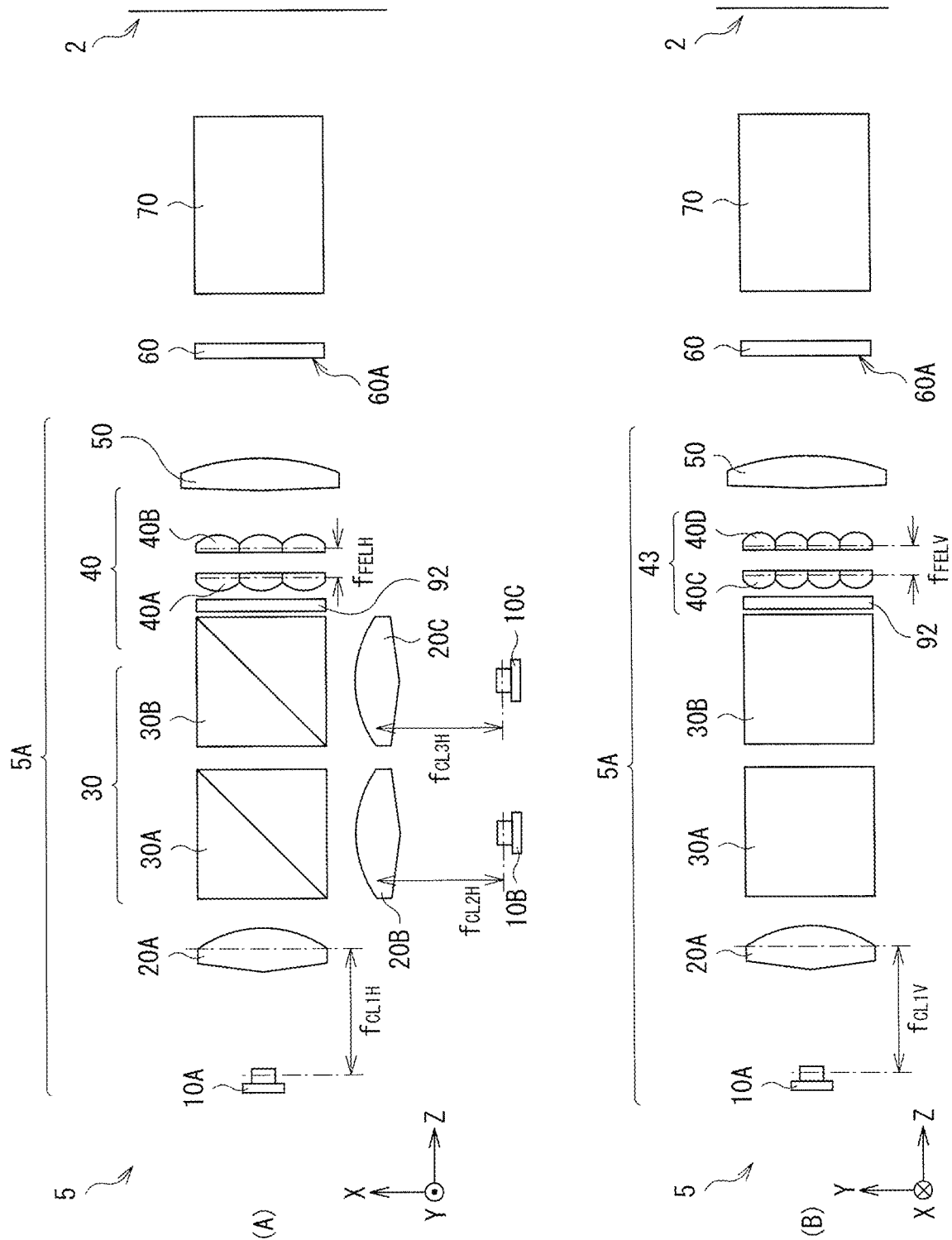
FIGS. 34(A) and 34(B) are diagrams illustrating a schematic configuration of a projector according to a fourth embodiment.

FIG. 34 illustrates a schematic configuration of a projector (a projector 5) according to the fourth embodiment. It is to be noted that the projector 5 corresponds to a specific example of "projection display unit" in the present disclosure. FIG. 34(A) illustrates a configuration example of the projector 5 when viewed from above (from the y-axis direction), and FIG. 34(B) illustrates a configuration example of the projector 5 when viewed from a side thereof (from the x-axis direction).

The projector 5 according to this embodiment is different from the configuration of the projector 1 including the illumination optical system 1A in that the projector 5 includes an illumination optical system 5A. Description will be given of, mainly, points different from the projector 1, and points common to the projector 1 will not be further described. It is to be noted that the illumination optical system 5A corresponds to a specific example of "illumination unit" in the present disclosure.

(Configuration of Illumination Optical System 5A)

The illumination optical system 5A corresponds to the illumination optical system 1A in which an optical path branching device 92 which will be described later is disposed on an optical path between the optical path combining device 30 and the integrator 40.

Figure 35:
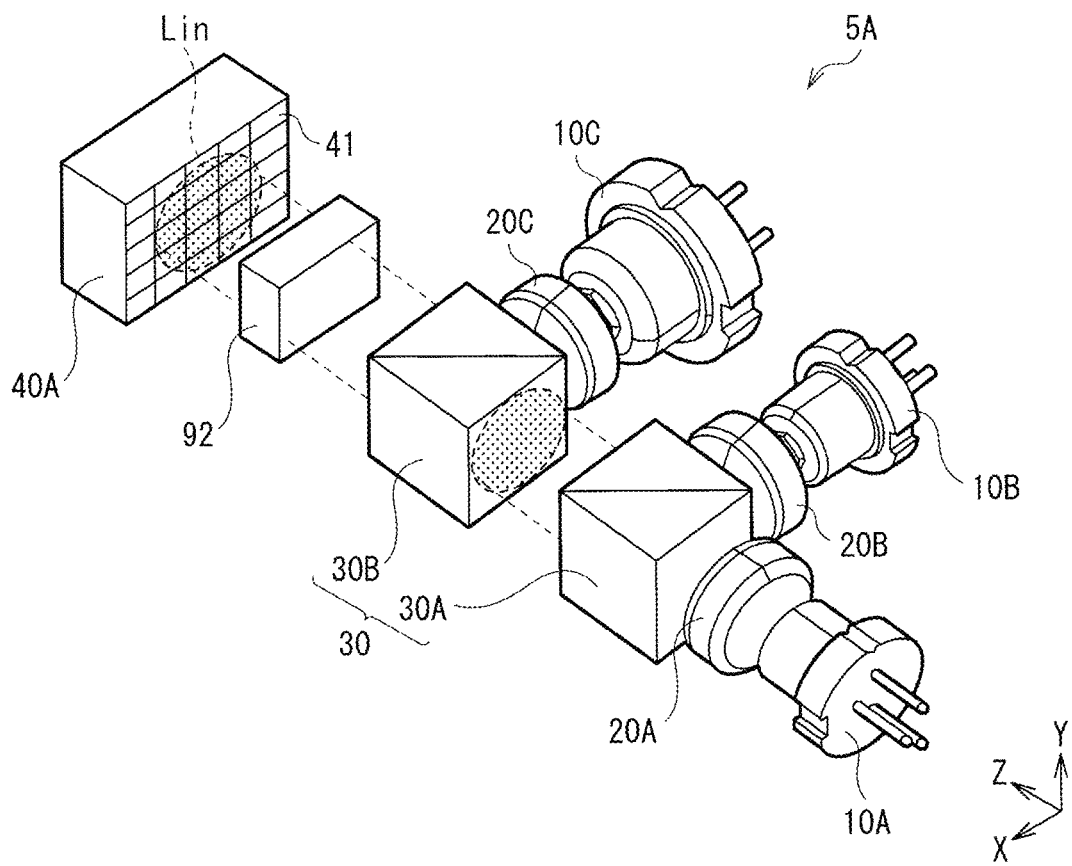
FIG. 35 is a perspective view illustrating a specific configuration example of a main part of an illumination optical system in FIG. 34.
Figure 37:
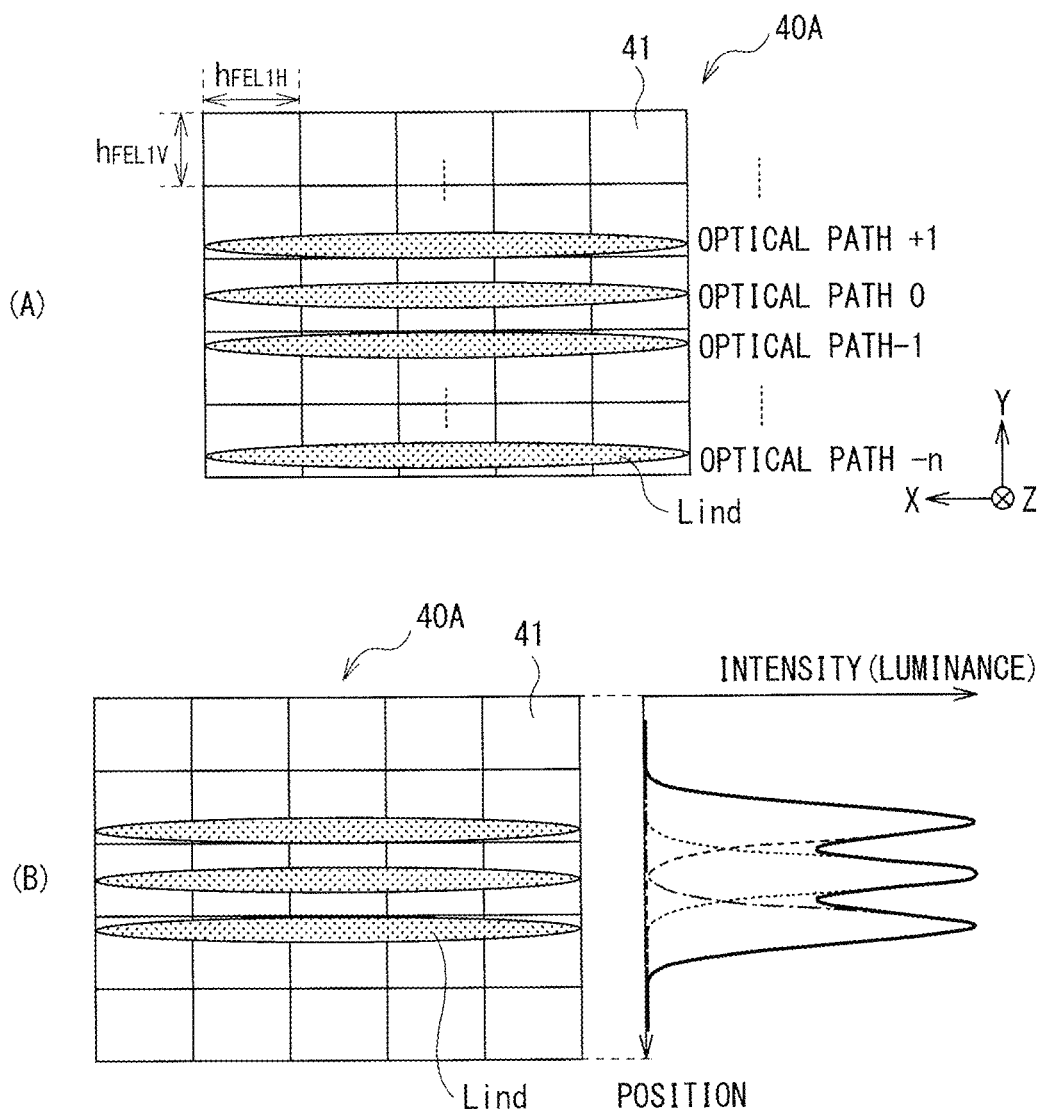
FIGS. 37(A) and 37(B) are diagrams for describing a luminance unevenness reduction function in the illumination optical system according to the fourth embodiment.

For example, as illustrated in FIG. 35, the illumination optical system 5A is also different from the illumination optical system 1A (refer to FIG. 16) in that the light sources 10A, 10B, and 10C and other optical members are not inclined (rotated). Therefore, in the illumination optical system 5A, for example, as illustrated in FIGS. 37(A) and 37(B), unlike the illumination optical system 1A (refer to FIGS. 15(A) and 15(B)) (as with the comparative example illustrated in FIG. 20 and the illumination optical systems 3A and 4A in the second and third embodiments), in the fly-eye lens 40A, the major-axis direction of the luminance distribution Lind of incident light and the arrangement directions of the cells 41 are not inclined (rotated).

The optical path branching device 92 is an optical device which branches an optical path of light incident on the fly-eye lens 40A into a plurality of optical paths along the minor-axis direction (the longitudinal direction (the y-axis direction, the second direction) in this case) of the shape of the luminance distribution Lind. As such an optical path branching device

Figure 36:
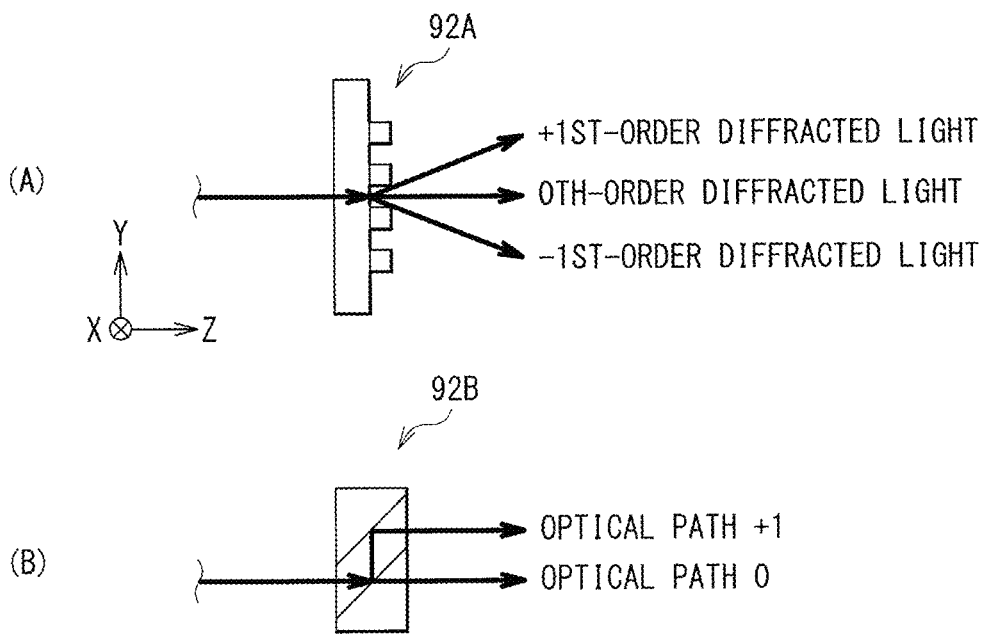
FIGS. 36(A) and 36(B) are schematic views for describing a specific example and a function of an optical path branching device illustrated in FIG. 35.

92, a diffractive device 92A which emits multiple orders of diffractive light, for example, as illustrated in FIG. 36(A) or a half mirror (or a prism) 92B, for example, as illustrated in FIG. 36(B) may be adopted.

(Functions and Effects of Projector 5)

In this embodiment, for example, as illustrated in FIGS. 37(A) and 37(B), functions and effects similar to those in the first embodiment and the like are obtained through branching the optical path of light incident on the fly-eye lens 40A into a plurality of optical paths along the minor-axis direction of the shape of the luminance distribution Lind by the optical path branching device 92. In other words, even if laser light emitted from the light source including the chip 11A configured of an LD has a steep luminance distribution shape, luminance unevenness in incident light is easily reduced in the integrator 40. Therefore, also in this embodiment, luminance unevenness in illumination light and display light is allowed to be reduced (in this example, the occurrence of luminance unevenness is allowed to be avoided), and display image quality is improvable accordingly.

It is to be noted that, in this embodiment, the diffractive device 92A and the half mirror (prism) 92B are described as specific examples of the optical path branching device 92; however, the optical path branching device 92 is not limited thereto, and the optical path branching device 92 may be configured of any other optical device.

Fifth Embodiment

Figure 38:
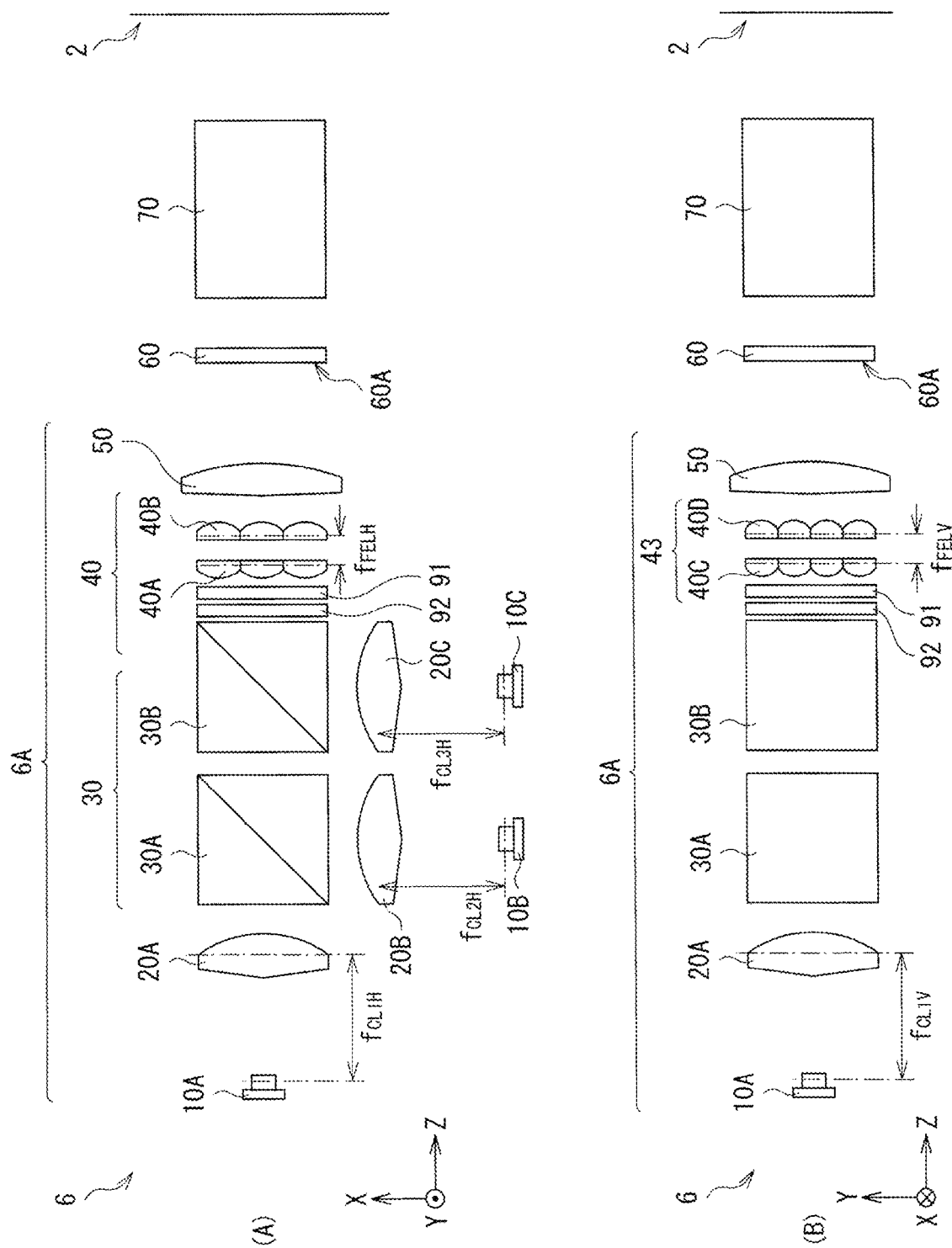
FIGS. 38(A) and 38(B) are diagrams illustrating a schematic configuration of a projector according to a fifth embodiment.

FIG. 38 illustrates a schematic configuration of a projector (a projector 6) according to the fifth embodiment. It is to be noted that the projector 6 corresponds to a specific example of "projection display unit" in the present disclosure. FIG. 38(A) illustrates a configuration example of the projector 6 when viewed from above (from the y-axis direction), and FIG. 38(B) illustrates a configuration example of the projector 6 when viewed from a side thereof (from the x-axis direction).

The projector 6 according to this embodiment is different from the configuration of the projector 1 including the illumination optical system 1A in that the projector 6 includes an illumination optical system 6A. Description will be given of, mainly, points different from the projector 1, and points common to the projector 1 will not be further described. It is to be noted that the illumination optical system 6A corresponds to a specific example of "illumination unit" in the present disclosure.

(Configuration of Illumination Optical System 6A)

The illumination optical system 6A corresponds to the illumination optical system 1A in which the optical path branching device 92 described in the fourth embodiment and the anamorphic lens 91 described in the third embodiment are disposed on an optical path between the optical path combining device 30 and the integrator 40 in this order from a side closer to the optical path combining device 30. It is to be noted that other configurations of the illumination optical system 6A are similar to those of the illumination optical systems 4A and 5A according to the third and fourth embodiments.

(Functions and Effects of Projector 6)

In this embodiment, for example, functions and effects similar to those in the above-described third and fourth embodiments are obtainable. In other words, luminance unevenness in illumination light and display light is allowed to be reduced (in this example, the occurrence of luminance unevenness is allowed to be avoided), and display image quality is improvable accordingly. Moreover, in this embodiment, both the optical path branching device 92 and the anamorphic lens 91 are included; therefore, luminance unevenness is allowed to be reduced more effectively, and higher image quality is achievable.

It is to be noted that, in this embodiment, a case where the optical path branching device 92 and the anamorphic lens 91 are disposed on the optical path between the optical path combining device 30 and the integrator 40 in this order from the side closer to the optical path combining device 30 is described; however, the present disclosure is not limited thereto, and they may be disposed in reverse order. More superficially, the anamorphic lens 91 and the optical path branching device 92 may be disposed on the optical path between the optical path combining device 30 and the integrator 40 in this order from the side closer to the optical path combining device 30.

MODIFICATION EXAMPLES

Next, modification examples (Modification Examples 1 to 3) applicable to the above-described first to fifth embodiments in common will be described below. It is to be noted that like components are denoted by like numerals as of the embodiments and will not be further described. Moreover, as the following modification examples, modification examples of the projector 1 (the illumination optical system 1A) in the first embodiment will be described below as representatives; however, the modification examples are also applicable to the projectors 3 to 6 (the illumination optical systems 3A, 4A, 5A, and 6A) in the other embodiments (the second to fifth embodiments) in a similar manner.

Modification Example 1

Figure 39:
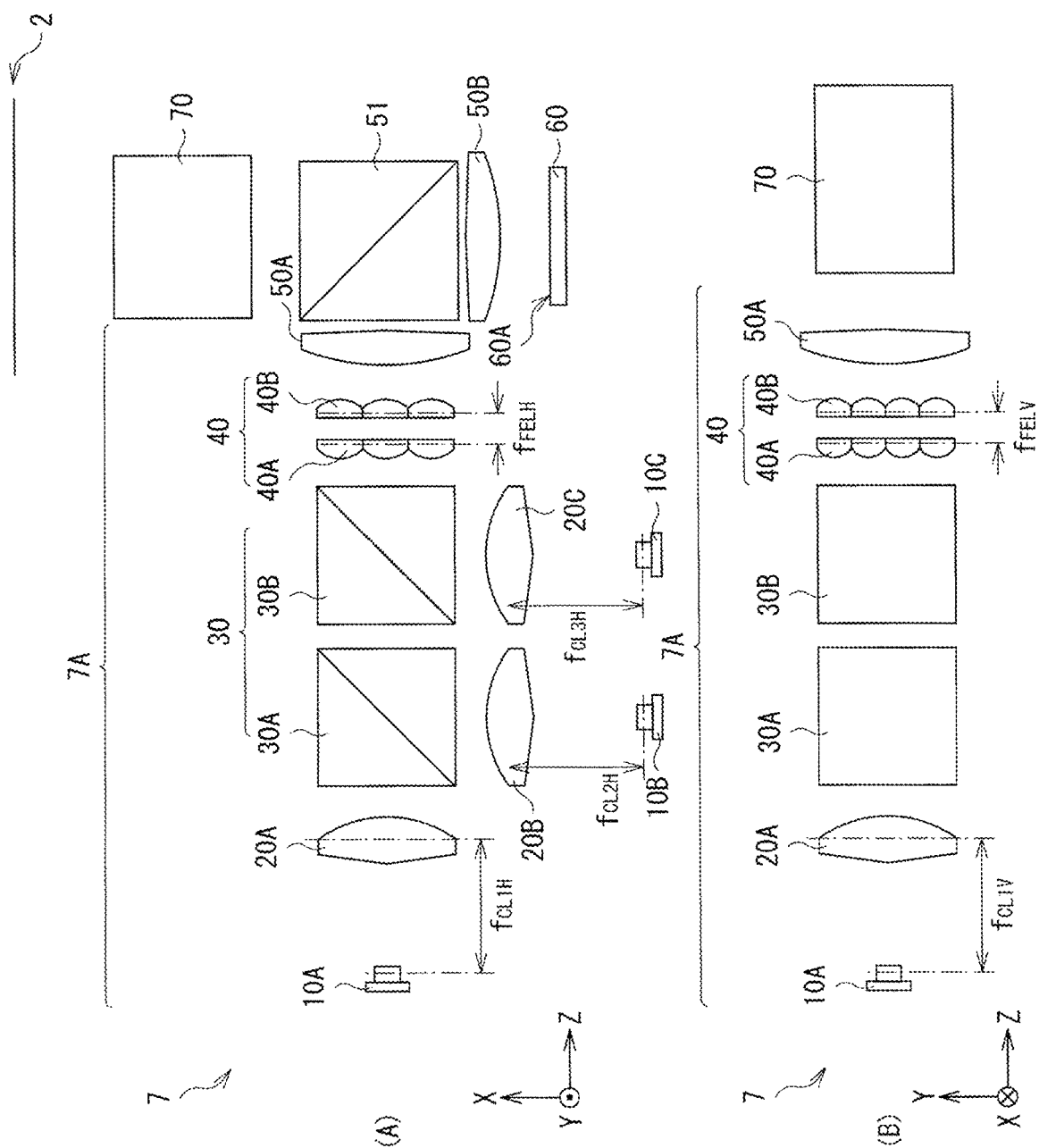
FIGS. 39(A) and 39(B) are diagrams illustrating a schematic configuration of a projector according to Modification Example 1 applicable to the first to fifth embodiments.

FIGS. 39A and 39B illustrate a schematic configuration of a projector (a projector 7) according to Modification Example 1. It is to be noted that the projector 7 corresponds to a specific example of "projection display unit" in the present disclosure. FIG. 39A illustrates a configuration example of the projector 7 when viewed from above (from the y-axis direction), and FIG. 39B illustrates a configuration example of the projector 7 when viewed from a side thereof (from the x-axis direction).

The projector 7 according to this modification example is different from the projector 1 including the illumination optical system 1A in that the projector 7 includes an illumination optical system 7A, and a reflective device is used as the spatial modulating device 60. Description will be given of, mainly, points different from the projector 1, and points common to the projector 1 will not be further described. It is to be noted that the illumination optical system 7A corresponds to a specific example of "illumination unit" in the present disclosure.

The illumination optical system 7A corresponds to the illumination optical system 1A in which a condenser lens 50A is included instead of the condenser lens 50. The condenser lens 50A is a lens which converts light fluxes, from light sources, formed by the integrator 40 into parallel light fluxes to illuminate a condenser lens 50B with the light fluxes through a polarizing beam splitter 51.

Moreover, in this modification example, as described above, the spatial modulating device 60 may be configured of, for example, a reflective device such as a reflective liquid crystal panel. Therefore, compared to the projector 1, the projector 7 further includes the condenser lens 50B and the polarizing beam splitter 51. The polarizing beam splitter 51 is an optical member which selectively allows specific polarized light (for example, p-polarized light) to pass there-through and selectively reflects the other polarized light (for example, s-polarized light). Moreover, the spatial modulating device 60 performs light modulation while reflecting light to allow light incident thereon and light exiting therefrom to have different polarization states (for example, s-polarization and p-polarization). Therefore, light incident from the illumination optical system 7A (for example, s-polarized light) is selectively reflected to enter the spatial modulating device 60, and image light (for example, p-polarized light) emitted from spatial modulating device 60 selectively passes through the spatial modulating device 60 to enter the projection optical system 70. The condenser lens 50B is a lens which condenses light fluxes, from light sources, formed by the integrator 40 and being incident thereon through the condenser lens 50A and the polarizing beam splitter 51 to illuminate the illumination region 60A with the light fluxes in a superimposed manner.

Also in the projector 7 according to this modification example having such a configuration, effects similar to those in the projector 1 according to the above-described first embodiment and the like are obtainable by functions similar to those in the projector 1 and the like.

Moreover, specifically in this modification example, since a size in the x-axis direction is specifically long in a plane (xy plane) orthogonal to the optical axis of the integrator 40, the entire projector 7 is advantageously downsized through allowing a minor-axis direction (the y-axis direction) of an outer shape of the projector 7 and the minor-axis direction of the FFP of light emitted from each of the light-emitting spots to be coincident with each other.

Modification Example 2

Figure 40:
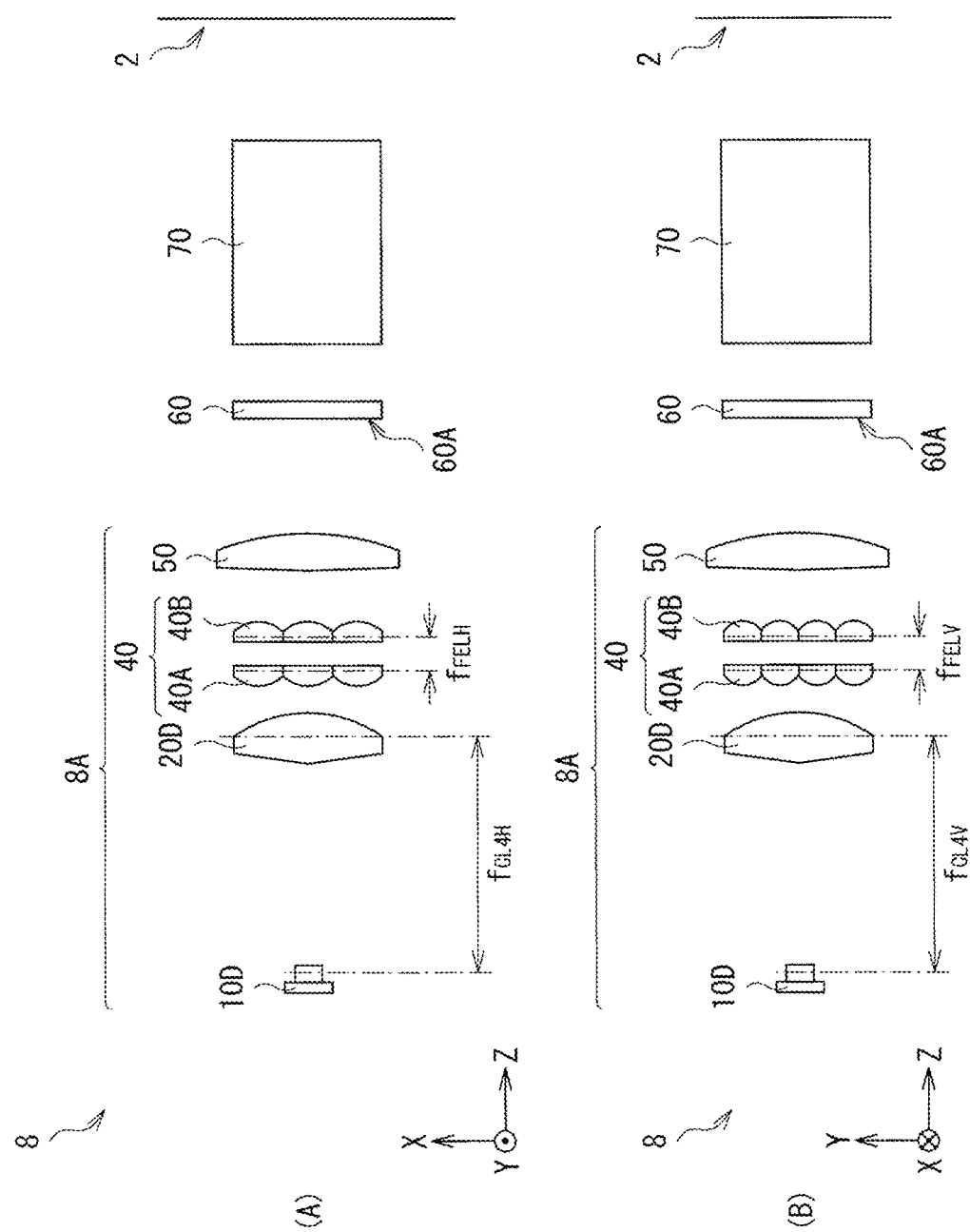
FIGS. 40(A) and 40(B) are diagrams illustrating a schematic configuration of a projector according to Modification Example 2 applicable to the first to fifth embodiments.
Figure 41:
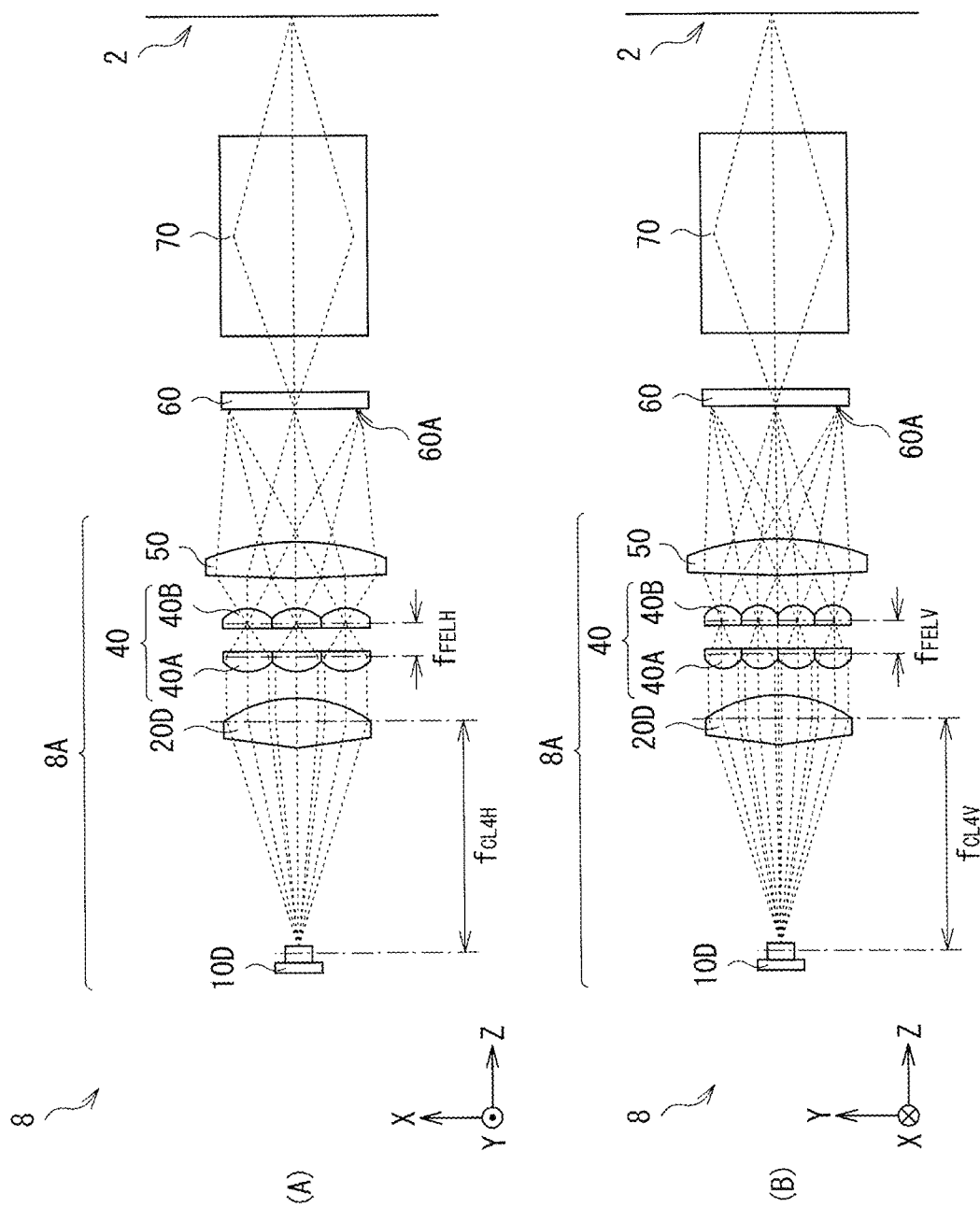
FIGS. 41(A) and 41(B) are diagrams illustrating an example of optical paths in the projector in FIG. 40.

FIGS. 40(A) and 40(B) illustrate a schematic configuration of a projector (a projector 8) according to Modification Example 2. It is to be noted that the projector 8 corresponds to a specific example of "projection display unit" in the present disclosure. FIG. 40(A) illustrates a configuration example of the projector 8 when viewed from above (from the y-axis direction), and FIG. 40(B) illustrates a configuration example of the projector 8 when viewed from a side thereof (from the x-axis direction). Moreover, FIGS. 41(A) and 41(B) illustrate an example of optical paths in the projector 8. FIG. 41(A) illustrates an example of optical paths when the projector 8 is viewed from above (from the y-axis direction), and FIG. 41(B) illustrates an example of optical paths when the projector 8 is viewed from a side thereof (from the x-axis direction).

The projector 8 according to this modification example is different from the projector 1 including the illumination optical system 1A in that the projector 8 includes an illumination optical system 8A. Description will be given of, mainly, points different from the projector 1, and points common to the projector 1 will not be further described. It is to be noted that the illumination optical system 8A corresponds to a specific example of "illumination unit" in the present disclosure.

In the illumination optical system 8A, the light sources 10A, 10B, and 10C, and the dichroic mirrors 30A and 30B in the illumination optical system 1A are not included, and a light source 10D is included instead of them. The light source 10D is disposed on an optical axis of a coupling lens 20D, and the illumination optical system 8A is configured to allow light emitted from the light source 10D to directly enter the coupling lens 20D.

The light source 10D includes, for example, the solid-state light-emitting device 11 and the package 12 supporting and covering the solid-state light-emitting device 11 (a base for mounting the solid-state light-emitting device 11 thereon). In other words, in this case, the chip 11A is of a top emission type. Alternatively, the light source 10D may be of a can type in which the solid-state light-emitting device 11 including one or a plurality of edge-emission type chips 11A is contained in an inner space enclosed with the stem 13 and the cap 14. In other words, in this case, the chip 11A is of an edge-emission type.

The solid-state light-emitting device 11 included in the light source 10D emits light from a light emission region including one or more dot-shaped or non-dot-shaped light-emitting spots. The solid-state light-emitting device 11 included in the light source 10D may include, for example, a single chip 11A emitting light in a predetermined wavelength range, or a plurality of chips 11A emitting light in a same wavelength range or light in wavelength ranges different from one another. In a case where the solid-state light-emitting device 11 included in the light source 10D includes a plurality of chips 11A, for example, these chips 11A may be arranged in a line in the transverse direction or in a grid-like pattern in the transverse direction and the longitudinal direction.

The chips 11A each are configured of a light-emitting diode (LED), an organic EL light-emitting diode (OLED), or a laser diode (LD). However, also in this case, at least one chip 11A included in the light source 10D is configured of an LD.

In a case where a plurality of chips 11A are included in the light source 10D, all of the chips 11A included in the light source 10D may emit light in an equal wavelength range, or light in wavelength ranges different from one another. In a case where a plurality of chips 11A are included in the light source 10D, all of the chip 11A may be configured of chips emitting light in a wavelength of about 400 nm to about 500 nm both inclusive (blue light), light in a wavelength of about 500 nm to about 600 nm both inclusive (green light), or light in a wavelength of about 600 nm to about 700 nm both inclusive (red light). Moreover, in a case where a plurality of chips 11A are included in the light source 10D, the plurality of chips 11A included in the light source 10D may be configured of, for example, a chip emitting light in a wavelength of about 400 nm to about 500 nm both inclusive (blue light), a chip emitting light in a wavelength of about 500 nm to about 600 nm both inclusive (green light), and a chip emitting light in a wavelength of about 600 nm to about 700 nm both inclusive (red light).

Modification Example 3

Figure 42:
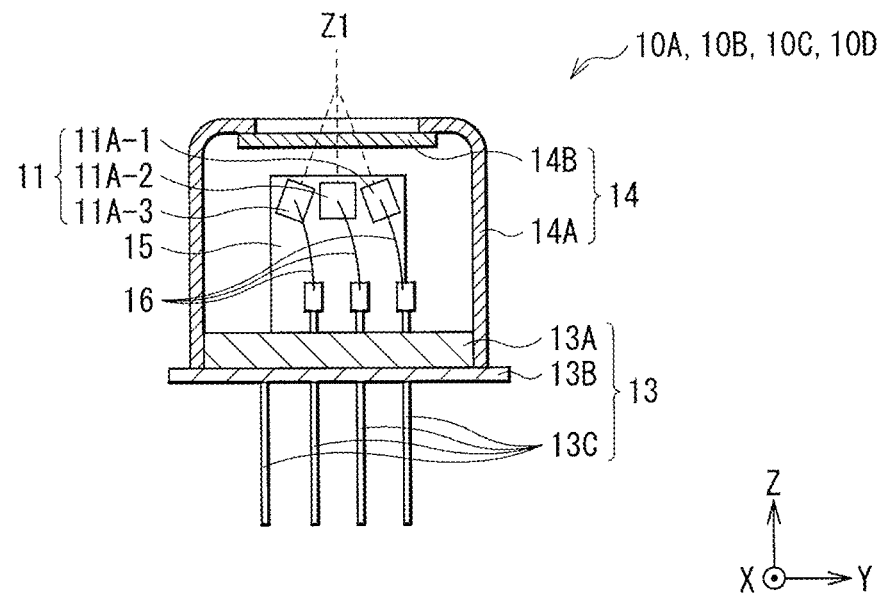
FIG. 42 is a diagram illustrating a sectional configuration example of a light source according to Modification Example 3 applicable to the first to fifth embodiments.

FIG. 42 illustrates a sectional configuration example of a light source (the light source 10A, 10B, 10C, or 10D) according to Modification Example 3. Unlike the light sources described above, the light source according to this modification example has the following configuration. Specifically, at least one of a plurality of chips 11A each configured of an LD in the above-described first light source (for example, the light source 10A, 10B, 10C, or 10D) is inclined with respect to an optical axis Z1. More specifically, in this case, among three chips 11A-1, 11A-2, and 11A-3, two chips 11A-1 and 11A-3 are inclined with respect to the optical axis Z1 of a second light source. It is to be noted that, unlike the chips 11A-1 and 11A-3, the remaining chip 11A-2 is disposed parallel to the optical axis Z1. Therefore, while an optical path of laser light emitted from the chip 11A-2 is parallel to the optical axis Z1, optical paths of laser light emitted from the chips 11A-1 and 11A-3 are oriented in a direction inclined with respect to the optical axis Z1. Thus, in this modification example, intensity peaks of laser light after a change in the optical paths (combining of the optical paths) are allowed to be aligned along the optical axis Z1.

Figure 43:
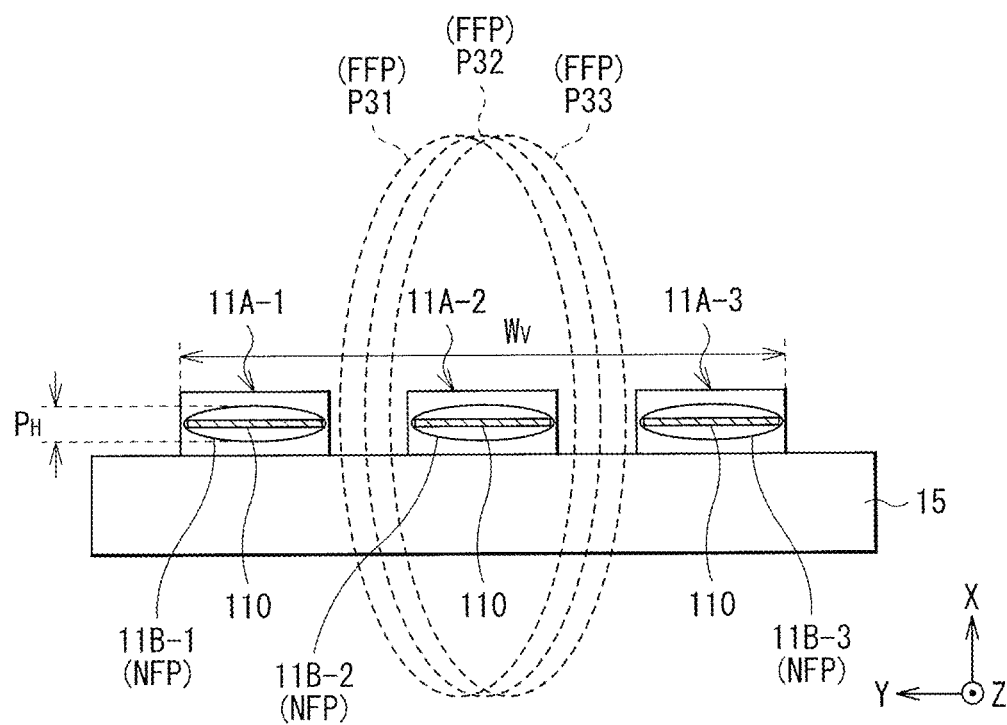
FIG. 43 is a diagram illustrating an example of a relationship between arrangement of light-emitting spots and FFPs in the light source in FIG. 42.

Moreover, also in this modification example, for example, as illustrated in FIG. 43, the minor-axis direction of the FFP of laser light emitted from each of the light-emitting spots 11B-1, 11B-2, and 11B-3 of the chips 11A-1, 11A-2, and 11A-3 is preferably substantially coincident with the minor-axis direction (the y-axis direction in this case) in the plane orthogonal to the optical axis of the integrator 40. Moreover, likewise, in a case where the first light source is a light source emitting light in two or more wavelength ranges different from one another, the major-axis direction (the x-axis direction in this case) of the FFPs of laser light emitted in these two or more wavelength ranges emitted from each of the light-emitting spots 11B-1, 11B-2, and 11B-3 is preferably substantially coincident with one another.

Other Modification Examples

Although the present disclosure is described referring to the embodiments and the modification examples, the present disclosure is not limited thereto, and may be variously modified.

For example, in the above-described embodiments and the like, each of the illumination optical systems 1A, 3A, 4A, 5A, 6A, 7A, and 8A includes an infinite optical system allowing parallel light to enter the fly-eye lens 40A or 40C; however, each of them may include a finite optical system allowing convergent light (or divergent light) to enter the fly-eye lens 40A or 40C. In this case, in the above-described embodiments and the like, instead of the coupling lenses 20A to 20D, directivity angle changing devices having a function of converging or diverging light emitted from the light sources 10A to 10D may be provided. However, in this case, it is preferable that an optical magnification of an optical system configured of the above-described directivity angle changing devices and the fly-eye lenses 40A (or the fly-eye lens 40C) and 40B is so adjusted as to allow the size of each light source image S formed on the fly-eye lens 40B by each of the cells 41 of the fly-eye lens 40A or 40C not to exceed the size of one cell 42 of the fly-eye lens 40B. More specifically, the optical magnification of the optical system configured of the above-described directivity angle changing devices and the fly-eye lenses 40A (or the fly-eye lens 40C) and 40B preferably satisfies the following relational expression. It is to be noted that, also in this case, in a case where each of the cells 41 and 42 of the fly-eye lenses 40A, 40B, and 40C has a horizontal-to-vertical ratio (aspect ratio) of other than 1, the illumination optical systems 1A, 3A, 4A, 5A, 6A, 7A, and 8A preferably employ anamorphic optical systems.

$$h = P*m = /< h_{FEL2}$$

where m is an optical magnification of an optical system configured of the above-described directivity angle changing devices and the fly-eye lenses 40A (or the fly-eye lens 40C) and 40B

Moreover, a combination of any of configurations of characteristics parts in the respective illumination optical systems and the respective projectors described in the above-described embodiments and the like may be used. More specifically, a combination of the configuration of the illumination optical system 1A in the first embodiment and any of the illumination optical systems 3A, 4A, 5A, and 6A in the second to fifth embodiments may be used. Further, a combination of the configuration of the illumination optical system 3A in the second embodiment and any of the configurations of the illumination optical systems 4A, 5A, and 6A in the third to fifth embodiments may be used. Thus, in a case where a combination of any of configurations of characteristics parts in the plurality of embodiments and the like is used, luminance unevenness is allowed to be reduced in a synergistic manner, and higher image quality is achievable.

Figure 44:
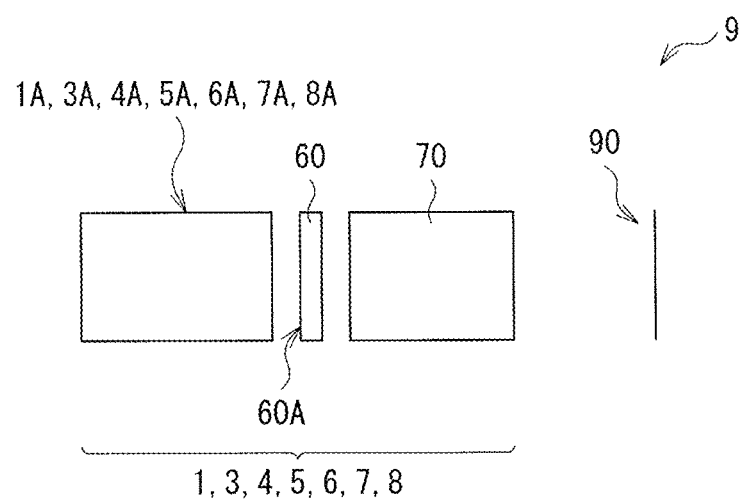

Further, in the above-described embodiments and the like, a case where the present disclosure is applied to the projection display unit is described; however, the present disclosure is also applicable to any other display units. For example, as illustrated in FIG. 44, the present disclosure is applicable to a rear-projection display unit 9. The rear-projection display unit 9 includes any of the projectors 1, 3, 4, 5, 6, 7, 8 and the like including any of the illumination optical systems 1A, 3A, 4A, 5A, 6A, 7A, and 8A (or a combination of any of them) and a transmissive screen 90 displaying image light projected from the projector 1, 3, 4, 5, 6, 7, 8, or the like (the projection optical system 70). When the illumination optical system 1A, 3A, 4A, 5A, 6A, 7A, 8A, or the like is used as an illumination optical system of the rear-projection display unit 9 in such a manner, luminance unevenness in illumination light (image light, display light) is allowed to be reduced, and display image quality is improvable.

In addition, in the above-described embodiments and the like, a case where the spatial modulating device 60 is configured of a transmissive or reflective device is described as an example; however, the present disclosure is not limited thereto. Alternatively, the spatial modulating device 60 may be configured of, for example, a digital micromirror device (DMD).

Moreover, in the above-described embodiments and the like, respective components (optical systems) of the illumination optical system and the display unit are specifically described; however, it is not necessary to include all of the components, or other components may be further included.

Further, in the above-described embodiments and the like, a case where the illumination units in the embodiments and the like of the present disclosure are applied to the projection display unit or the like is described as an example; however, the present disclosure is not limited thereto, and the illumination unit is applicable to, for example, exposure systems such as steppers.

It is to be noted that the present disclosure may have the following configurations.

(1) An illumination unit including:

one or more light sources each including a solid-state light-emitting device, the solid-state light-emitting device configured to emit light from a light emission region thereof, the light emission region including one or more dot-shaped or non-dot-shaped light-emitting spots; and an optical member configured to allow light incident from the solid-state light-emitting device to pass therethrough and exit therefrom, in which the solid-state light-emitting device includes a single chip or a plurality of chips, the single chip configured to emit light in a single wavelength range or light in a plurality of wavelength ranges, the plurality of chips configured to emit light in a same wavelength range or light in wavelength ranges different from one another, at least one of the chips in the one or more light sources is configured of a laser diode, the optical member includes an integrator including a first fly-eye lens and a second fly-eye lens, and configured to uniformize a luminance distribution of light in a predetermined illumination region illuminated with light incident from the solid-state light-emitting device, the first fly-eye lens on which light from the solid-state light-emitting device is incident, the second fly-eye lens on which light from the first fly-eye lens is incident, each of the first and second fly-eye lenses includes a plurality of cells, and a major-axis direction of a luminance distribution shape of light incident on an incident plane of the first fly-eye lens is different from arrangement directions of the cells in the first fly-eye lens.

(2) The illumination unit according to (1), in which
the cells in the first fly-eye lens are arranged along a first direction and a second direction orthogonal to each other as the arrangement directions, and the major-axis direction in the incident light is different from both the first and second directions.

(3) The illumination unit according to (2), in which at least the chip configured of the laser diode is inclined to allow a major-axis direction of a far field pattern (FFP) of laser light emitted from the light-emitting spot of the chip configured of the laser diode to be different from both the first and second directions in the first fly-eye lens.

(4) The illumination unit according to (2) or (3), in which an angle "theta" that the major-axis direction in the incident light and the first direction form satisfies the following relational expression:

$$\text{"theta"} = \tan^{-1}[h_{FEL1y}/(h_{FEL1x} \times n_x)]$$

where $h_{FEL1x}$ is a size in the first direction of one cell in the first fly-eye lens, $h_{FEL1y}$ is a size in the second direction of one cell in the first fly-eye lens, and $n_x$ is the cell number along the first direction in the first fly-eye lens.

(5) The illumination unit according to any one of (2) to (4), in which, in the first fly-eye lens, positions of the cells along the second direction in at least some of a plurality of cell columns arranged along the first direction are different from one another.

(6) The illumination unit according to (5), in which positions of the cells along the second direction in adjacent cell columns of the plurality of cell columns along the first direction are shifted in a same direction.

(7) The illumination unit according to (6), in which a shift amount d between the adjacent cell columns satisfies the following relational expression:

$$d = (h_{FEL1y}/n_x)$$

where $h_{FEL1y}$ is a size in the second direction of one cell in the first fly-eye lens, and $n_x$ is the cell number along the first direction in the first fly-eye lens.

(8) The illumination unit according to any one of (5) to (7), further including an optical device configured to expand the luminance distribution shape of the incident light along a minor-axis direction thereof on an optical path between the light source including the chip configured of the laser diode and the first fly-eye lens.

(9) The illumination unit according to (8), in which the optical device is an anamorphic lens having a relatively longer focal length in the first direction than a focal length in the second direction.

(10) The illumination unit according to (8) or (9), further including an optical path branching device configured to branch an optical path of the incident light into a plurality of optical paths along the minor-axis direction of the luminance distribution shape on an optical path between the light source including the chip configured of the laser diode and the first fly-eye lens.

(11) The illumination unit according to (10), in which the optical path branching device is a diffractive device, a half mirror, or a prism.

(12) The illumination unit according to any one of (5) to (7), further including an optical path branching device configured to branch an optical path of the incident light into a plurality of optical paths along the minor-axis direction of the luminance distribution shape on an optical path between the light source including the chip configured of the laser diode and the first fly-eye lens.

(13) The illumination unit according to any one of (1) to (4), further including an optical device configured to expand the luminance distribution shape of the incident light along a minor-axis direction thereof on an optical path between the light source including the chip configured of the laser diode and the first fly-eye lens.

(14) The illumination unit according to (13), further including an optical path branching device configured to branch an optical path of the incident light into a plurality of optical paths along the minor-axis direction of the luminance distribution shape on an optical path between the light source including the chip configured of the laser diode and the first fly-eye lens.

(15) The illumination unit according to any one of (1) to (4), further including an optical path branching device configured to branch an optical path of the incident light into a plurality of optical paths along the minor-axis direction of the luminance distribution shape on an optical path between the light source including the chip configured of the laser diode and the first fly-eye lens.

(16) The illumination unit according to any one of (1) to (15), in which
the first fly-eye lens is disposed in a substantial focal position of the second fly-eye lens, and the second fly-eye lens is disposed in a substantial focal position of the first fly-eye lens.

(17) The illumination unit according to any one of (1) to (16), in which the optical member includes one or more directivity angle changing devices configured to change a directivity angle of light incident from the solid-state light-emitting device, and the integrator configured to uniformize an illuminance distribution of light in the predetermined illumination region illuminated with light having passed through the directivity angle changing device.

(18) The illumination unit according to any one of (1) to (17), in which the light source is formed in a manner of a package incorporating the solid-state light-emitting device or a package in which the solid-state light-emitting device is supported on a base.

(19) A projection display unit provided with an illumination optical system, a spatial modulating device, and a projection optical system, the spatial modulating device configured to modulate light from the illumination optical system based on an input image signal to generate image light, the projection optical system configured to project the image light generated by the spatial modulating device, the illumination optical system including:

one or more light sources each including a solid-state light-emitting device, the solid-state light-emitting device configured to emit light from a light emission region thereof, the light emission region including one or more dot-shaped or non-dot-shaped light-emitting spots; and an optical member configured to allow light incident from the solid-state light-emitting device to pass therethrough and exit therefrom, in which the solid-state light-emitting device includes a single chip or a plurality of chips, the single chip configured to emit light in a single wavelength range or light in a plurality of wavelength ranges, the plurality of chips configured to emit light in a same wavelength range or light in wavelength ranges different from one another, at least one of the chips in the one or more light sources is configured of a laser diode, the optical member includes an integrator including a first fly-eye lens and a second fly-eye lens, and configured to uniformize a luminance distribution of light in a predetermined illumination region illuminated with light incident from the solid-state light-emitting device, the first fly-eye lens on which light from the solid-state light-emitting device is incident, the second fly-eye lens on which light from the first fly-eye lens is incident, each of the first and second fly-eye lenses includes a plurality of cells, and a major-axis direction of a luminance distribution shape of light incident on an incident plane of the first fly-eye lens is different from arrangement directions of the cells in the first fly-eye lens.

(20) A direct-view display unit provided with an illumination optical system, a spatial modulating device, a projection optical system, and a transmissive screen, the spatial modulating device configured to modulate light from the illumination optical system based on an input image signal to generate image light, the projection optical system configured to project the image light generated by the spatial modulating device, the transmissive screen configured to display the image light projected from the projection optical system, the illumination optical system including:

one or more light sources each including a solid-state light-emitting device, the solid-state light-emitting device configured to emit light from a light emission region thereof, the light emission region including one or more dot-shaped or non-dot-shaped light-emitting spots; and an optical member configured to allow light incident from the solid-state light-emitting device to pass therethrough and exit therefrom, in which the solid-state light-emitting device includes a single chip or a plurality of chips, the single chip configured to emit light in a single wavelength range or light in a plurality of wavelength ranges, the plurality of chips configured to emit light in a same wavelength range or light in wavelength ranges different from one another, at least one of the chips in the one or more light sources is configured of a laser diode, the optical member includes an integrator including a first fly-eye lens and a second fly-eye lens, and configured to uniformize a luminance distribution of light in a predetermined illumination region illuminated with light incident from the solid-state light-emitting device, the first fly-eye lens on which light from the solid-state light-emitting device is incident, the second fly-eye lens on which light from the first fly-eye lens is incident, each of the first and second fly-eye lenses includes a plurality of cells, and a major-axis direction of a luminance distribution shape of light incident on an incident plane of the first fly-eye lens is different from arrangement directions of the cells in the first fly-eye lens.

The present disclosure contains subject matter related to that disclosed in Japanese Priority Patent Application No. 2011-071153 filed in the Japan Patent Office on Mar. 28, 2011, the entire content of which is hereby incorporated by reference.

What is claimed is:

1. An illumination unit comprising:
  one or more light sources each including a solid-state light-emitting device, the solid-state light-emitting device configured to emit light from a light emission region thereof, the light emission region including one or more dot-shaped or non-dot-shaped light-emitting spots; and
  an optical member configured to allow light incident from the solid-state light-emitting device to pass therethrough and exit therefrom,
  wherein,
    the solid-state light-emitting device includes a single chip or a plurality of chips, the single chip configured to emit light in a single wavelength range or light in a plurality of wavelength ranges, the plurality of chips configured to emit light in a same wavelength range or light in wavelength ranges different from one another,
    at least one of the chips in the one or more light sources is configured of a laser diode,
    the optical member includes an integrator including a first fly-eye lens and a second fly-eye lens, and configured to uniformize a luminance distribution of light in a predetermined illumination region illuminated with light incident from the solid-state light-emitting device, the first fly-eye lens on which light from the solid-state light-emitting device is incident, the second fly-eye lens on which light from the first fly-eye lens is incident,
    each of the first and second fly-eye lenses includes a plurality of cells, the cells in the first fly-eye lens being arranged along a first direction and a second direction orthogonal to each other as the arrangement directions,
    a far field pattern (FFP) of laser light emitted from the light-emitting spot of the chip configured of the laser diode has an anisotropic shape, and
    a luminance distribution shape of light incident on an incident plane of the first fly-eye lens also has an anisotropic shape caused by the anisotropic shape of the FFP, and a major-axis direction of the luminance distribution shape is different from arrangement directions of the cells in the first fly-eye lens, the major-axis direction of the incident light being different from both the first and second arrangement directions of the cells of the first fly-eye lens.

2. The illumination unit according to claim 1, wherein at least the chip configured of the laser diode is inclined to allow an major-axis direction of the FFP to be different from both the first and second directions in the first fly-eye lens.

3. The illumination unit according to claim 1, wherein an angle "theta" that the major-axis direction in the incident light and the first direction form satisfies the following relational expression:

"theta"=tan □1 [hFEL1y/(hFEL1x□nx)]

where hFEL1x is a size in the first direction of one cell in the first fly-eye lens,
hFEL1y is a size in the second direction of one cell in the first fly-eye lens, and
nx is the cell number along the first direction in the first fly-eye lens.

4. The illumination unit according claim 1, wherein, in the first fly-eye lens, positions of the cells along the second direction in at least some of a plurality of cell columns arranged along the first direction are different from one another.

5. The illumination unit according to claim 4, wherein positions of the cells along the second direction in adjacent cell columns of the plurality of cell columns along the first direction are shifted in a same direction.

6. The illumination unit according to claim 5, wherein a shift amount d between the adjacent cell columns satisfies the following relational expression:

$$d=(hFEL1y/nx)$$

where hFEL1y is a size in the second direction of one cell in the first fly-eye lens, and nx is the cell number along the first direction in the first fly-eye lens.

7. The illumination unit according to claim 4, further comprising an optical device configured to expand the luminance distribution shape of the incident light along a minor-axis direction thereof on an optical path between the light source including the chip configured of the laser diode and the first fly-eye lens.

8. The illumination unit according to claim 7, wherein the optical device is an anamorphic lens having a relatively longer focal length in the first direction than a focal length in the second direction.

9. The illumination unit according to claim 7, further comprising an optical path branching device configured to branch an optical path of the incident light into a plurality of optical paths along the minor-axis direction of the luminance distribution shape on an optical path between the light source including the chip configured of the laser diode and the first fly-eye lens.

10. The illumination unit according to claim 9, wherein the optical path branching device is a diffractive device, a half mirror, or a prism.

11. The illumination unit according to claim 4, further comprising an optical path branching device configured to branch an optical path of the incident light into a plurality of optical paths along the minor-axis direction of the luminance distribution shape on an optical path between the light source including the chip configured of the laser diode and the first fly-eye lens.

12. The illumination unit according to claim 1, further comprising an optical device configured to expand the luminance distribution shape of the incident light along a minor-axis direction thereof on an optical path between the light source including the chip configured of the laser diode and the first fly-eye lens.

13. The illumination unit according to claim 12, further comprising an optical path branching device configured to branch an optical path of the incident light into a plurality of optical paths along the minor-axis direction of the luminance distribution shape on an optical path between the light source including the chip configured of the laser diode and the first fly-eye lens.

14. The illumination unit according to claim 1, further comprising an optical path branching device configured to branch an optical path of the incident light into a plurality of optical paths along the minor-axis direction of the luminance distribution shape on an optical path between the light source including the chip configured of the laser diode and the first fly-eye lens.

15. The illumination unit according to claim 1, wherein:
the first fly-eye lens is disposed in a substantial focal position of the second fly-eye lens, and
the second fly-eye lens is disposed in a substantial focal position of the first fly-eye lens.

16. The illumination unit according to claim 1, wherein the optical member includes:

one or more directivity angle changing devices configured to change a directivity angle of light incident from the solid-state light-emitting device, and the integrator configured to uniformize an illuminance distribution of light in the predetermined illumination region illuminated with light having passed through the directivity angle changing device.

17. The illumination unit according to claim 1, wherein the light source is formed in a manner of a package incorporating the solid-state light-emitting device or a package in which the solid-state light-emitting device is supported on a base.

18. A projection display unit provided with an illumination optical system, a spatial modulating device, and a projection optical system, the spatial modulating device configured to modulate light from the illumination optical system based on an input image signal to generate image light, the projection optical system configured to project the image light generated by the spatial modulating device, the illumination optical system comprising:

one or more light sources each including a solid-state light-emitting device, the solid-state light-emitting device configured to emit light from a light emission region thereof, the light emission region including one or more dot-shaped or non-dot-shaped light-emitting spots; and an optical member configured to allow light incident from the solid-state light-emitting device to pass therethrough and exit therefrom, wherein,
the solid-state light-emitting device includes a single chip or a plurality of chips, the single chip configured to emit light in a single wavelength range or light in a plurality of wavelength ranges, the plurality of chips configured to emit light in a same wavelength range or light in wavelength ranges different from one another, at least one of the chips in the one or more light sources is configured of a laser diode, the optical member includes an integrator including a first fly-eye lens and a second fly-eye lens, and configured to uniformize a luminance distribution of light in a predetermined illumination region illuminated with light incident from the solid-state light-emitting device, the first fly-eye lens on which light from the solid-state light-emitting device is incident, the second fly-eye lens on which light from the first fly-eye lens is incident, each of the first and second fly-eye lenses includes a plurality of cells, the cells in the first fly-eye lens being arranged along a first direction and a second direction orthogonal to each other as the arrangement directions, a far field pattern (FFP) of laser light emitted from the light-emitting spot of the chip configured of the laser diode has an anisotropic shape, and a luminance distribution shape of light incident on an incident plane of the first fly-eye lens also has an anisotropic shape caused by the anisotropic shape of the FFP, and a major-axis direction of the luminance distribution shape is different from arrangement directions of the cells in the first fly-eye lens, the major-axis direction of the incident light being different from both the first and second arrangement directions of the cells of the first fly-eye lens.

19. A direct-view display unit provided with an illumination optical system, a spatial modulating device, a projection optical system, and a transmissive screen, the spatial modulating device configured to modulate light from the illumination optical system based on an input image signal to generate image light, the projection optical system configured to project the image light generated by the spatial modulating device, the transmissive screen configured to display the image light projected from the projection optical system, the illumination optical system comprising:

one or more light sources each including a solid-state light-emitting device, the solid-state light-emitting device configured to emit light from a light emission region thereof, the light emission region including one or more dot-shaped or non-dot-shaped light-emitting spots; and an optical member configured to allow light incident from the solid-state light-emitting device to pass therethrough and exit therefrom, wherein, the solid-state light-emitting device includes a single chip or a plurality of chips, the single chip configured to emit light in a single wavelength range or light in a plurality of wavelength ranges, the plurality of chips configured to emit light in a same wavelength range or light in wavelength ranges different from one another, at least one of the chips in the one or more light sources is configured of a laser diode, the optical member includes an integrator including a first fly-eye lens and a second fly-eye lens, and configured to uniformize a luminance distribution of light in a predetermined illumination region illuminated with light incident from the solid-state light-emitting device, the first fly-eye lens on which light from the solid-state light-emitting device is incident, the second fly-eye lens on which light from the first fly-eye lens is incident, each of the first and second fly-eye lenses includes a plurality of cells, the cells in the first fly-eye lens being arranged along a first direction and a second direction orthogonal to each other as the arrangement directions, a far field pattern (FFP) of laser light emitted from the light-emitting spot of the chip configured of the laser diode has an anisotropic shape, and a luminance distribution shape of light incident on an incident plane of the first fly-eye lens also has an anisotropic shape caused by the anisotropic shape of the FFP, and a major-axis direction of the luminance distribution shape is different from arrangement directions of the cells in the first fly-eye lens, the major-axis direction of the incident light being different from both the first and second arrangement directions of the cells of the first fly-eye lens.

* * * * *